US012743970B2

(12) United States Patent
Kim

(10) Patent No.: US 12,743,970 B2
(45) Date of Patent: Sep. 22, 2026

(54) STICKER MEMBER FOR CIGARETTE PACK

(71) Applicant: Byung Jin Kim, Seoul (KR)

(72) Inventor: Byung Jin Kim, Seoul (KR)

( * ) Notice: Subject to any disclaimer, the term of this patent is extended or adjusted under 35 U.S.C. 154(b) by 0 days.

(21) Appl. No.: 18/896,788

(22) Filed: Sep. 25, 2024

(65) Prior Publication Data

US 2025/0014487 A1 Jan. 9, 2025

Related U.S. Application Data

(63) Continuation of application No. 16/496,174, filed as application No. PCT/KR2017/009575 on Aug. 31, 2017, now abandoned.

(30) Foreign Application Priority Data

Mar. 22, 2017 (KR) ........................ 20-2017-0001342

(51) Int. Cl.

| | |
|---|---|
| ***G09F 3/10*** | (2006.01) |
| ***B65D 85/10*** | (2006.01) |
| ***G09F 3/02*** | (2006.01) |

(52) U.S. Cl.

CPC ........... *G09F 3/10* (2013.01); *B65D 85/1027* (2013.01); *B65D 85/1054* (2013.01); *G09F 2003/0222* (2013.01)

(58) Field of Classification Search

CPC ...... G09F 3/02; G09F 3/10; G09F 2003/0225; G09F 2003/0226; G09F 2003/0263; G09F 2003/0266; G09F 2003/0272

USPC ................................ 229/87.13, 87.18, 87.19

See application file for complete search history.

(56) References Cited

U.S. PATENT DOCUMENTS

| | | | |
|---|---|---|---|
| 5,337,943 | A | 8/1994 | Hendren |
| 6,138,437 | A | 10/2000 | Focke et al. |
| 2002/0134821 | A1 | 9/2002 | Gradus-Samson |
| 2008/0141568 | A1 | 6/2008 | Flynn |
| 2010/0006464 | A1 | 1/2010 | Flynn |

(Continued)

FOREIGN PATENT DOCUMENTS

| | | | |
|---|---|---|---|
| AU | 2013101179 | A4 | 10/2013 |
| CA | 2 333 294 | A1 | 7/2002 |

(Continued)

OTHER PUBLICATIONS

Machine translation of DE 10354488 via EPO (Year: 2005).*

(Continued)

*Primary Examiner* — Rebecca L Grusby

(74) *Attorney, Agent, or Firm* — Hauptman Ham, LLP

(57) ABSTRACT

The present disclosure relates to a sticker member for a graphic and text health warning labels on the front and back sides of a cigarette pack at the same time, the sticker member comprising: a rectangular cigarette pack sticker which is attached to the top surface of a cigarette pack and attached to a portion from the top surface up to at least a part of each of the front and back sides of the cigarette pack; an adhesive material formed on the back side of the cigarette pack sticker; and a release paper which protects the adhesive material and has an attachment position guide formed at the central portion thereof and opened by a user so as to guide the top surface of the cigarette pack to the attachment position on the back side of the cigarette pack sticker.

13 Claims, 69 Drawing Sheets

(56) References Cited

U.S. PATENT DOCUMENTS

| | | | | |
|---|---|---|---|---|
| 2010/0009828 | A1 | 1/2010 | Flynn | |
| 2013/0020213 | A1 | 1/2013 | Stuckey | |
| 2013/0319886 | A1 | 12/2013 | Ledermann | |
| 2015/0216229 | A1 | 8/2015 | Harle | |
| 2015/0259132 | A1 | 9/2015 | Bernardo et al. | |
| 2016/0016710 | A1 * | 1/2016 | Merrill | B65B 67/08 229/87.01 |
| 2018/0050855 | A1 | 2/2018 | Bellamah | |

FOREIGN PATENT DOCUMENTS

| | | | | |
|---|---|---|---|---|
| CN | 101341076 | A | 1/2009 | |
| CN | 203602546 | U | 5/2014 | |
| CN | 205885658 | U | 1/2017 | |
| DE | 102 08 026 | A1 | 9/2003 | |
| DE | 103 54 488 | A1 | 6/2005 | |
| DE | 102013110862 | A1 * | 4/2015 | G09F 3/0292 |
| EP | 2 985 239 | A1 | 2/2016 | |
| GB | 2 422 590 | A | 8/2006 | |
| JP | 3007266 | U | 2/1995 | |
| JP | 2014-233916 | A | 12/2014 | |
| JP | 2017-30345 | A | 2/2017 | |
| KR | 20-0419328 | Y1 | 6/2006 | |
| KR | 10-2008-0083007 | A | 9/2008 | |
| KR | 10-1500637 | B1 | 3/2015 | |
| KR | 10-2016-0142263 | A | 12/2016 | |
| TW | M459990 | U1 | 8/2013 | |
| WO | 2004/108563 | A1 | 12/2004 | |
| WO | 2008/142119 | A1 | 11/2008 | |
| WO | 2015/053719 | A1 | 4/2015 | |

OTHER PUBLICATIONS

Machine translation of JP 2014-233916 via EPO (Year: 2014).*

Machine translation of DE 102013110862 via EPO (Year: 2015).*

International Search Report issued on Dec. 19, 2017, for corresponding international application No. PCT/KR2017/009575, along with an English translation (4 pages).

"It's a Manner Label, Tobacco Sticker", Naver Cafe, published on Mar. 17, 2017.

Written Opinion issued on Dec. 19, 2017, for corresponding International Patent Application No. PCT/ KR2017/009575, along with an English translation (19 pages).

"Cigarette Package Health Warnings", Canadian Cancer Society, Oct. 2016, https://tobaccolabels.s3.ca-central-1.amazonaws.com/uploads/2016/11/Cigarette-Package-Health-Warnings-International-Status-Report-English-CCS-Oct-2016.pdf (20 pages).

Michael J. Karter, "Cigarette Characteristics, Smoker Characteristics, and the Relationship to Cigarette Fires", 1994, doi: 10.1007/BF01039941 (32 pages).

* cited by examiner

STICKER MEMBER FOR CIGARETTE PACK

CROSS-REFERENCE TO RELATED APPLICATION

The present application is a continuation of U.S. application Ser. No. 16/496,174 filed on Sep. 20, 2019, which is a national stage filing under 35 U.S.C § 371 of PCT application number PCT/KR2017/009575 filed on Aug. 31, 2017 which is based upon and claims the benefit of priority to Korean Utility Model Application No. 20-2017-0001342 filed on Mar. 22, 2017, in the Korean Intellectual Property Office. All of the aforementioned applications are incorporated herein in their entireties by reference.

TECHNICAL FIELD

Exemplary embodiments according to the present disclosure relate to a sticker member for a cigarette pack, and more particularly, to a sticker member for a cigarette pack that allows a user to precisely cover a warning image and a warning text indicated on front and rear sides of the cigarette pack at the same time.

BACKGROUND ART

Cigarette packs largely include hard packs and soft packs. While a cigarette pack contains 20 cigarettes in general, the number of cigarettes may change to 10, 20, 40, etc., depending on manufacturers. Hard packs separately include a cover and a body regardless of size, and the cover may be opened when taking out a cigarette. Soft packs have a perforation formed on a portion of the top side of the cigarette pack regardless of size, which allows for a cigarette to be taken out therethrough. Hard packs and soft packs are both covered with a thin vinyl packaging. For both types, some of the vinyl packaging may be detached from the top of the cigarette pack for use.

As shown in FIG. 16, conventional hard packs include a cover (1600) and a body (1602), wherein the cover (1600) may be separated from the body (1602) along a front boundary line (1606) and a lateral boundary line (1604) thereby opening the cover (1600).

The cigarette pack includes a warning image (1610) on a front side and a rear side (not shown) thereof. Additionally, a warning text (1612) is indicated on the front and rear sides of the cigarette pack below the warning image (1610). As shown in FIG. 17, conventional soft packs are covered with a vinyl packaging which may be detached by a user rolling off a tear strap (1700).

Warning images on cigarette packs are provided to strongly warn smokers of the detrimental effects of smoking. Since the introduction in 2001 in Canada, 101 countries including 28 countries from the European Union have been implementing this campaign highly recommended by the World Health Organization (WHO) as a most representative no-smoking action. In Republic of Korea, cigarette packs for sale as of Dec. 23, 2016 must include a warning image and a warning text.

According to the revised version of the Korean Health Promotion Act, cigarette packs must include a warning image on the top of the cigarette pack. Moreover, a warning text must be indicated within the cigarette pack along with the warning image slightly apart from the edge of the cigarette pack, as shown in FIG. 1. The warning text must be written in Gothic font and in stark contrast with the background colors. The warning image must occupy more than 30% of the front and rear sides of the cigarette pack. Together with the warning text, more than a half of the front and rear sides of the cigarette pack should be covered, respectively. Furthermore, according to the revised Action, no other design than warning signs are allowed in the area of the cigarette pack for indicating the warning image and the warning text. Also, there are other countries implementing similar regulations to those of Republic of Korea, where it is obligatory to include a warning image and a warning text on at least a portion of a cigarette pack.

Still, smoker consumers wish to have an option of seeing or not seeing a warning image. Korean Patent Application No. 10-2016-0142263 (hereinafter, "Prior Art Document 1") discloses a cigarette pack case for accommodating a cigarette pack and covering a warning image shown on the cigarette pack. The cigarette pack case in Prior Art Document 1 is adapted to accommodate the cigarette pack, and thus, the cigarette pack is susceptible to loss at any time. Moreover, even when not smoking, the cigarette pack may be separated from the cigarette pack case thereby exposing the warning image.

U.S. Patent Publication No. 2015-0216229 (hereinafter, "Prior Art Document 2") discloses a sleeve for covering a warning image of a cigarette pack. The sleeve in Prior Art Document 2 is also susceptible to loss at any time. Likewise, even when not smoking, the cigarette pack may be separated from a cigarette pack case thereby exposing the warning image.

DISCLOSURE OF INVENTION

Problem to be Solved by the Invention

The present disclosure has been conceived to solve the existing problems and seeks to provide a sticker member for a cigarette pack that can prevent the exposure of a warning image indicated on the cigarette pack.

The present disclosure provides a sticker member for a cigarette pack capable of precisely and conveniently attaching a cigarette pack sticker to the cigarette pack at once without failure, thereby covering a warning image and a warning text indicated on a front side and a rear side of the cigarette pack.

The present disclosure provides a sticker member for a cigarette pack that allows the attachment of the cigarette pack sticker to the cigarette pack without distinguishing between a front side and a rear side of the cigarette pack.

The present disclosure provides a sticker member for a cigarette pack that includes an artwork image or an advertisement image in a cigarette pack sticker so as to use the cigarette pack for the purpose of appreciating an artwork or advertising.

Means for Solving Problem

In order to achieve the aforementioned objectives, a sticker member for a cigarette pack according to one exemplary embodiment of the present disclosure, the sticker member includes: a rectangular cigarette pack sticker attachable to the cigarette pack to cover at least a portion of a front side and a rear side and a top side of the cigarette pack to thereby cover at least a portion of a warning image and a warning text of the cigarette pack; an adhesive material applied on the rear side of the cigarette pack sticker; and a release paper attached to the cigarette pack sticker by the adhesive material.

The release paper is provided with an attachment position guide to guide the top side of the cigarette pack to a predetermined attachment position of the rear side of the cigarette pack sticker so that when attaching the cigarette pack sticker to the cigarette pack, the top side of the cigarette pack is attached to the predetermined position precisely at once.

When the top side of the cigarette pack is attached to the predetermined position, a remaining portion of the cigarette pack sticker is attachable to the front side and the rear side of the cigarette pack so that the remaining portion of the cigarette pack sticker is within a width of the cigarette pack.

The attachment position guide is comprised of a cutting portion to guide the release paper to be divided and torn off and at least one pair of folding guides spaced apart from each other while having the cutting portion therebetween by a distance corresponding to a longitudinal length of the top side of the cigarette pack, and a pair of release paper tear ends foldedly torn off by the cutting portion and the at least one pair of folding guides are adapted to guide the top side of the cigarette pack to the predetermined position so that the top side of the cigarette pack is inserted between the pair of release paper tear ends to allow the top side of the cigarette pack to be attached to the predetermined position precisely at once.

The attachment position guide is comprised of at least one pair of cutting portions spaced apart from each other by a distance corresponding to a longitudinal length of the top side of the cigarette to thereby divide and tear off the release paper, and the pair of cutting portions are adapted to tear off the release paper therebetween and to guide the top side of the cigarette pack to the predetermined position so that the top side of the cigarette pack is inserted between the pair of cutting portions to allow the top side of the cigarette pack to be attached to the predetermined position precisely at once.

When attaching the cigarette pack sticker to the cigarette pack, a width of the release paper is formed to correspond to a transverse width of the top side of the cigarette pack, so that the cigarette pack sticker remains within the width of the cigarette pack so as to use the width of the release paper as a measuring guide to attach the cigarette pack sticker to the top side of the cigarette pack by allowing the width of the release paper to be equal to the transverse width of the top side of the cigarette pack.

The width of the cigarette pack sticker is configured to cover the warning image and the warning text of the front side and the rear side of the cigarette pack, and the width of the release paper is configured to correspond to the transverse width of the top side of the cigarette pack, so that the width of the release paper extends greater than the width of the cigarette pack sticker.

When attaching the top side of the cigarette pack to the attachment position guide, to allow a remaining portion of the cigarette pack sticker to occupy an equal area on each of the front side and the rear side of the cigarette pack, the attachment position guide is formed at a center of the release paper in a longitudinal direction of the release paper.

The cigarette pack sticker is provided with a perforation to guide a cutting line to enable a user to readily cut the cigarette pack sticker, the perforation being defined along a center of the cigarette pack sticker at an equal interval in a symmetrical manner in a longitudinal direction of the cigarette pack sticker.

The cigarette pack extends to have a rectangular shape to cover the entire area of the front side of the cigarette pack and 30% to 100% of the rear side of the cigarette pack.

The cigarette pack is in the form of a soft pack, and the perforation is configured to correspond to a cutting line of a vinyl packaging of the cigarette pack to allow for an easy cut of the cigarette pack sticker by using the perforation when tearing off the vinyl packaging, and even after cutting and opening, the warning image and the warning text of the cigarette are covered by the cigarette pack sticker.

The cigarette pack is in the form of a hard pack wherein an edge of the cigarette pack is taper-treated and an inner width and an outer width of the front side of the cigarette pack are different, and wherein the width of the cigarette pack sticker corresponds to the outer width of the front side of the cigarette pack, and left and right widths of the attachment position guide correspond to the outer width.

In order to achieve the aforementioned objectives, a sticker member for a cigarette pack according to another exemplary embodiment of the present disclosure, a sticker member for a cigarette pack, the sticker member includes: a rectangular cigarette pack sticker including a first cover portion to cover a warning image and a warning text of the cigarette pack while being attached to one of a front side or a rear side of the cigarette pack, a first lateral side attachment portion extending from one lateral side of the first cover portion and attached to one lateral side of the cigarette pack, a second cover portion to cover the warning image and the warning text of the cigarette pack while extending from the first lateral side attachment portion to be attached to the other of the front side or the rear side of the cigarette pack, and a second lateral side attachment portion extending from the second cover portion and attached to another lateral side of the cigarette pack.

The sticker member according to another exemplary embodiment of the present disclosure includes an adhesive material applied on a rear side of the cigarette pack sticker.

The sticker member according to another exemplary embodiment of the present disclosure includes a release paper adapted to protect the adhesive material and including an attachment position guide to guide one of the front side or rear side of the cigarette pack to a predetermined attachment position of the rear side of the cigarette pack sticker by a user tearing off the release paper.

The attachment position guide includes: a first cutting portion to guide the release paper to be split into left and right segments; a pair of second cutting portions formed at an upper section and a lower section of the first cutting portion in a direction perpendicular to the first cutting portion; and a pair of first folding guides formed at a left end and a right end of the attachment position guide, respectively, and configured to guide the release paper divided by the first cutting portion to be folded.

The second cutting portions are formed at a predetermined interval from an upper end and a lower end of the attachment position guide, respectively, to guide the release paper to be divided in a vertical direction, the attachment position guide further including second folding guides to guide the release paper divided by the second cutting portions to be folded, the second folding guides being formed at the upper end and the lower end of the attachment position guide, respectively.

The attachment position guide includes two cutting portions to guide the release paper to be divided into three segments, wherein the two cutting portions are formed at the left end and the right end of the attachment position guide, respectively.

The cigarette pack sticker is formed with a perforation to enable a user to readily cut the cigarette pack sticker attached to the cigarette pack when tearing open the cigarette pack, wherein the perforation is defined in at least one of the first and second cover portions and the first lateral side attachment portion and the second lateral side attachment portion so as to correspond to a front cutting line of a lateral cutting line of the cigarette pack.

The perforation of the second cover portion is defined to correspond to the front cutting line of the cigarette pack, and the perforations of the first lateral side attachment portion and the second lateral side attachment portion are defined to extend from the perforation of the second cover portion while corresponding to the lateral cutting line of the cigarette pack.

The cigarette pack sticker further includes a first auxiliary cover portion extending from the second lateral side attachment portion and attached to a portion of one of the front side or the rear side of the cigarette pack.

The cigarette pack sticker further includes a top side attachment portion extending from an upper section of the second cover portion to be attached to a top side of the cigarette pack, and a bottom side attachment portion extending from a lower section of the second cover portion to be attached to a bottom side of the cigarette pack.

The cigarette pack sticker further includes a second auxiliary cover portion extending from the top side attachment portion and attached to a portion of one of the front side or the rear side of the cigarette pack, and a third auxiliary cover portion extending from the bottom side attachment portion and attached to a portion of one of the front side or the rear side of the cigarette pack.

The cigarette pack sticker further includes a fourth auxiliary cover portion extending from upper sections of the first lateral side attachment portion and the second lateral side attachment portion, respectively, to be attached to a portion of the top side of the cigarette pack, and a fifth auxiliary cover portion extending from lower sections of the first lateral side attachment portion and the second lateral side attachment portion, respectively, to be attached to a portion of the bottom side of the cigarette pack.

The cigarette pack sticker includes at least one of an artwork image or an advertisement image on at least some of the first and second cover portions and the first and second lateral side attachment portions.

In order to achieve the aforementioned objectives, a sticker member for a cigarette pack according to still another exemplary embodiment of the present disclosure, the sticker member includes: a rectangular cigarette pack sticker including a first cover portion to cover a text or an image printed on the cigarette pack while being attached to one of a front side or a rear side of the cigarette pack, a first lateral side attachment portion extending from one lateral side of the first cover portion and attached to one lateral side of the cigarette pack, a second cover portion extending from the first lateral side attachment portion and attached to the other of the front side or the rear side of the cigarette pack, and a second lateral side attachment portion extending from the second cover portion and attached to another lateral side of the cigarette pack.

The sticker member according to still another exemplary embodiment of the present disclosure includes an adhesive material applied on a rear side of the cigarette pack sticker.

The sticker member according to still another exemplary embodiment of the present disclosure includes a release paper adapted to protect the adhesive material and including an attachment position guide to guide one of the front side, the rear side and a lateral side of the cigarette pack to a predetermined attachment position of the rear side of the cigarette pack sticker by a user tearing off the release paper.

The cigarette pack sticker includes at least one of an artwork image or an advertisement image on at least some of the first and second cover portions and the first and second lateral side attachment portions.

The release paper includes multiple separate release papers comprised of a pair of front and rear release papers, a pair of lateral release papers, and a pair of top and bottom release papers attached to the rear side of the cigarette pack sticker.

The release paper includes a first release portion and a second release portion separated from each other, wherein the first release portion to be attached to the cigarette pack corresponds to at least one side of the release paper, and the first release portion to be attached to the cigarette pack includes at least one release portion and the second release portion is provided as an integrated portion.

The release paper includes a grip to remove at least one release paper.

The cigarette pack sticker further includes a top side attachment portion extending from an upper section of the second cover portion to be attached to the top side of the cigarette pack, and a bottom side attachment portion extending from a lower section of the second cover portion to be attached to a bottom side of the cigarette pack.

The cigarette pack sticker further includes a first auxiliary cover portion extending from the second lateral side attachment portion and attached to a portion of one of the front side or the rear side of the cigarette pack, a second auxiliary cover portion extending from the top side attachment portion and attached to a portion of one of the front side or the rear side of the cigarette pack, a third auxiliary cover portion extending from the bottom side attachment portion and attached to a portion of one of the front side or the rear side of the cigarette pack, a fourth auxiliary cover portion extending from upper sections of the first lateral side attachment portion and the second lateral side attachment portion, respectively, and attached to a portion of the top side of the cigarette pack, and a fifth auxiliary cover portion extending from lower sections of the first lateral side attachment portion and the second lateral side attachment portion, respectively, and attached to a portion of the bottom side of the cigarette pack.

The cigarette pack sticker is provided with a perforation to guide the cigarette pack sticker attached to the cigarette pack to allow for an easy cut from the cigarette pack when tearing open the cigarette pack.

The cigarette pack sticker includes at least one of an artwork image or an advertisement image on at least a portion of the cigarette pack sticker.

Effect of the Invention

According one or more exemplary embodiments of the present disclosure, a sticker member for a cigarette pack produces the following effects.

Firstly, the sticker member for a cigarette pack according one or more exemplary embodiments of the present disclosure includes a rectangular cigarette pack sticker extending from a top side of the cigarette pack to at least a portion of a front side and a rear side of the cigarette pack, thereby half-permanently covering a warning image and a warning text indicated on the front and rear sides of the cigarette pack.

The sticker member for a cigarette pack according one or more exemplary embodiments of the present disclosure includes a release paper including an attachment position guide to guide the top side of the cigarette pack to the position of the cigarette pack sticker being attached, such that a user can attach the cigarette pack sticker to the cigarette pack precisely at once without deviating even a portion of the cigarette pack sticker from the cigarette pack. Also, as the cigarette pack sticker is disposed symmetrically based on the attachment position guide of the release paper, a user may be spared the trouble of having to distinguish between the front side and the rear side of the cigarette pack when attaching the cigarette pack sticker.

The release paper of the sticker member for a cigarette pack according one or more exemplary embodiments of the present disclosure has a width greater than the width of the cigarette pack sticker and greater than or equal to the width of the top side of the cigarette pack, thereby enabling a user to use the release paper as a measuring guide when attaching the cigarette pack sticker to the top side of the cigarette pack.

The sticker member for a cigarette pack according one or more exemplary embodiments of the present disclosure has a perforation to guide a user through a cutting line of the cigarette pack sticker, the perforation being formed in at least one of a first cigarette pack sticker portion that covers a front boundary line at which a cover and a body of the cigarette pack meet, a second cigarette pack sticker portion that covers a perforation strap of a vinyl packaging of the cigarette pack, or a third cigarette pack sticker portion that covers an upper package of the cigarette pack, so that the user can use a suitable sticker member depending on whether it is a hard pack or a soft pack.

The sticker member for a cigarette pack according one or more exemplary embodiments of the present disclosure includes a first cover portion to cover a warning image and a warning text of the cigarette pack while being attached to one of the front side or the rear side of the cigarette pack, a first lateral side attachment portion extending from one lateral side of the first cover portion and attached to one lateral side of the cigarette pack, a second cover portion to cover the warning image and the warning text of the cigarette pack while extending from the first lateral side attachment portion to be attached to the other of the front side or the rear side of the cigarette pack, and a second lateral side attachment portion extending from the second cover portion and attached to another lateral side of the cigarette pack, thereby half-permanently covering the warning image and the warning text indicated on the front and rear sides of the cigarette pack.

The release paper according one or more exemplary embodiments of the present disclosure includes an attachment position guide to guide one of the front side or the rear side of the cigarette to a rear side of the cigarette pack sticker by a user tearing off the release paper, so that the user can attach the cigarette pack sticker to the cigarette pack precisely at once without deviating even a portion of the cigarette pack sticker from the cigarette pack. In particular, if the release paper has tear ends formed vertically as well as horizontally, a force pressing from above the cigarette pack with the cigarette pack being disposed between the tear ends or the gravitational force applied to the cigarette pack may be used, thereby readily attaching the cigarette pack to the attachment position guide.

The first cover portion and the second cover portion of the sticker member for a cigarette pack according one or more exemplary embodiments of the present disclosure have perforations to guide a user to cut the cigarette pack sticker attached to the cigarette pack, whereby the user may be spared the trouble of having to distinguish between the front side and the rear side of the cigarette pack when attaching the cigarette pack sticker.

The cigarette pack sticker according one or more exemplary embodiments of the present disclosure includes an artwork image or an advertisement image so that the cigarette pack can be used for the purpose of appreciating an artwork or advertising.

BEST MODE(S) FOR CARRYING OUT THE INVENTION

Hereinafter, the aforesaid and additional aspects of the present disclosure will be described in detail in exemplary embodiments with reference to the accompanied drawings to enable one of ordinary skill in the art to readily carry it out.

Figure 1:
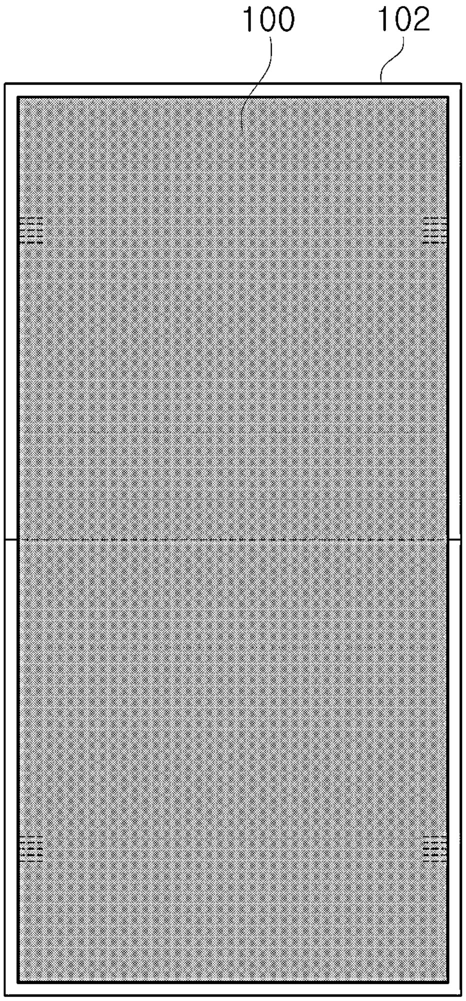
FIG. 1 illustrates a front view of a sticker member for a cigarette pack according to the first embodiment of the present disclosure.

Referring to FIG. 1, the sticker member for the cigarette pack according to the first embodiment of the present disclosure includes a cigarette pack sticker (100) and a release paper (102). The cigarette pack sticker (100) may have a rectangular shape that extends from a top side to a front side of the cigarette pack to cover the top side and a warning image and a warning text on the front side. Typically, tobacco manufacturers and tobacco dealers insert advertisements on a cigarette package so as to increase sales. Meanwhile, a warning image and a warning text are included along with the advertisements from a tobacco company. It is required by law that the warning image and the warning text should occupy at least 30% of the entire surface area of a cigarette pack. In the case the cigarette pack sticker (100) covers less than 30% of a front side and a rear side of the cigarette pack, respectively, from a top side of the cigarette pack, the warning image may not be entirely covered.

In general, a warning image and a warning text occupy 50% and up to 100% of a front side and a rear side of a cigarette pack, respectively. Considering this, it is commercially beneficial to provide a rectangular shape of the cigarette pack that extends from a top side to the front and rear sides of the cigarette pack to cover at least 30% and no more than 100% of the front and rear sides, respectively.

The cigarette pack sticker (100) includes an adhesive material on the rear side thereof and the release paper (102) to protect the adhesive material. The release paper (102) has a width greater than a width of the cigarette pack sticker and equal to a transverse width of the top side of the cigarette pack. Hereinafter, the widthwise direction of the top side of the cigarette pack is referred to as a transverse direction and the lengthwise direction of the top side of the cigarette pack is referred to as a longitudinal direction. The release paper (102) includes an attachment position guide provided at a central portion thereof to guide the top side of the cigarette pack to an attachment position of the cigarette pack sticker (100).

Figure 2A:
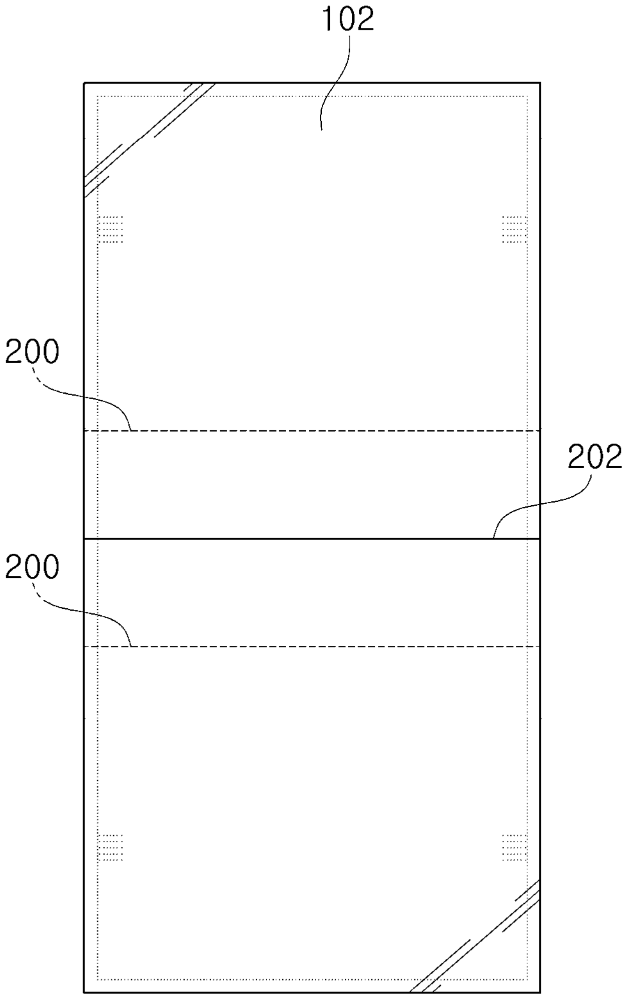
FIGS. 2A and 2B illustrate examples of a release paper attached to the cigarette pack sticker in FIG. 1.

Referring to FIG. 2A, the attachment position guide includes two folding guides (200) and a cutting portion (202). The cutting portion (202) is configured to guide the release paper (102) to be divided in half. The two folding guides (200) are a section perforated by dots, which allows for the folding of the release paper (102) divided by the cutting portion (202). The cutting portion (202) may be provided at the exact center of the release paper (102). The two folding guides (200) are spaced apart from the cutting portion (202) by a predetermined distance therefrom. The two folding guides (200) may be provided in any known method other than dot perforation as long as it allows for an easy folding of the release paper (102).

By way of example, the distance between the two folding guides (200) may be a distance corresponding to the longitudinal length of the top side of the cigarette pack. This enables a user to precisely attach the top side of the cigarette pack to a rear side of the cigarette pack sticker along the guide of the release paper folded by the folding guides (200) after being torn off by the cutting portion (202). The folded portion of the release paper is referred to as a tear end of the release paper.

Figure 2B:
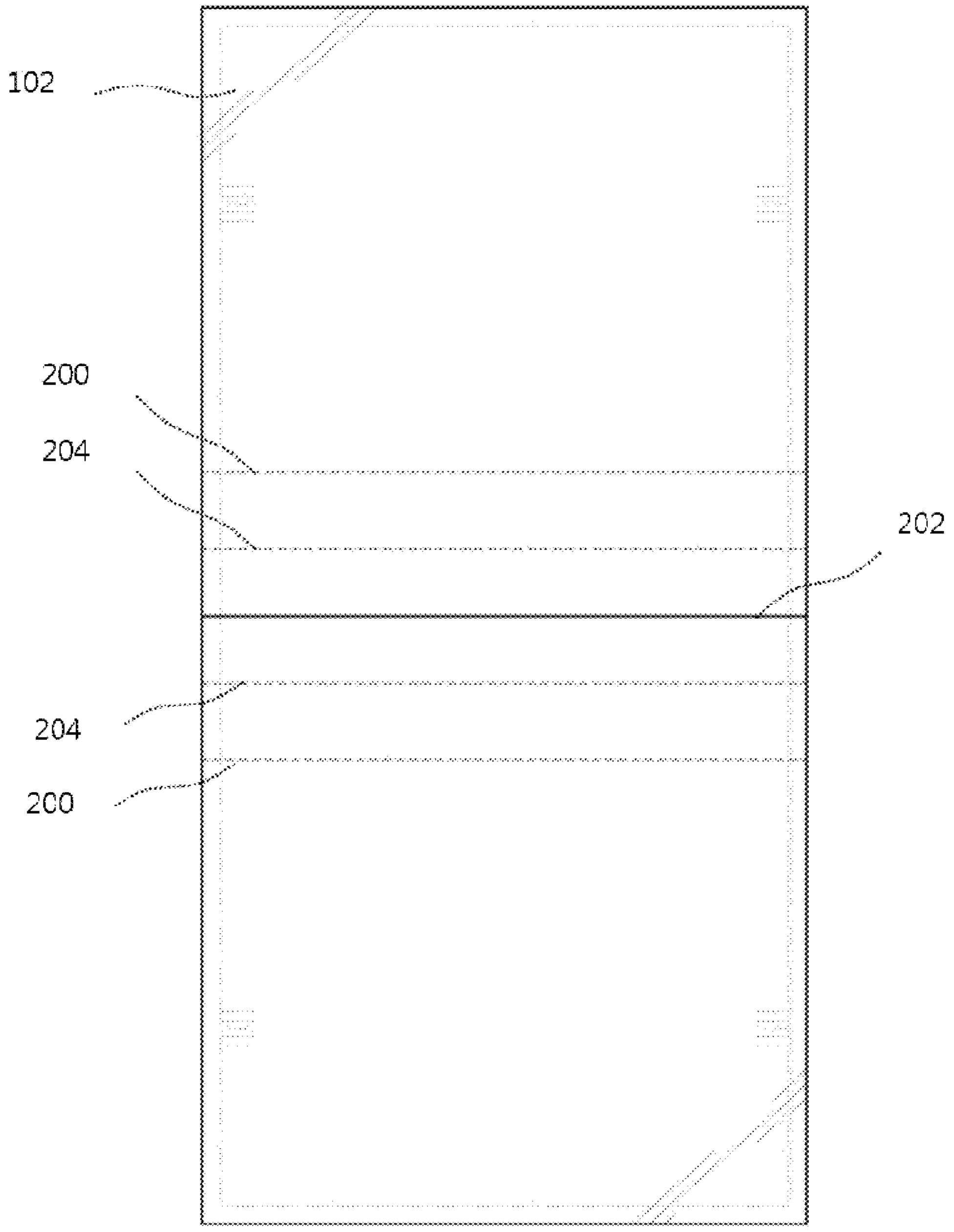

Alternatively, for a cigarette pack sticker that can be used for both a slim pack as well as a normal pack as shown in FIG. 2B, the attachment position guide includes two folding guides (200) and additional two secondary folding guides (204) for a slim cigarette pack. The distance between the secondary folding guides (204) may be a distance corresponding to the longitudinal length of the top side of the slim cigarette pack. This enables a user to precisely attach a top side of the slim cigarette pack to a rear side of the cigarette pack sticker along a tear end of the release paper folded by the secondary folding guides (204) after being torn off by the cutting portion (202).

Figure 3:
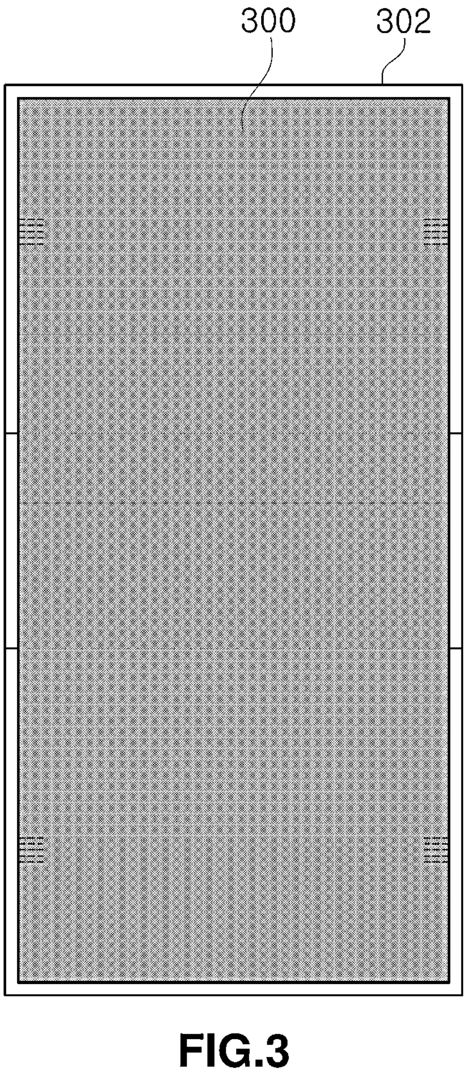
FIG. 3 illustrates a front view of a sticker member for a cigarette pack according to the second embodiment of the present disclosure.

Referring to FIG. 3, a sticker member for a cigarette pack according to the second embodiment of the present disclosure includes a cigarette pack sticker (300) and a release paper (302). The cigarette pack sticker (300) may have a rectangular shape that extends from a top side to a front side of the cigarette pack to cover the top side and a warning image and a warning text on the front side. The warning image and the warning text are included along with advertisements from a tobacco company. It is required by law that the warning image and the warning text should occupy at least 30% of the entire surface area of the cigarette pack. In the case the cigarette pack sticker (300) covers less than 30% of the front side and the rear side of the cigarette pack, respectively, from the top side of the cigarette pack, the warning image may not be entirely covered.

In general, a warning image and a warning text occupy 50% and up to 100% of a front side and a rear side of a cigarette pack, respectively. Considering this, it is commercially beneficial for the cigarette pack according to present disclosure to have a rectangular shape that extends from a top side to the front and rear sides of the cigarette pack to cover at least 30% and no more than 100% of the front and rear sides, respectively.

The cigarette pack sticker (300) includes an adhesive material on the rear side thereof and the release paper (302) to protect the adhesive material. The release paper (302) has a width greater than a width of the cigarette pack sticker and equal to a transverse width of the top side of the cigarette pack.

The release paper (302) includes an attachment position guide provided at a central portion thereof to guide the top side of the cigarette pack to the adhesive material.

Figure 4A:
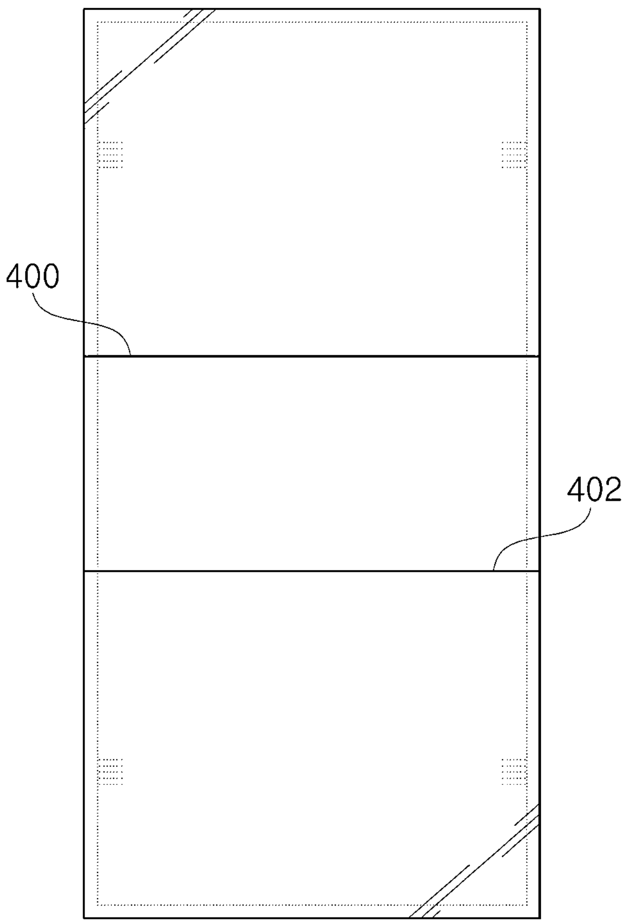
FIGS. 4A and 4B illustrate examples of a release paper attached to the cigarette pack sticker of FIG. 3.

Referring to FIG. 4A, the attachment position guide may include two cutting portions (400, 402). The two cutting portions (400, 402) are configured to guide the release paper (302) to be divided into three segments.

By way of example, the distance between the two cutting portions (400, 402) may be a distance corresponding to a width of the top side of the cigarette pack. This enables a user to precisely attach the top side of the cigarette pack to a rear side of the cigarette pack sticker after removing and tearing off the release paper between the two cutting portions (400, 402).

Figure 4B:
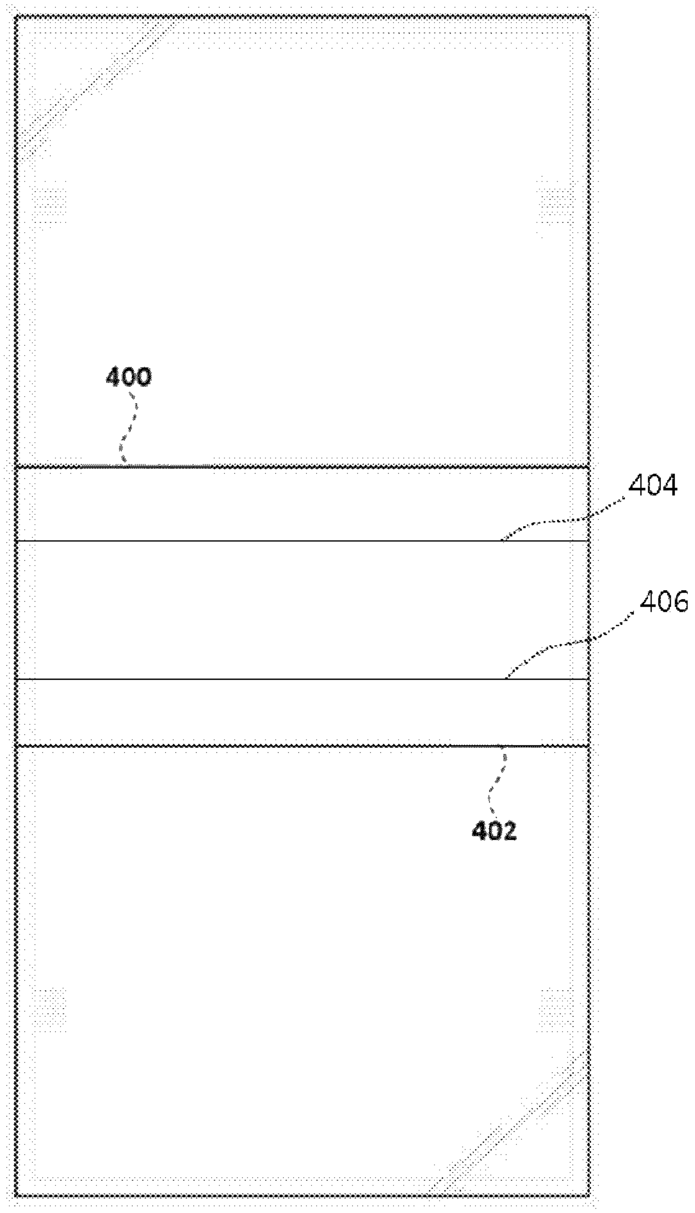

Alternatively, for a cigarette pack sticker that can be used for both a slim pack as well as a normal pack as shown in FIG. 4B, the attachment position guide includes additional secondary cutting portions (404, 406) between the two cutting portions (400, 402). The distance between the secondary cutting portions (404, 406) may be a distance corresponding to the longitudinal length of the top side of the slim cigarette pack. This enables a user to precisely attach a top side of the slim cigarette pack to a rear side of the cigarette pack sticker torn off by the secondary cutting portions (404, 406).

Figure 5A:
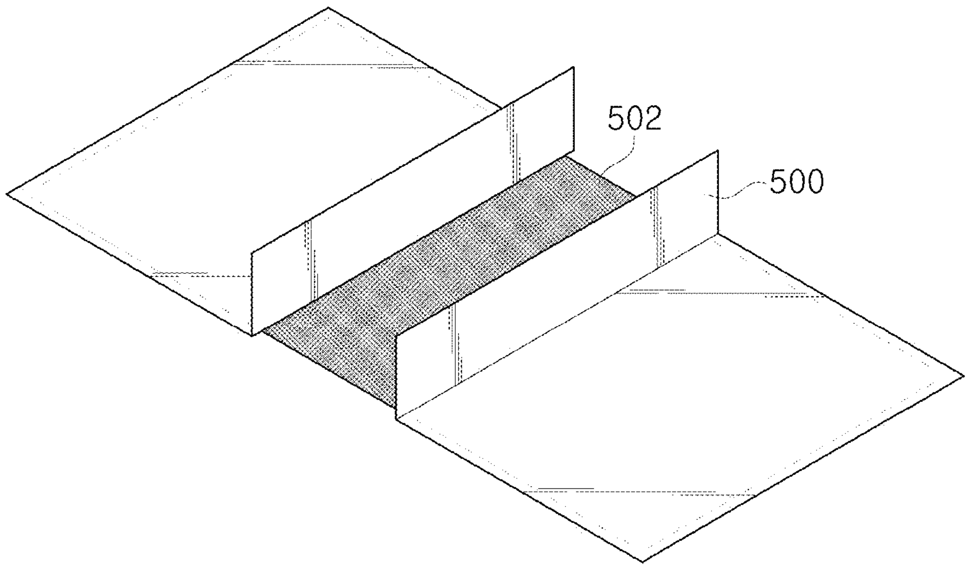
FIGS. 5A and 5B are examples of using the release paper of the sticker member for the cigarette pack according to the first embodiment of the present disclosure.

FIG. 5A is an example of using a release paper of a sticker member for a cigarette pack according to the first embodiment of the present disclosure. Referring to FIG. 5A, a cigarette pack sticker (502) includes a release paper (500) divided in half by a cutting portion and folded by two folding guides. The portion of the release paper (500) folded along the two folding guides, i.e., a tear end of the release paper, is adapted to guide the cigarette pack.

Figure 5B:
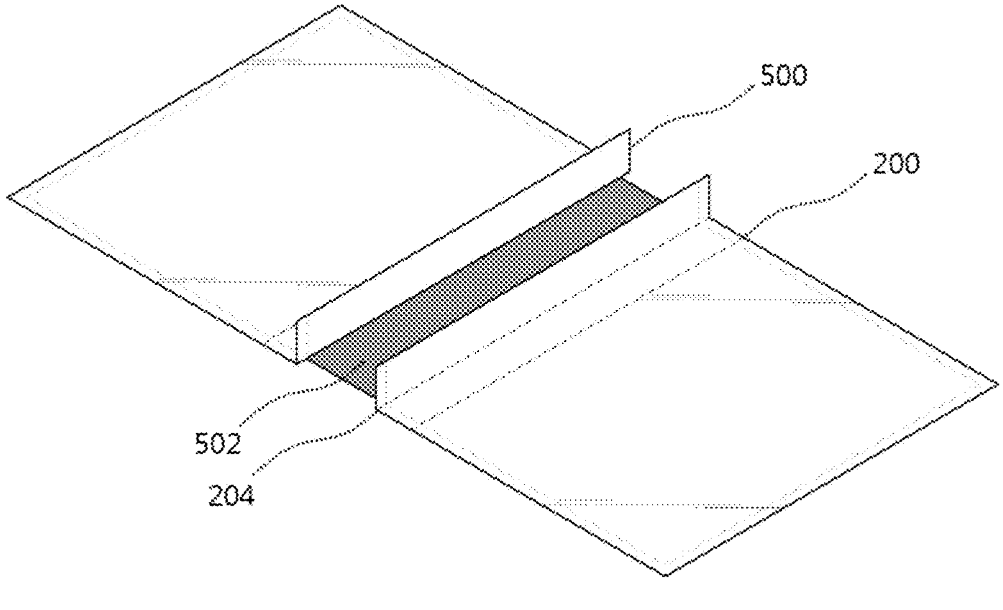

Alternatively, for a cigarette pack sticker that can be used for both a slim pack as well as a normal pack as shown in FIG. 5B, the tear end of the release paper (500) folded along the two cutting portions (200) is adapted to guide a normal cigarette pack. The tear end of the release paper (500) folded along the two secondary cutting portions (204) is adapted to guide a slim cigarette pack.

Figure 6A:
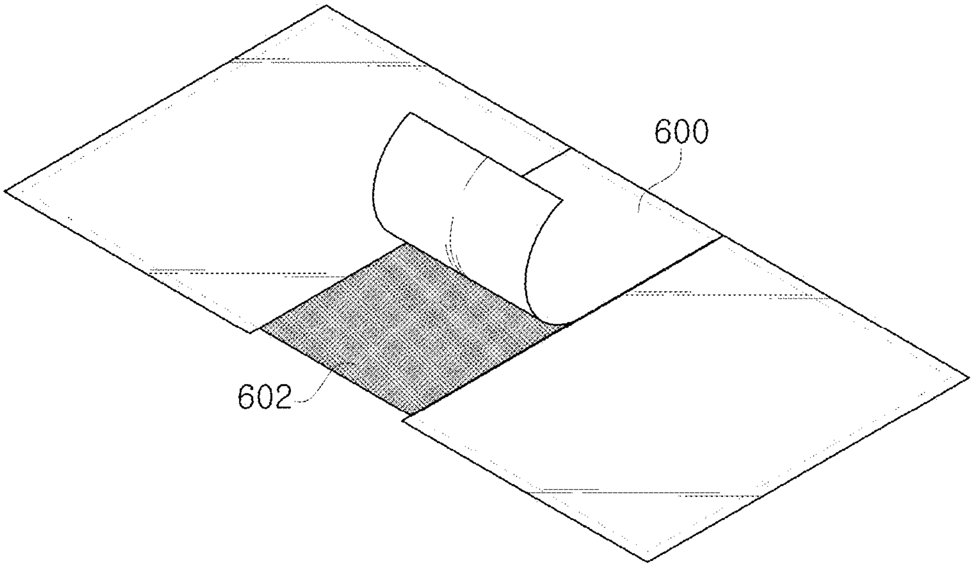
FIGS. 6A and 6B are examples of using the release paper of the sticker member for the cigarette pack according to the second embodiment of the present disclosure.

FIG. 6A is an example of using a release paper of a sticker member for a cigarette pack according to the second embodiment of the present disclosure. Referring to FIG. 6A, a cigarette pack sticker (602) includes a release paper (600) divided into three segments by the two cutting portions (400, 402). After a portion of the release paper that is provided between the two cutting portions is removed by a user, the cigarette pack may be attached to the cigarette pack sticker.

Figure 6B:
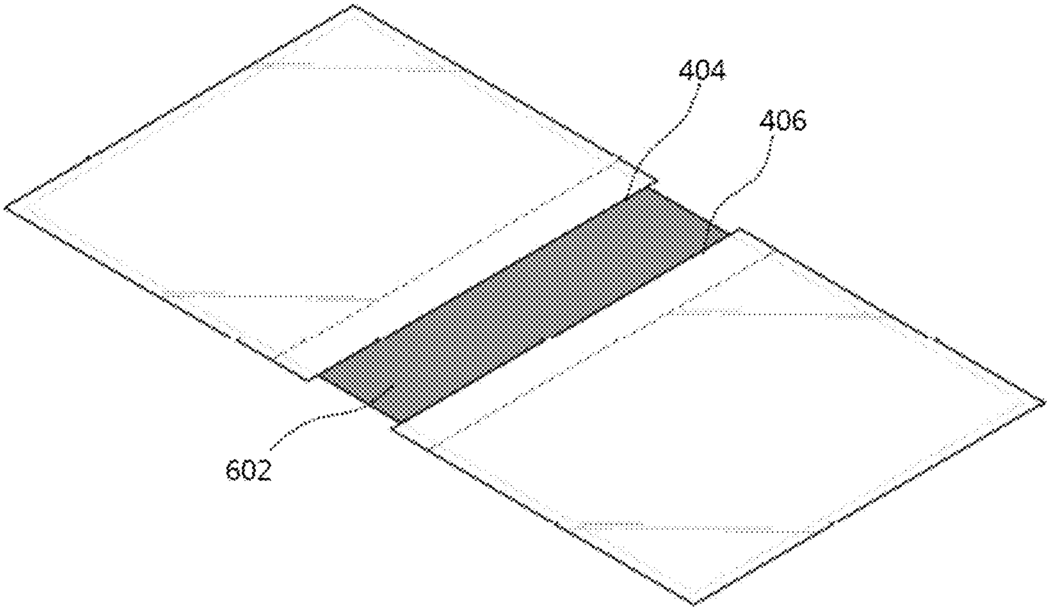

Alternatively, for a cigarette pack sticker that can be used for both a slim pack as well as a normal pack as shown in FIG. 6B, the two cutting portions (400, 402) includes two secondary cutting portions (404, 406). After a portion of the release paper that is provided between the secondary cutting portions (404, 406) is removed, a slim cigarette pack may be attached to the cigarette pack sticker.

Figure 7:
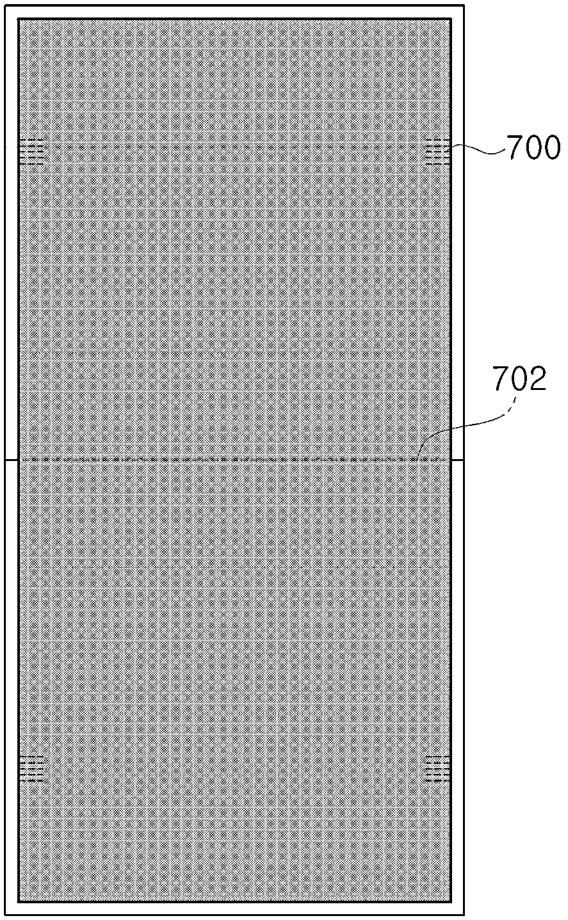
FIG. 7 illustrates a front view of a sticker member for a cigarette pack according to the first embodiment of the present disclosure.
Figure 8A:
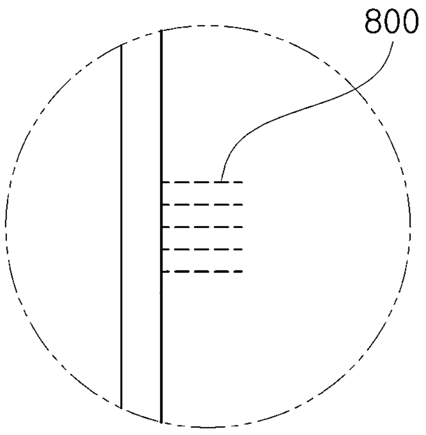
FIGS. 8A to 8D illustrate examples of perforations of various shapes formed in the cigarette pack sticker.
Figure 8B:
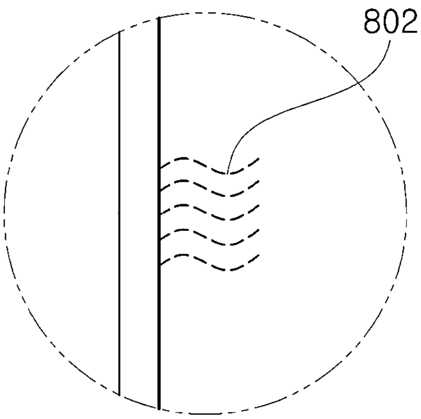
Figure 8C:
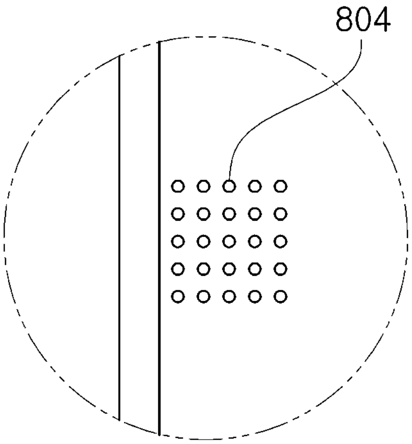
Figure 8D:
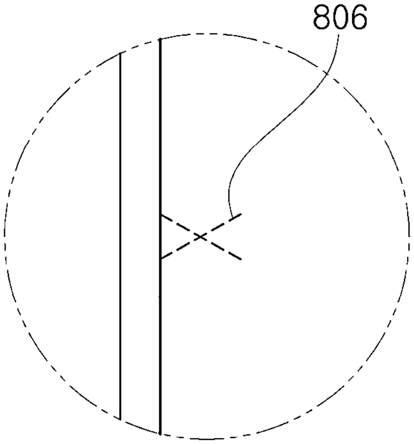

Referring to FIG. 7, the sticker member according to the first embodiment of the present disclosure may have a perforated section (700) on left and right sides of a lower portion and an upper portion of the cigarette pack sticker in a symmetrical manner based on a virtual center line (702). The perforated section (700) of the cigarette pack sticker is easily torn by user's fingernails, or the like, so that a cover of the cigarette pack may be exposed outwardly. Upon the exposure of the cover of the cigarette pack, the user can open the cigarette pack.

The feature to note is that the left and right perforations in the upper section of the cigarette pack sticker are aligned along the same line in a horizontal direction, and the left and right perforations in the lower section of the cigarette pack sticker are aligned along the same line in a horizontal direction. Specifically, if a parallel line is drawn from the center of the left perforation in the upper section of the cigarette pack sticker, the line passes through the center of the right perforation in the upper section of the cigarette pack sticker.

FIG. 8 illustrates examples of perforations formed in the cigarette pack sticker. The perforation may include a plurality of perforations aligned in parallel as indicated by the drawing reference numeral "800." The perforation may include a plurality of perforations arranged in a curved line as indicated by the drawing reference numeral "802." The perforation may include a plurality of perforations forming a ring shape as indicated by the drawing reference numeral "804." The perforation may form a cross ("X") shape as indicated by the drawing reference numeral "806."

Figure 9:
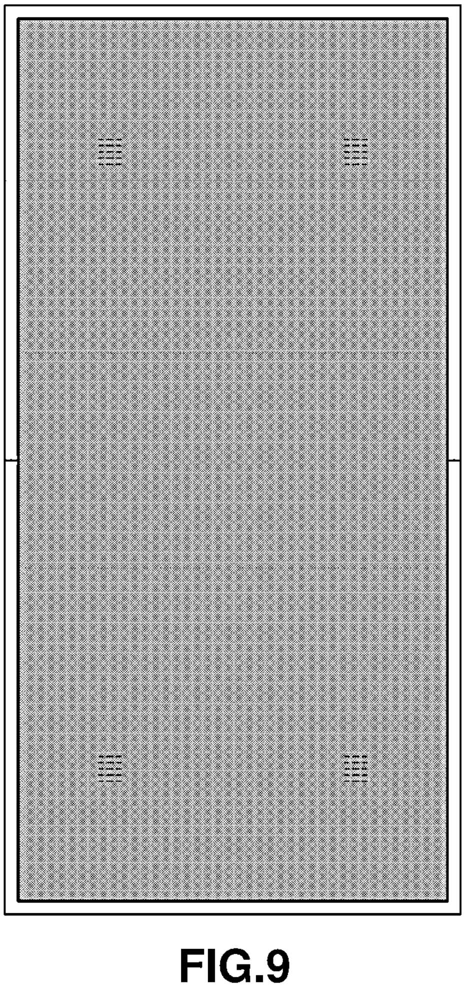
FIGS. 9 to 15 illustrate examples of the cigarette pack sticker formed with perforations of various shapes.
Figure 10:
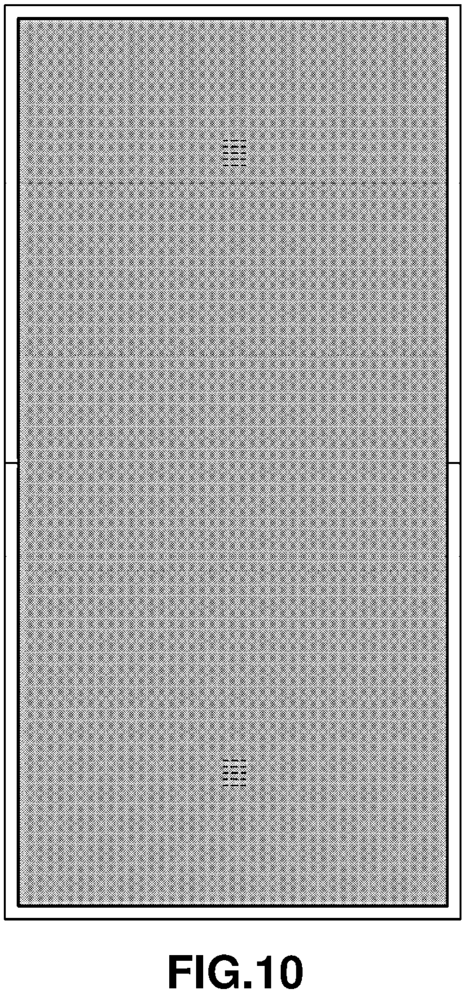

FIGS. 9 and 10 illustrate examples of identical perforations formed at different positions. The examples of FIGS. 9 and 10 show a plurality of perforations aligned in parallel that are formed at an upper section and a lower section of the cigarette pack sticker. Referring to FIG. 9, two perforations are formed at each of the upper section and the lower section of the cigarette pack sticker adjacent to a vertical axis. Referring to FIG. 10, a single perforation is formed at the upper section and the lower section of the cigarette pack sticker, respectively.

Figure 11:
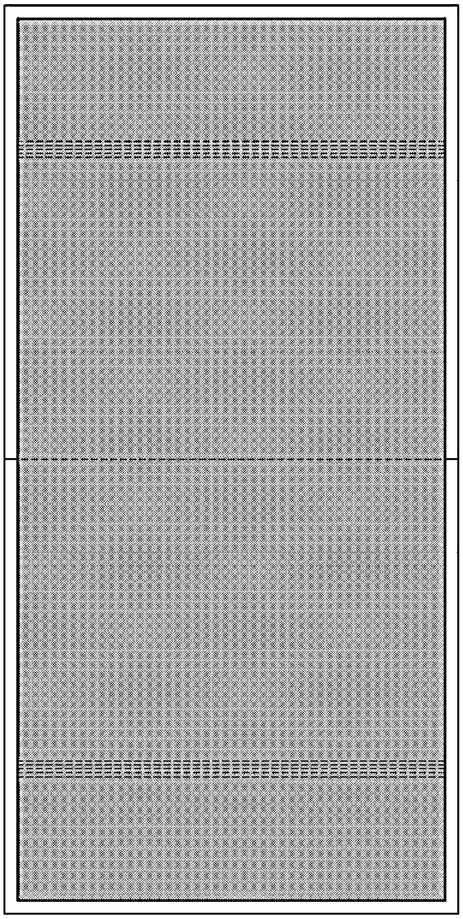
Figure 12:
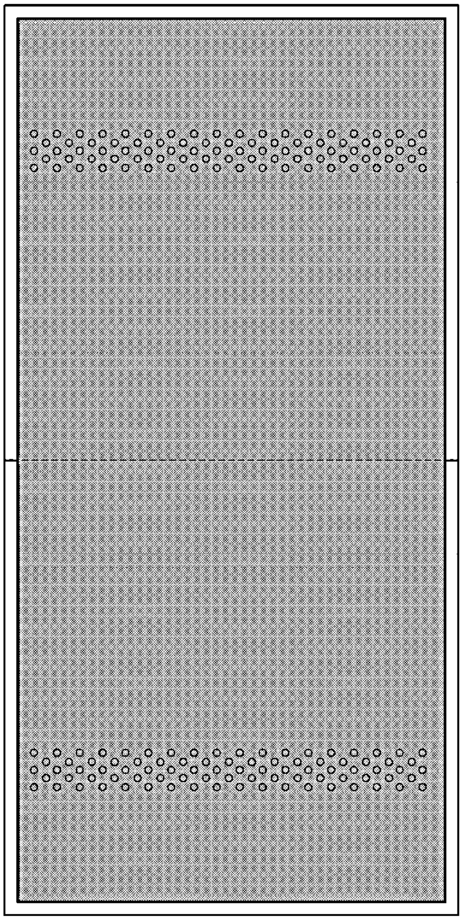

FIG. 11 illustrates an example of a plurality of linear perforations arranged in a straight line. FIG. 12 illustrates an example of a plurality of circular perforations arranged in a straight line. The perforations shown in FIGS. 11 and 12 may be replaced by the cutting line marked in the drawings. The perforations shown in FIGS. 2, 10, 11 and 12 are in a symmetrical manner based on the horizontal axis.

Figure 13:
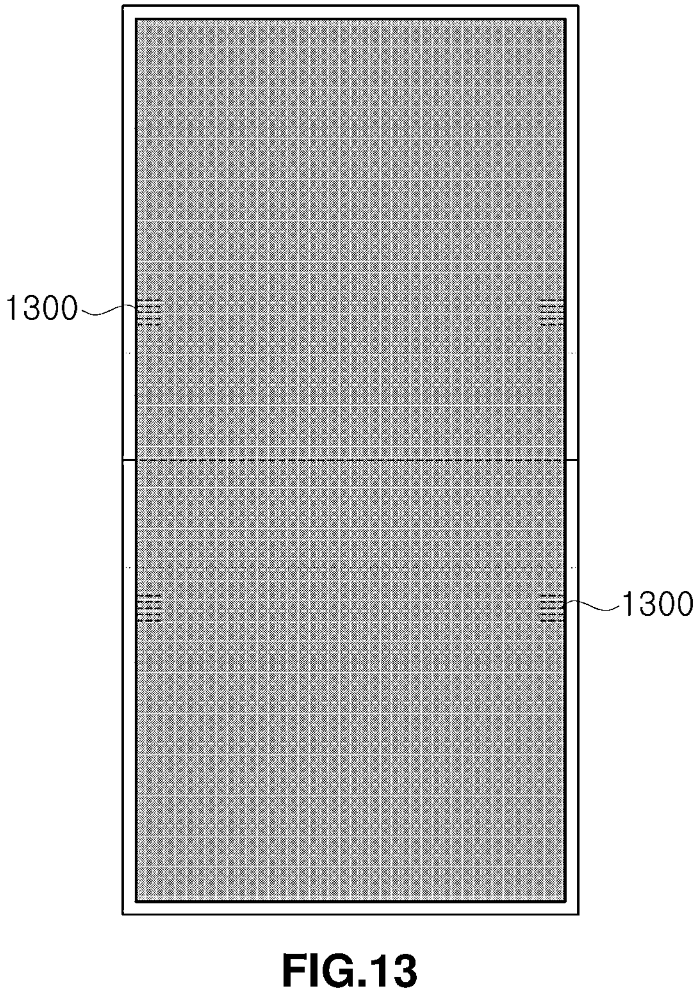
Figure 14:
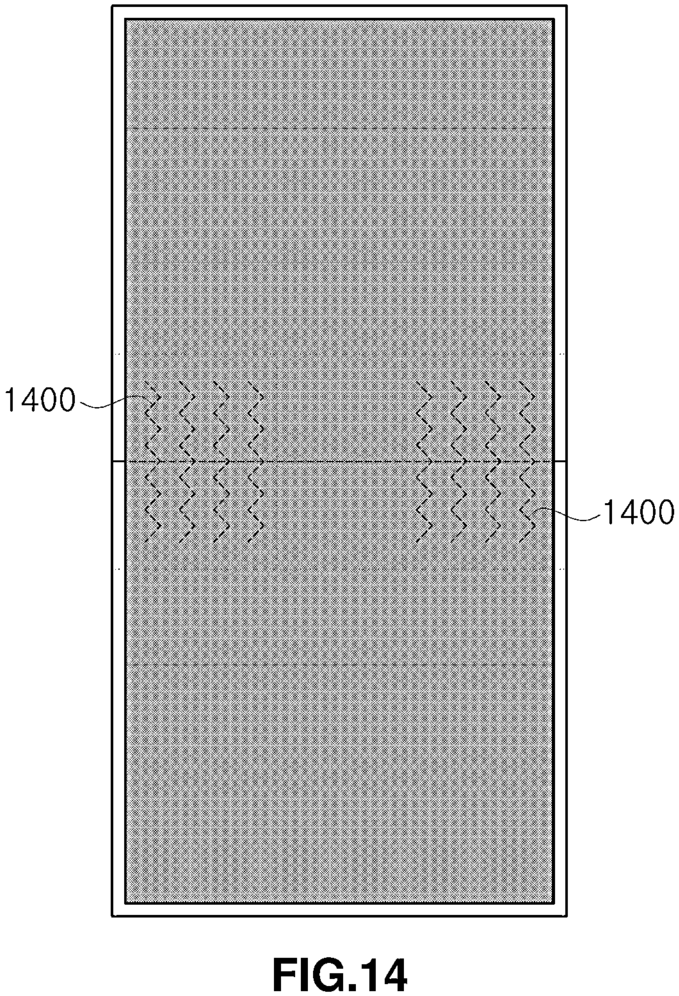
Figure 15:
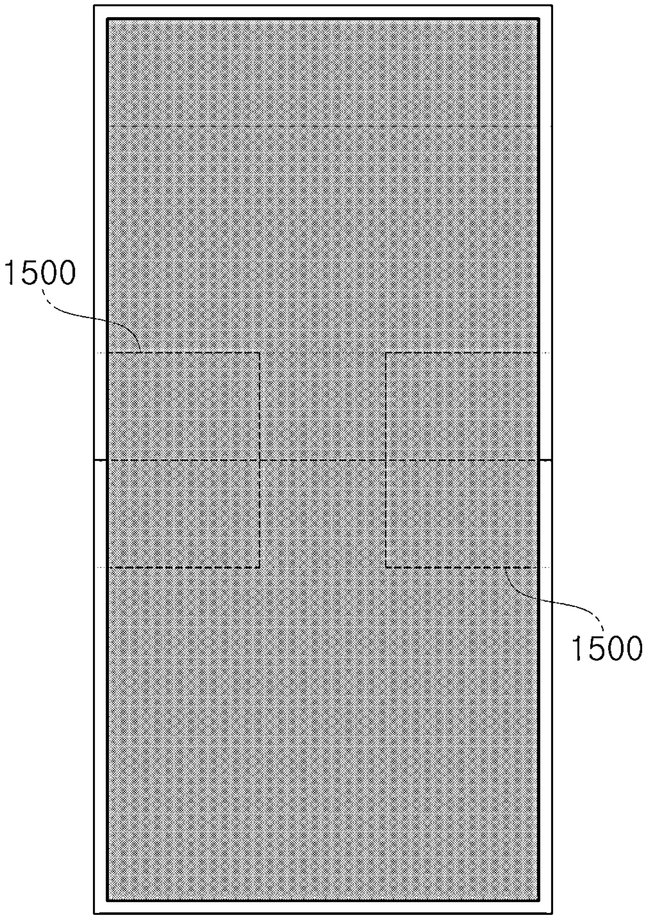

FIG. 13 illustrates an example of a plurality of linear perforations (1300) arranged in a straight line adjacent to the horizontal axis. FIG. 14 illustrates an example of a plurality of linear perforations (1400) arranged in a zigzag line. FIG. 15 illustrates an example of a plurality of linear perforations (1500) arranged in a flat U-shape which is a part that can be readily torn off along the U-shaped line.

Cigarette packs largely include hard packs and soft packs. While a cigarette pack contains 20 cigarettes in general, the number of cigarettes may change to 10, 20, 40, etc., depending on manufacturers. Accordingly, the size of hard packs and soft packs may also vary depending on the number of cigarettes. "Slim-type" cigarette packs are relatively less in thickness and greater in length. In the present disclosure, hard packs refer to those including a cover and a body regardless of the size, while soft packs refer to those including a simple packaging which covers its upper portion regardless of the size. Hard packs and soft packs are both covered with a thin vinyl package. For both types, some of the vinyl package may be detached from the top of the cigarette pack for use.

Figure 16:
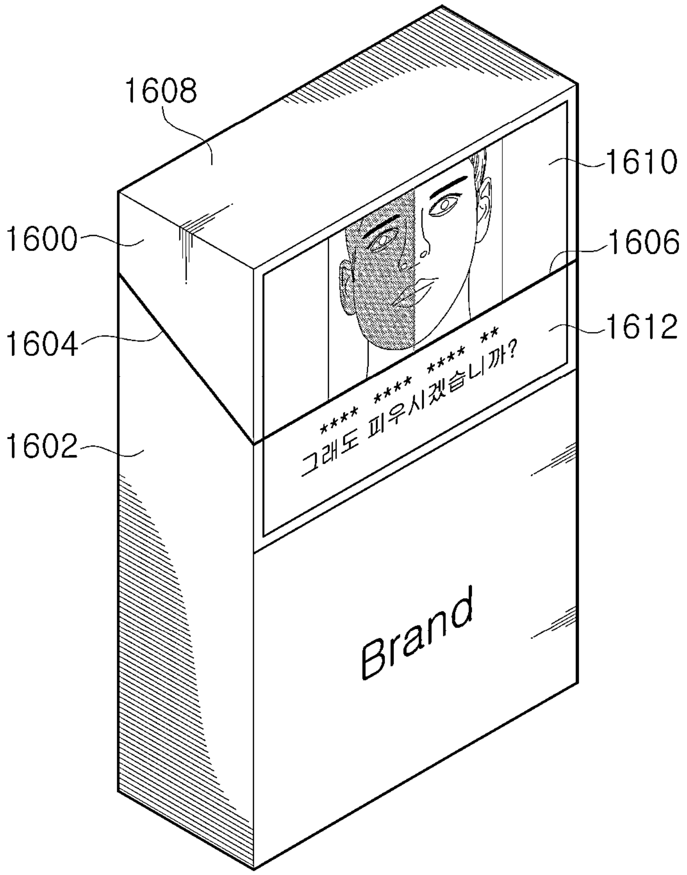
FIG. 16 illustrates an example of a conventional hard cigarette pack.

As shown in FIG. 16, conventional hard packs include a cover (1600) and a body (1602). The drawing reference numerals "1604" and "1606" marked by a straight line indicate the boundary lines at which the cover (1600) and the body (1602) meet. The drawing reference numeral "1604," "1606" and "1608" indicate a lateral boundary line, a front boundary line and a top boundary line, respectively. The cigarette pack includes a warning image (1610) on a front side and a rear side (not shown) thereof. Additionally, a warning text (1612) is indicated on the front and rear sides of the cigarette pack below the warning image (1610).

Figure 17:
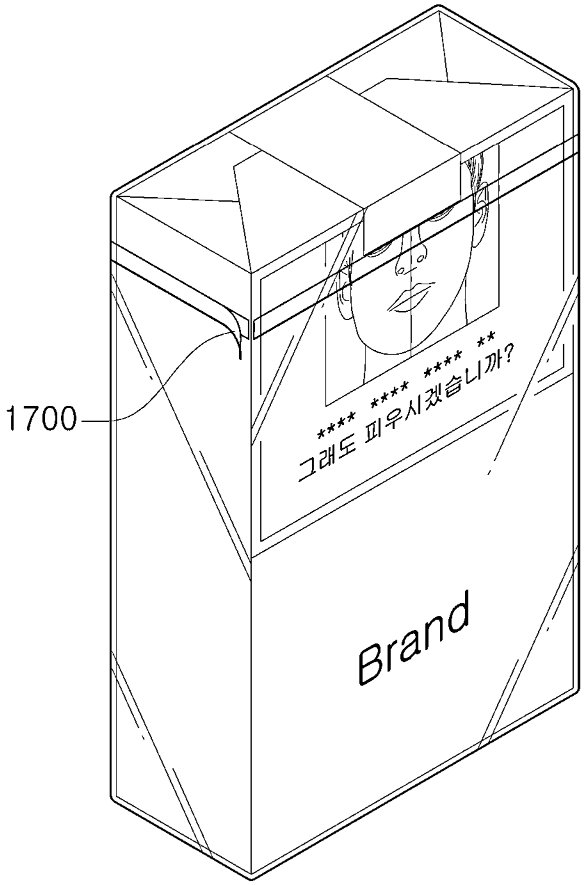
FIG. 17 illustrates an example of a conventional soft cigarette pack.
Figure 18:
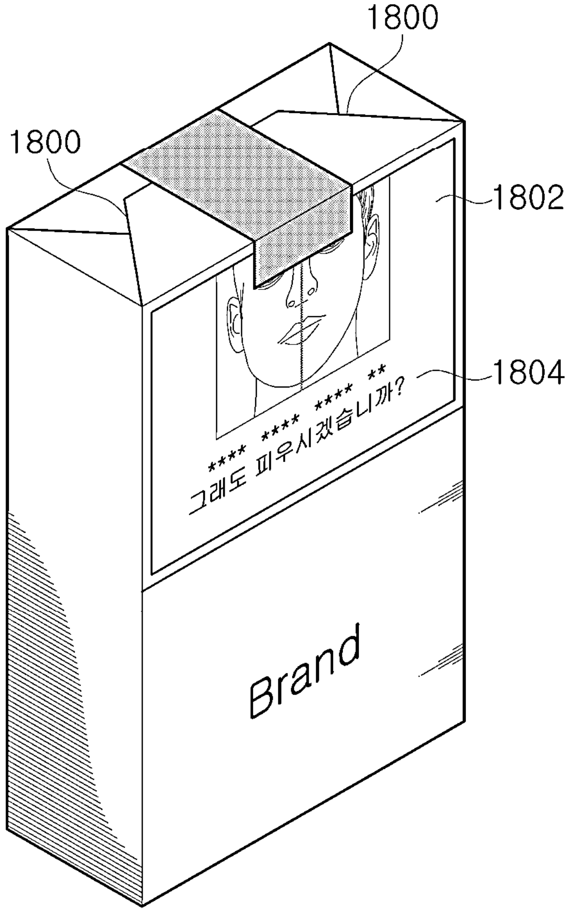
FIG. 18 illustrates a view of the soft cigarette pack of FIG. 17 with a vinyl package being detached therefrom.

As shown in FIG. 17, conventional soft cigarette packs for sale are covered with a vinyl packaging which may be detached by a user rolling off a tear strap (1700). Since soft cigarette packs do not include a cover, a user needs to tear a top side (1800) off the soft cigarette pack as shown in FIG. 18. The cigarette pack includes a warning image (1802) on a front side and a rear side (not shown) thereof. Additionally, a warning text (1804) is indicated on the front and rear sides of the cigarette pack below the warning image (1802).

FIGS. 19A to 24 are views illustrating a process of attaching the cigarette pack sticker to the cigarette pack. For both hard packs and soft packs, the same process applies to attach the cigarette pack sticker to the cigarette pack. Hereinafter, it is assumed that for hard packs, a vinyl packaging on a top side of the cigarette pack is removed, while for soft packs, both the cases where a vinyl packaging is removed from the cigarette pack and not removed from the cigarette pack are considered.

FIGS. 19A, 19B, 20A, 20B and 21 are views illustrating a process of attaching the cigarette pack sticker to the cigarette pack according to the first embodiment of the present disclosure.

Figure 19A:
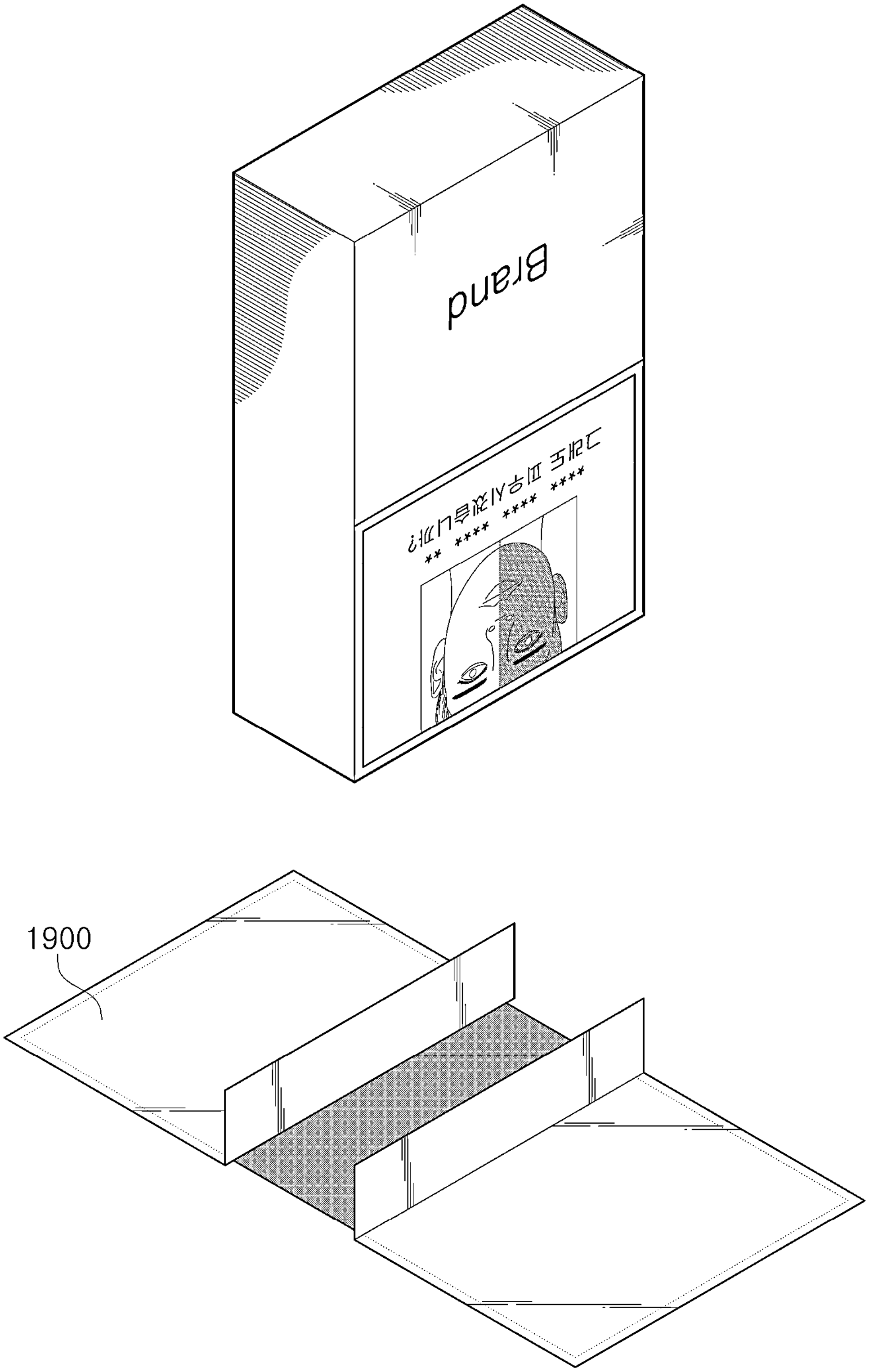
FIGS. 19A, 19B, 20A, 20B and 21 are views illustrating a process of attaching the cigarette pack sticker to the cigarette pack according to the first embodiment of the present disclosure.
Figure 20A:
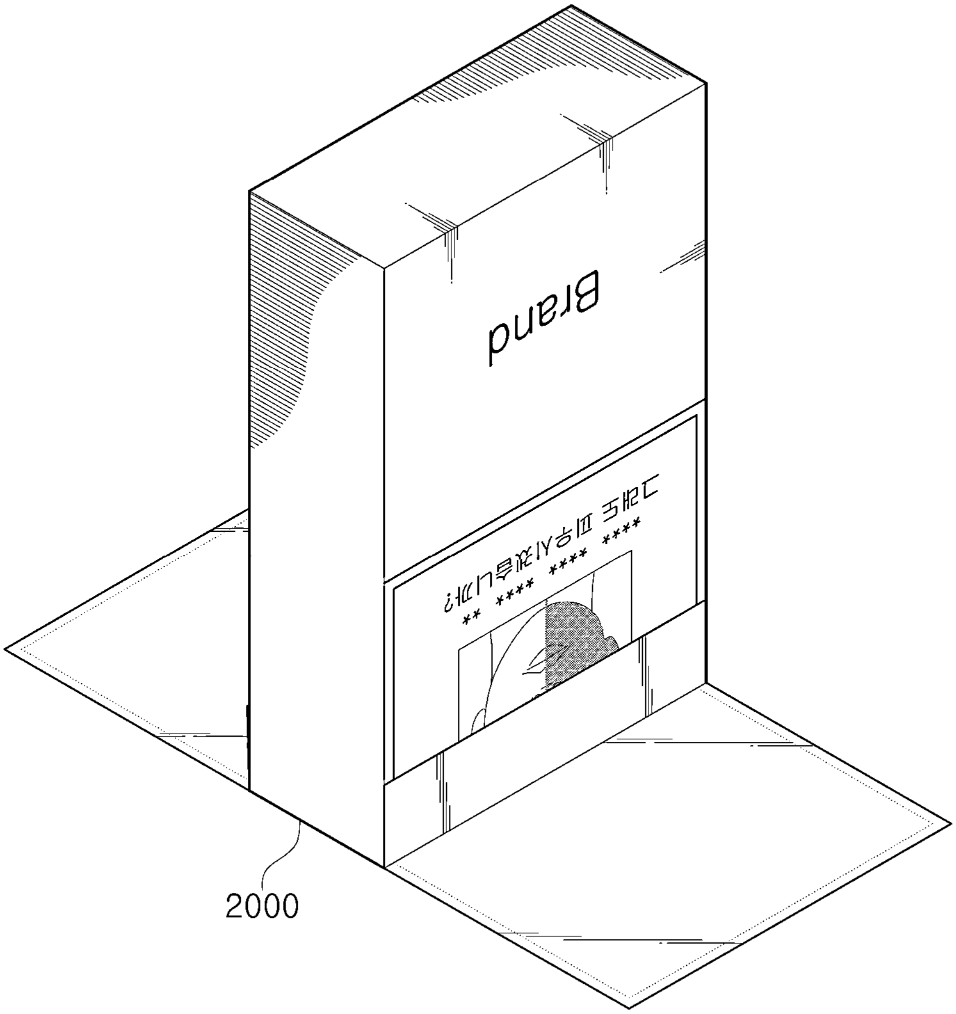

Referring to FIG. 19A, for a regular cigarette pack, a release paper (1900) is disposed facing upward, is divided in half and is folded with the aid of a folding guide (200). Subsequently, as shown in FIG. 20A, the cigarette pack is inserted between tear ends of the release paper to thereby attach the top side of the cigarette pack to attachment portions of the cigarette pack sticker. A cigarette pack sticker (2000) is provided in a manner that the release paper has a width equal to the width of the top side of the cigarette pack. Thus, a user may use the folded potion of the release paper (1900) and the width thereof as a "measuring guide." Furthermore, since a longitudinal length of the top side of the cigarette pack is equal to the width of the release paper, a user can precisely attach the top side of the cigarette pack to the attachment portion of the cigarette pack sticker by measuring the width of the release paper based on the cigarette pack held from upside down. After attaching the cigarette pack to the sticker as shown in FIG. 21, the user removes the release paper (2100) from the cigarette pack sticker.

Figure 19B:
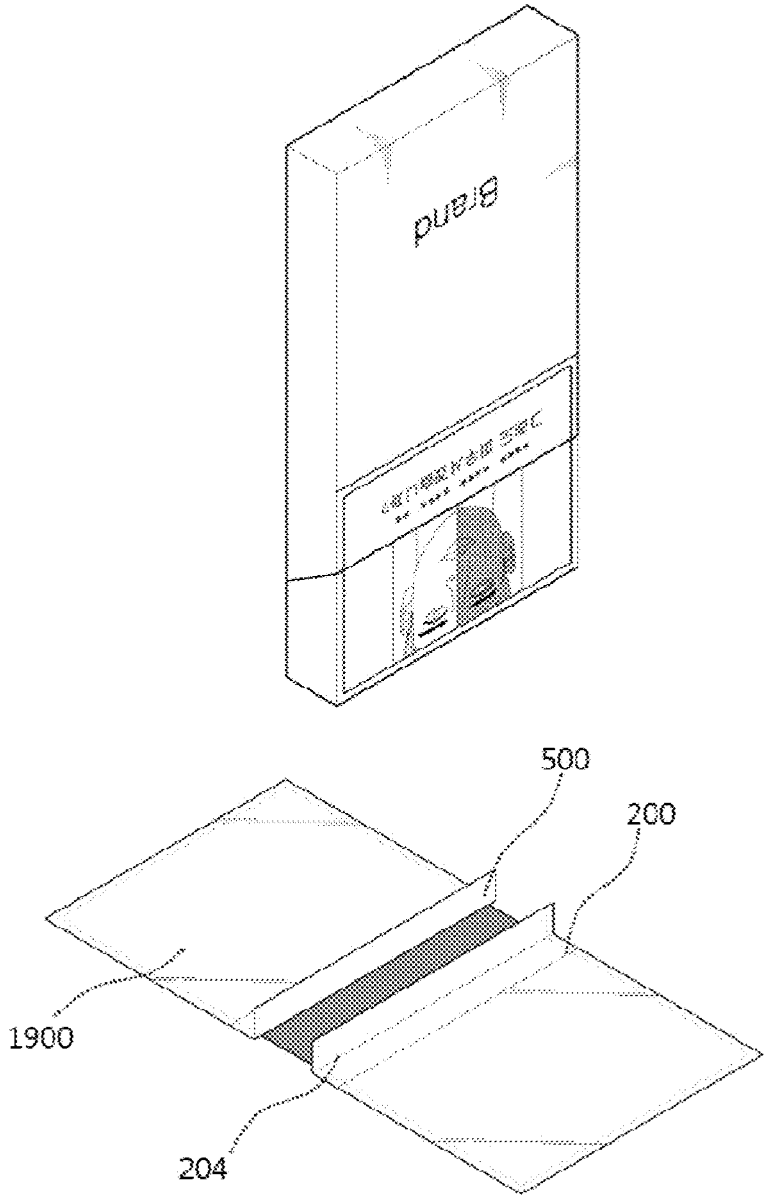
Figure 20B:
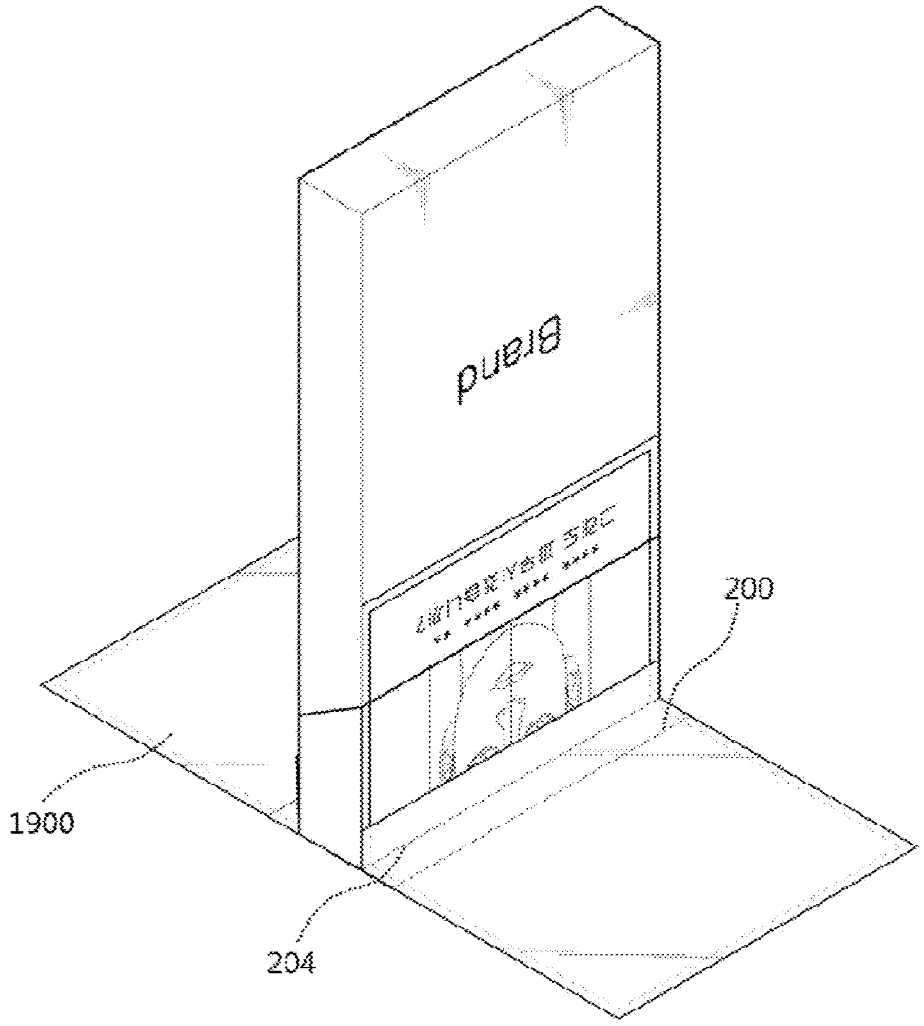
Figure 21:
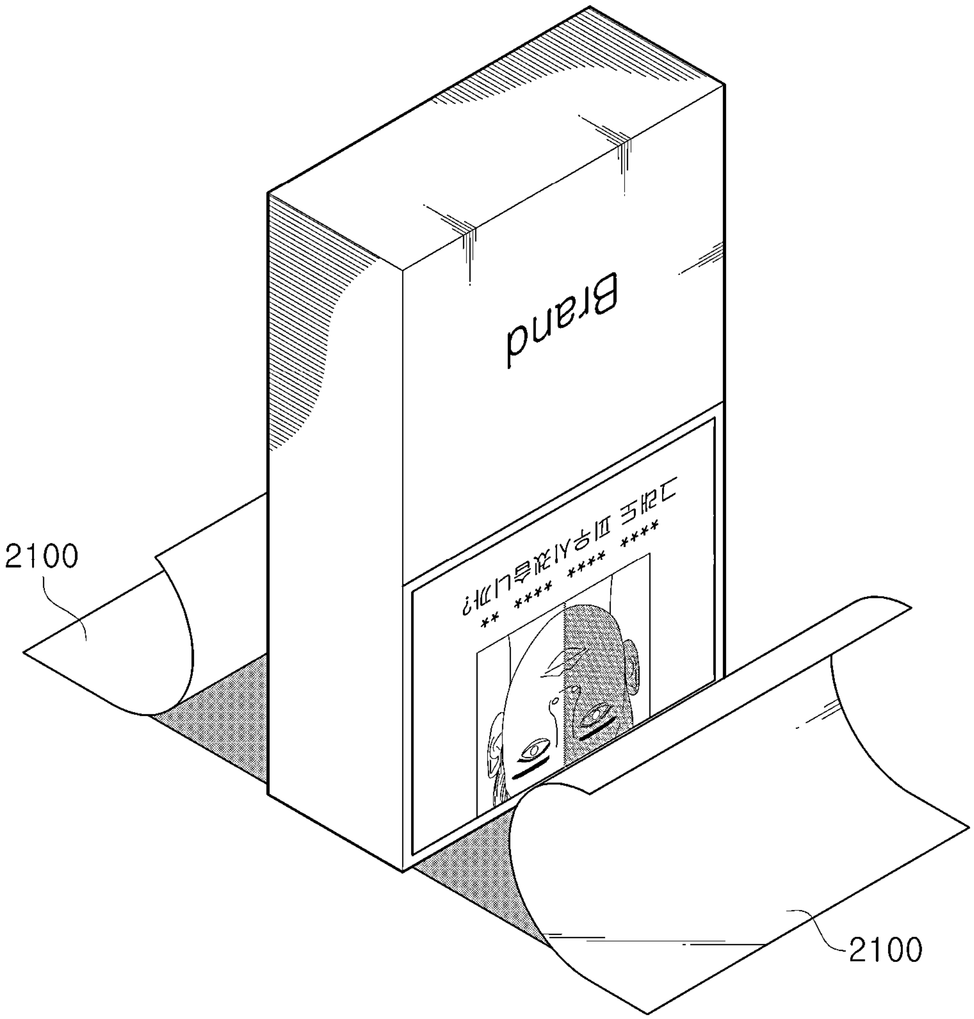

Referring to FIGS. 19B, 20B and 21, for a slim cigarette pack, a release paper is folded with the aid of a second folding guide (204) inside a folding guide (200). The cigarette pack is inserted between tear ends (500) of the release paper with a center portion of the cigarette pack being folded so that the cigarette pack is attached to the attachment portion of the cigarette pack sticker, and then the release paper is removed.

FIGS. 22A, 22B, 23 and 24 are views illustrating a process of attaching the cigarette pack sticker to the cigarette pack according to the second embodiment of the present disclosure.

Figure 22A:
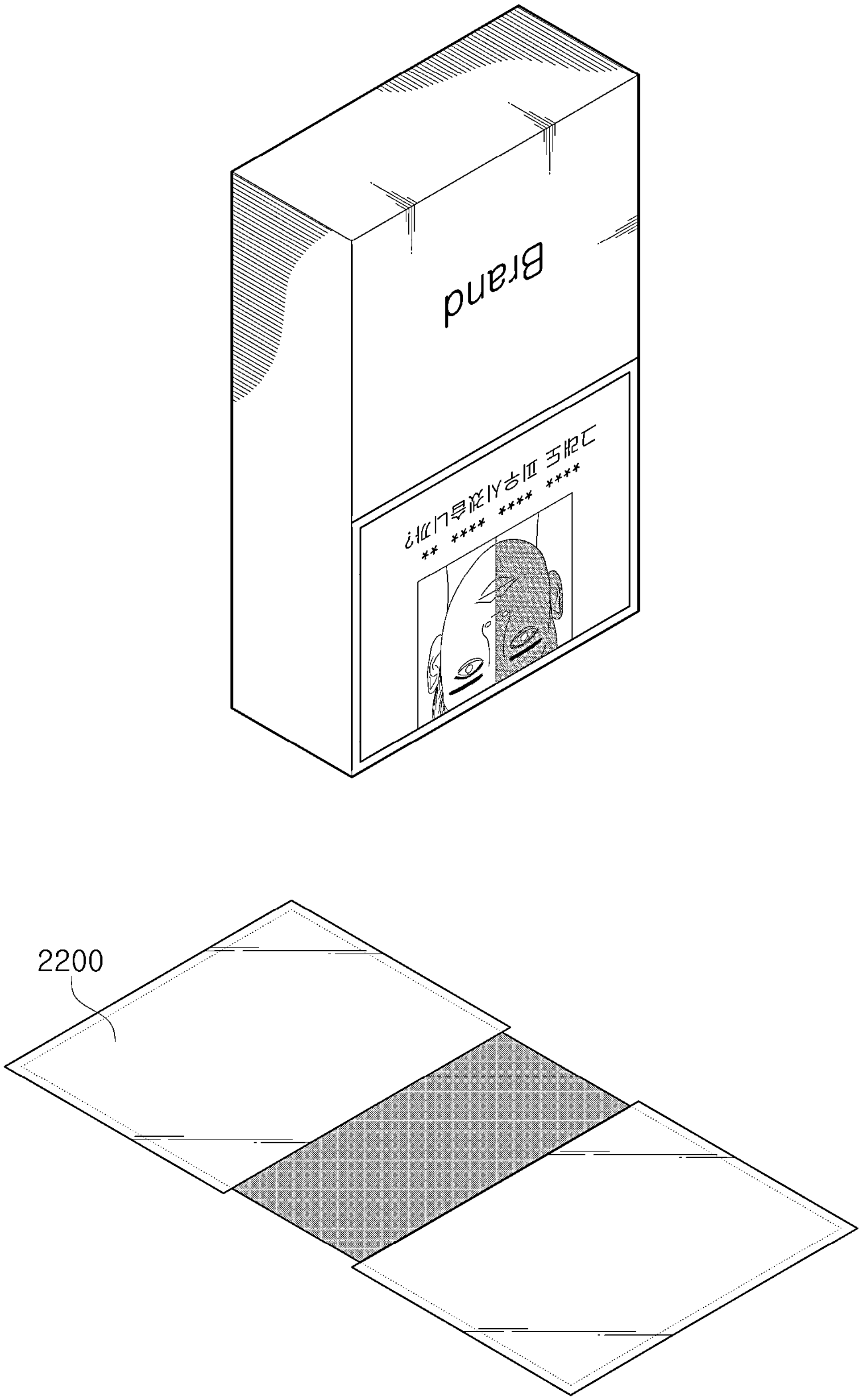
FIGS. 22A, 22B, 23 and 24 are views illustrating a process of attaching the cigarette pack sticker to the cigarette pack according to the second embodiment of the present disclosure.

Referring to FIGS. 22A, for a regular cigarette pack, the cigarette pack is disposed in a manner that a release paper (2200) of the cigarette pack sticker faces upward, and a center portion of the release paper (2200) is removed.

Figure 22B:
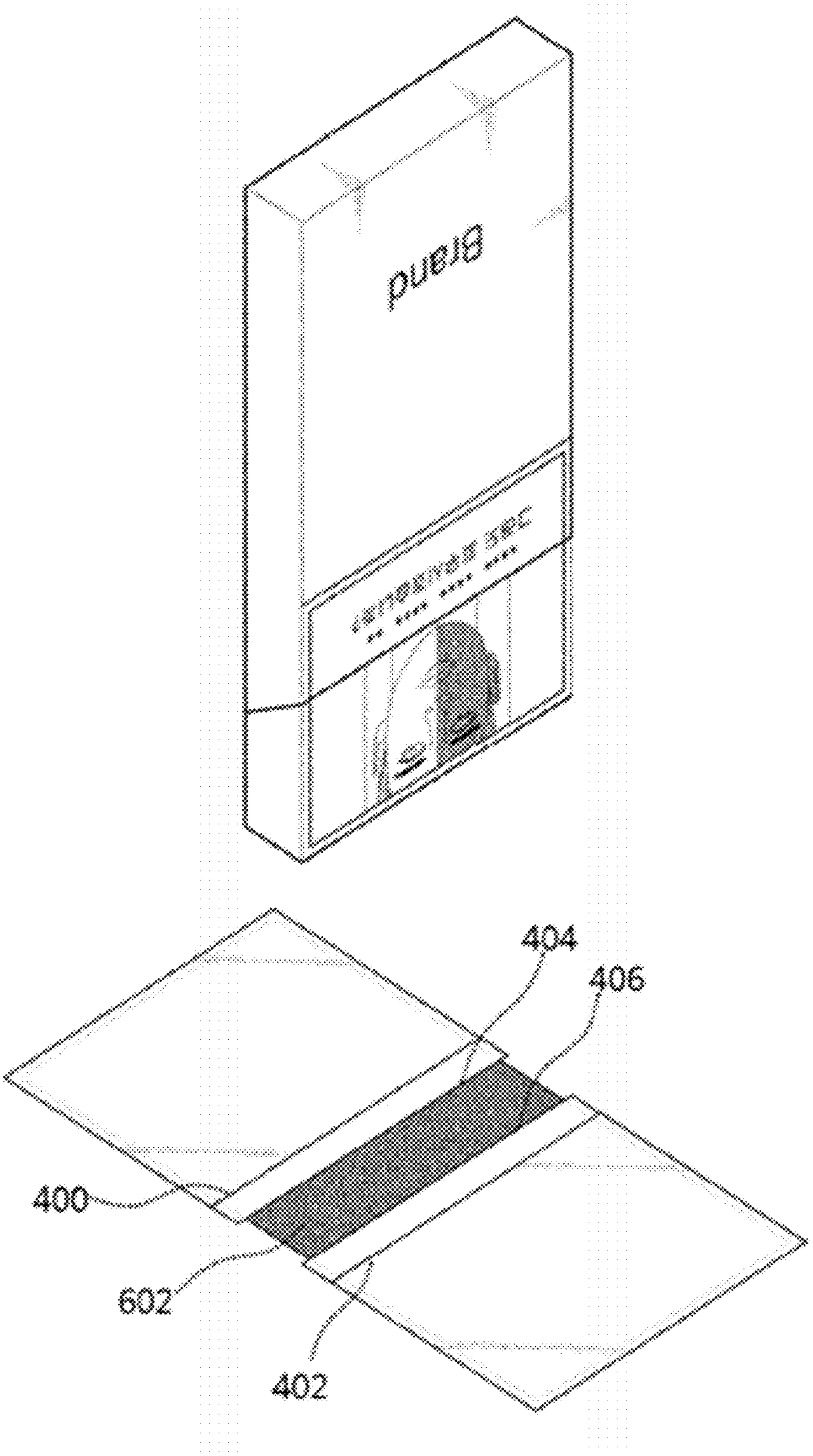

Referring to FIGS. 22B, for a slim cigarette pack, a portion of a release paper (2200) between secondary cutting portions (404, 406) is removed.

Figure 23:
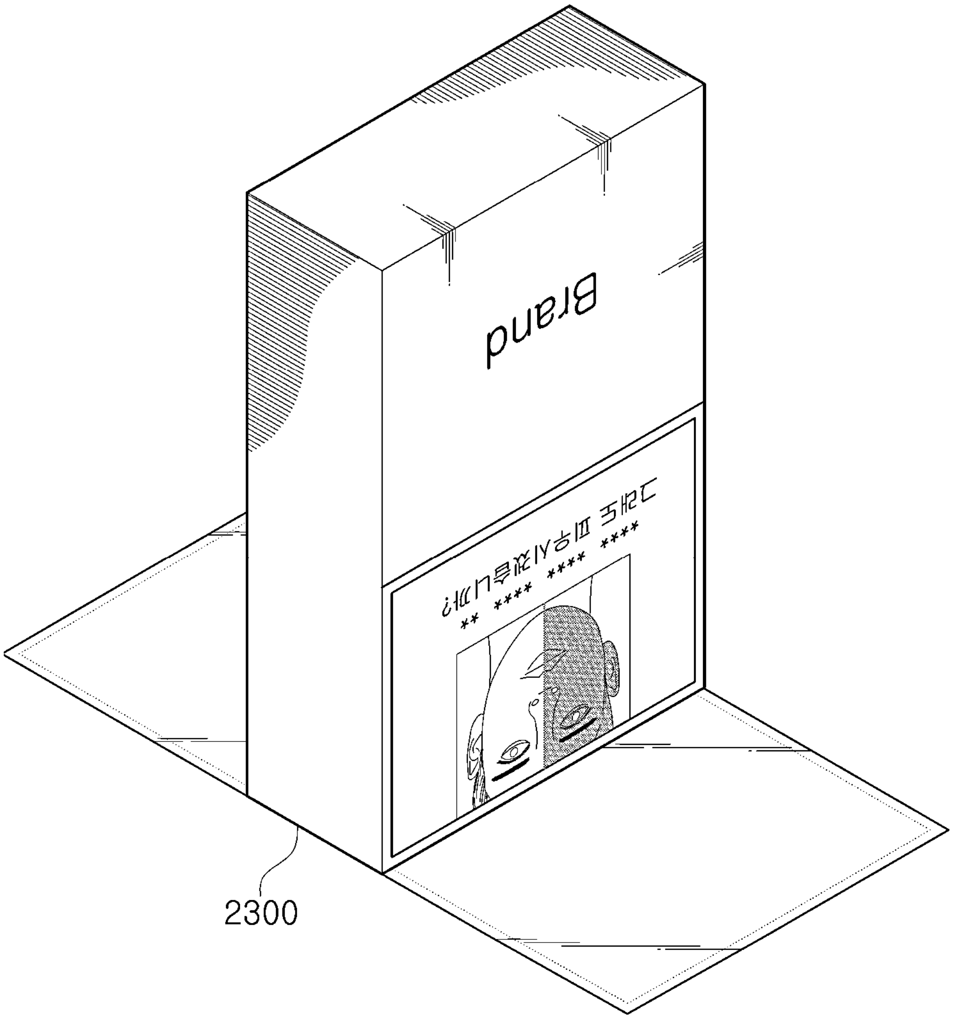

The distance between the cutting portions (400, 402) may be a distance corresponding to the longitudinal length of the top side of the regular cigarette pack. The distance between the secondary cutting portions (404, 406) may be a distance corresponding to the longitudinal length of the top side of the slim cigarette pack. Thus, a user removes the release paper corresponding to the longitudinal length of a top side of a cigarette pack to be attached, and precisely attaches the top side of the cigarette pack to the rear side of the cigarette pack sticker that has been open as shown in FIG. 23.

Figure 24:
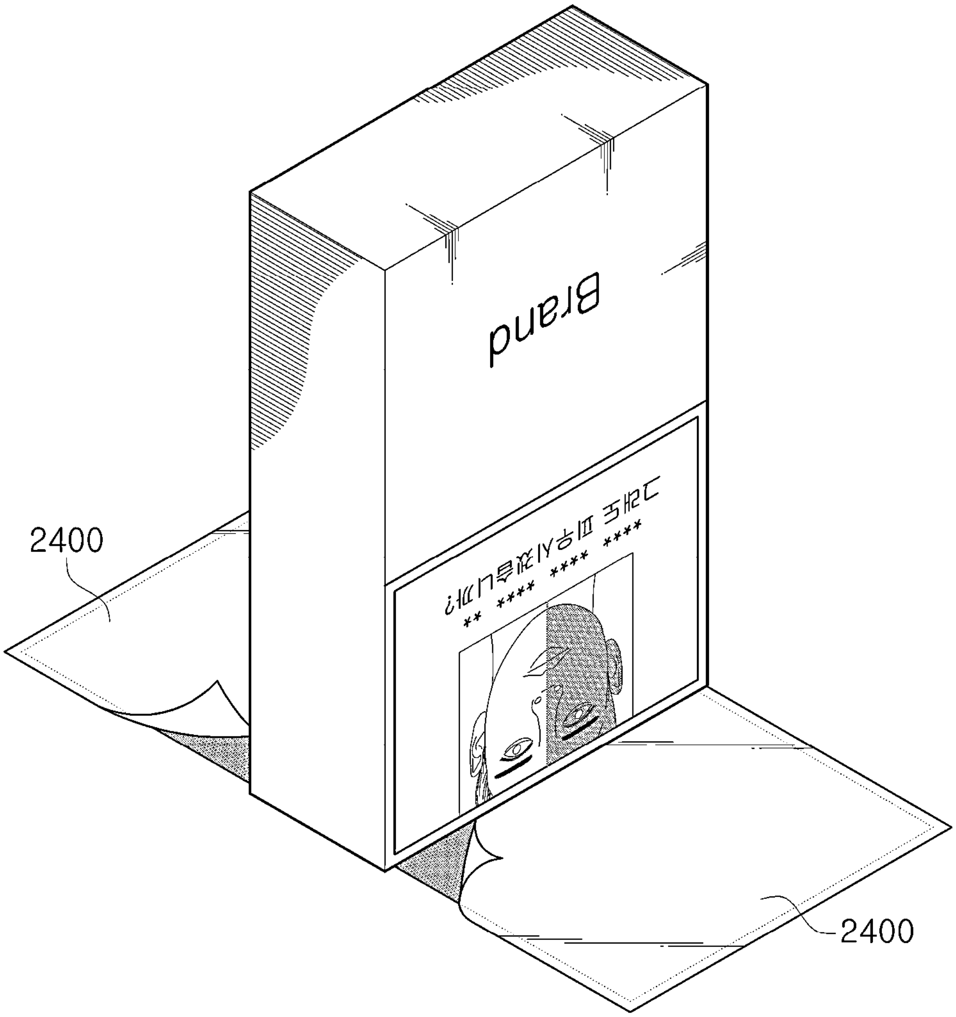

Since a transverse width of the top side of the cigarette pack is equal to the width of the release paper, a user can precisely attach the top side of the cigarette pack to the attachment portion of the cigarette pack sticker by measuring the width of the release paper based on the cigarette pack held from upside down. After attaching the cigarette pack to the sticker as shown in FIG. 24, the user removes a release paper (2400) from the cigarette pack sticker.

Figure 25:
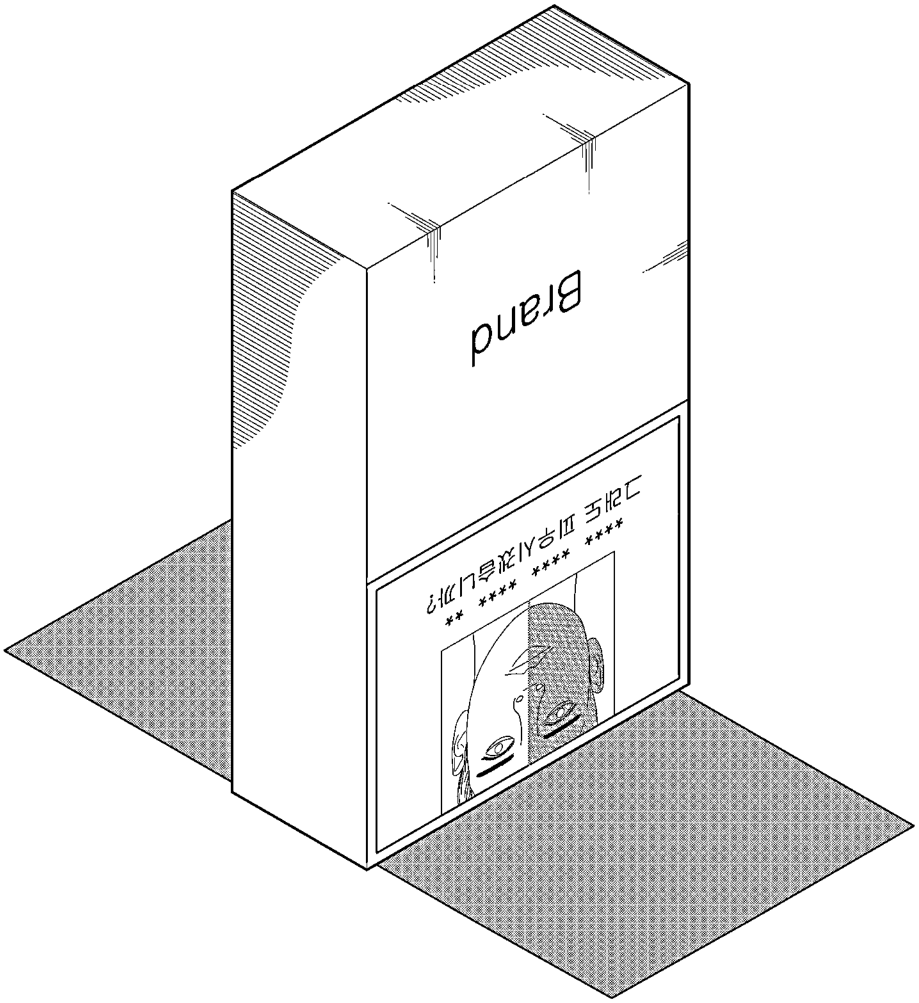
FIGS. 25 and 26 are views illustrating a process of attaching the cigarette pack sticker to a top side of the cigarette pack and attaching a remaining adhesive portion of the cigarette pack sticker to the cigarette pack according to the first or the second embodiment of the present disclosure.
Figure 26:
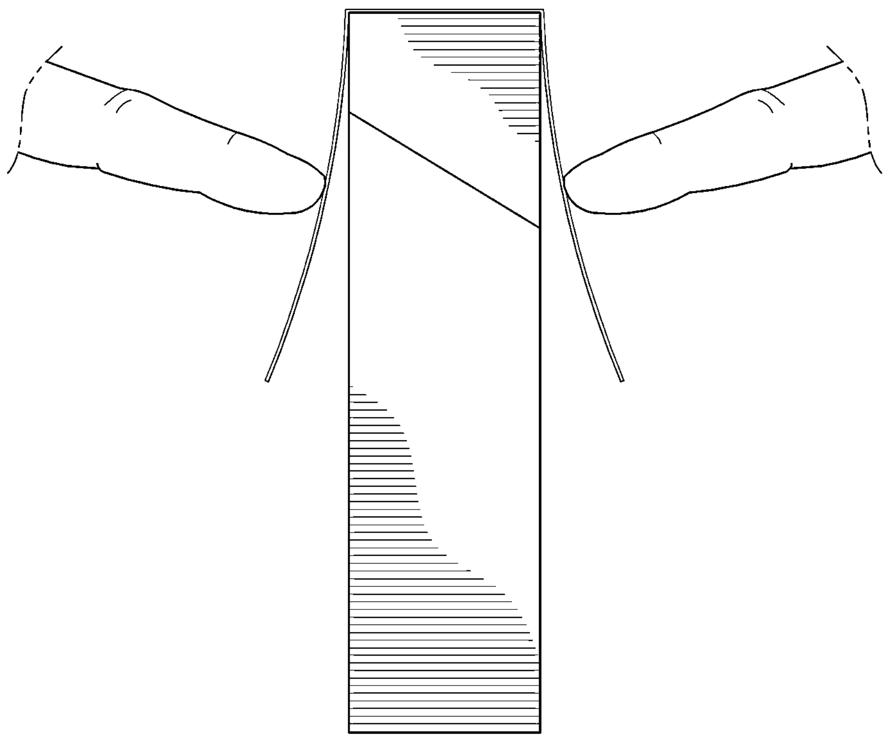

FIG. 25 illustrates a view of the cigarette pack sticker from which the release paper is completely torn off. FIG. 26 illustrates a process of attaching a remaining attachment portion of the cigarette pack sticker to the cigarette pack by a user. Referring to FIG. 26, after attaching the top side of the cigarette pack entirely to the attachment portion of the cigarette pack sticker, the remaining attachment portions of the cigarette pack sticker are attached to the front side and the rear side of the cigarette pack. The cigarette pack sticker is attached to the front and rear sides of the cigarette pack sticker based on an equal surface area.

The process of attaching a hard cigarette pack or a soft cigarette pack to the cigarette pack sticker is the same. However, the process of opening the cigarette pack differs between a hard cigarette pack and a soft cigarette pack. FIGS. 27 to 32 are views illustrating a process of opening a hard cigarette pack with a cigarette pack sticker attached thereto. FIGS. 33 to 38 are views illustrating a process of opening a soft cigarette pack with a cigarette pack sticker attached thereto.

Figure 27:
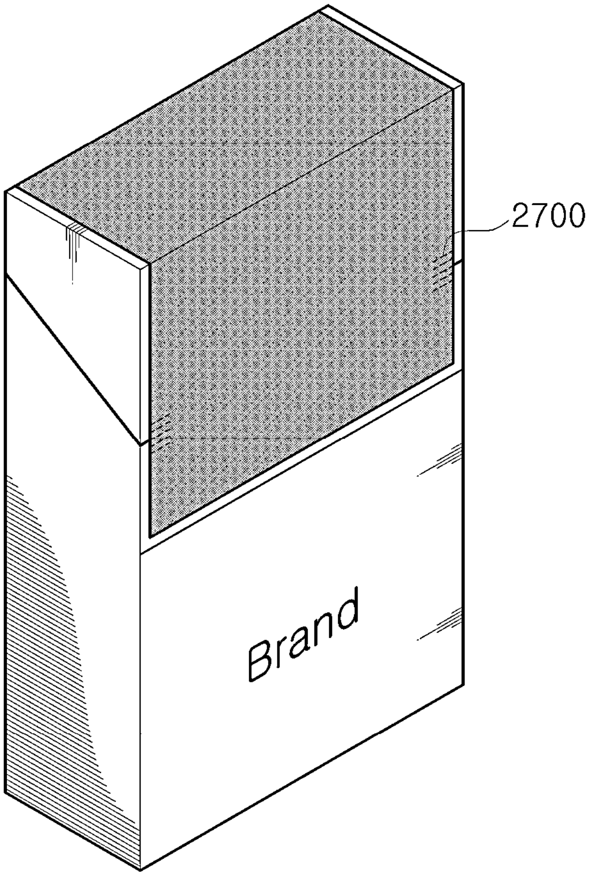
FIGS. 27 to 32 are views illustrating a process of opening a hard cigarette pack with a cigarette pack sticker attached thereto.

FIG. 27 shows a view of a cigarette pack sticker attached entirely to a hard cigarette pack. As mentioned above, it is assumed that an upper portion of a vinyl packaging of the hard cigarette pack is removed. The drawing reference numeral "2700" indicates a plurality of perforations formed in straight lines which cover immediately over the front edge of the cigarette pack. The zones with the plurality of perforations in linear arrays are in parallel with each other and at the same level with each other. Since these zones are symmetrical with each other based on the horizontal axis drawn across the middle of the cigarette pack sticker, a user may attach the cigarette pack sticker to the cigarette pack regardless of whether it is a front or rear side of the cigarette pack sticker.

Figure 28:
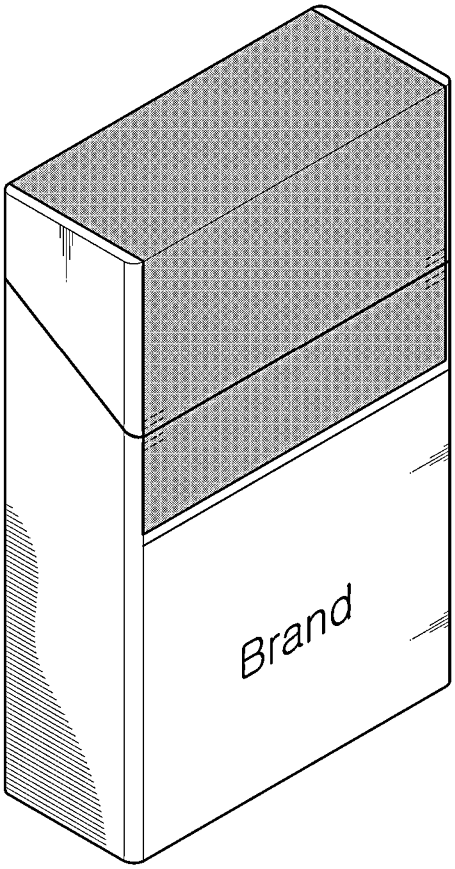

FIG. 28 illustrates a view of a cigarette pack sticker attached to a rounded, chamfered cigarette pack. Referring to FIG. 28, a width of the cigarette pack sticker is less than a width of a release paper, and thus, the cigarette pack sticker can be readily attached to the chamfered cigarette pack.

Figure 29:
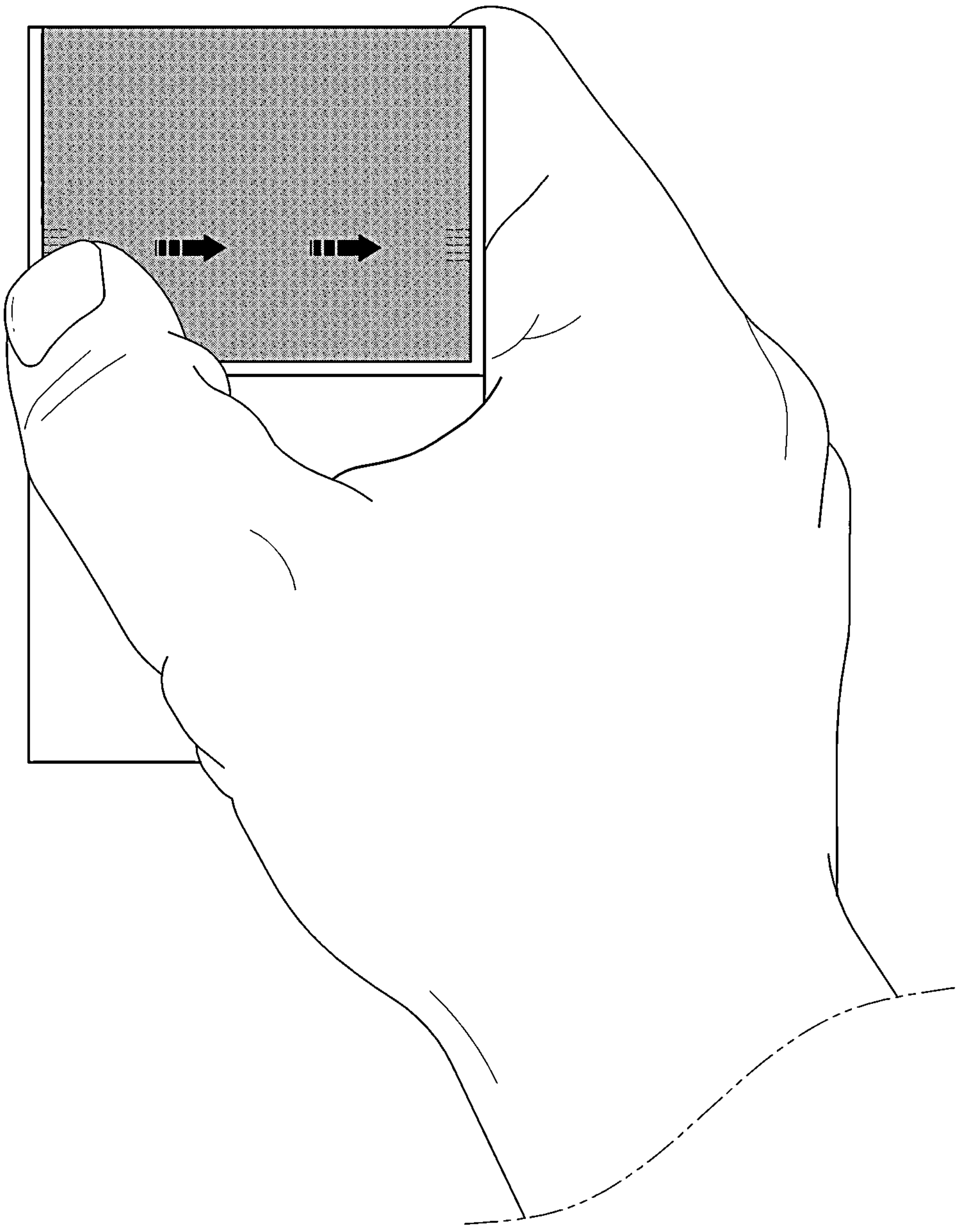
Figure 30:
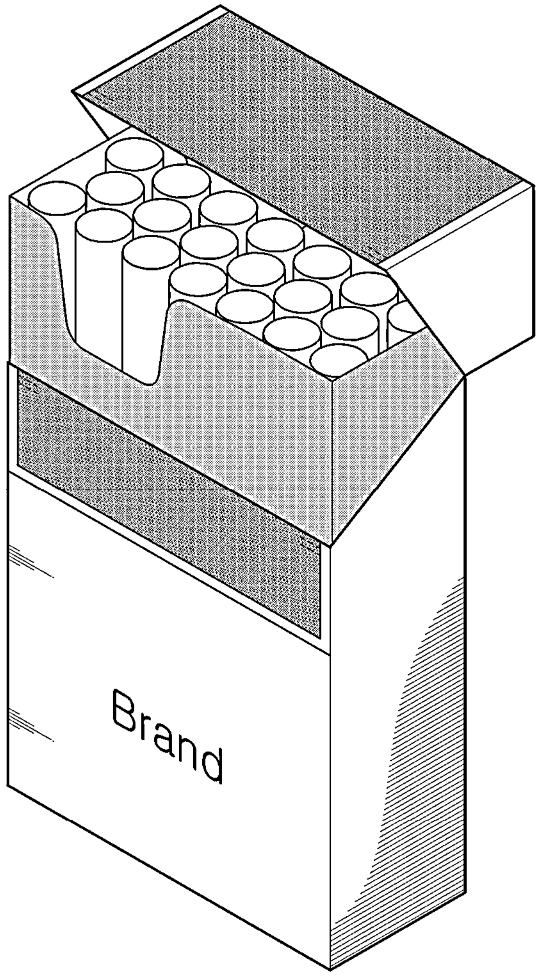

FIG. 29 illustrates a view of opening a zone formed with a plurality of perforations in linear arrays, that is, a zone bordering with a front edge of a cigarette pack, by pressing the zone including the plurality of perforations with the fingernail of a user. In this instance, it is assumed that the user cuts open along a cutting line from a left side to a right side of the cutting line. As shown in FIG. 29, if the cigarette pack sticker is a commercial brochure (made of vinyl material), it would be difficult to cut open the sticker. In such case, perforations would be necessary. FIG. 30 illustrates a view of opening a cover of the cigarette pack after tearing off the cigarette pack sticker along the front edge of the cigarette pack by the user.

Figure 31:
Figure 32:
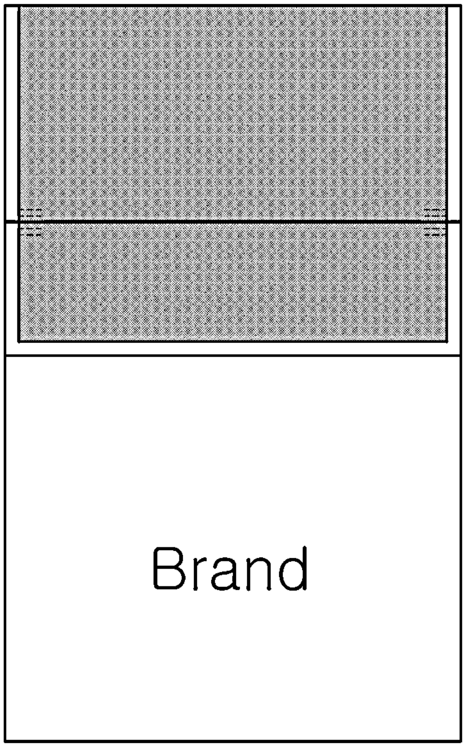

FIGS. 31 and 32 illustrate views of a cigarette pack before and after a cigarette pack sticker being attached thereto, respectively. Referring to FIG. 32, the cigarette pack sticker entirely covers a warning image and a warning text and opens a cover of the cigarette pack without any difficulty.

Figure 33:
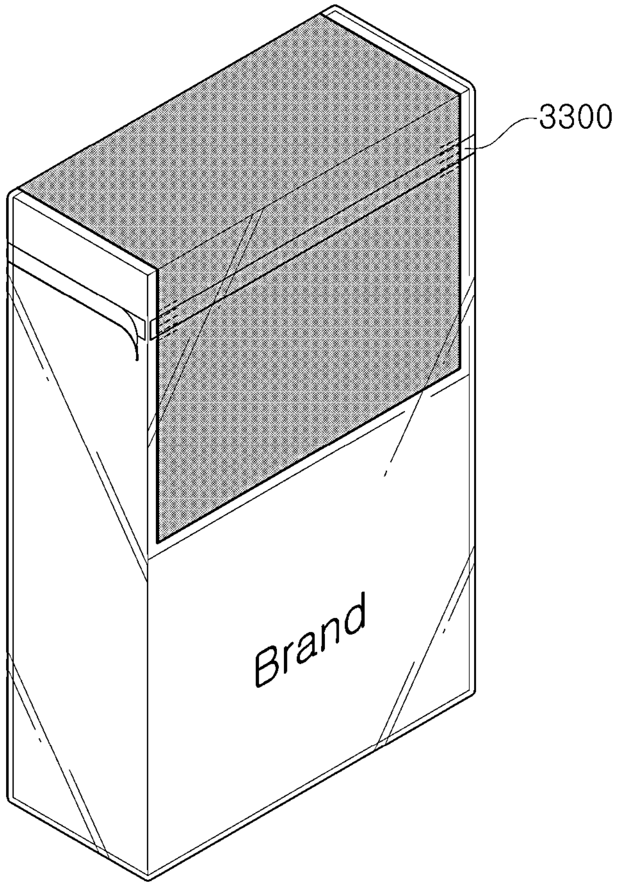
FIGS. 33 to 38 are views illustrating a process of opening a soft cigarette pack with a cigarette pack sticker attached thereto.
Figure 34:
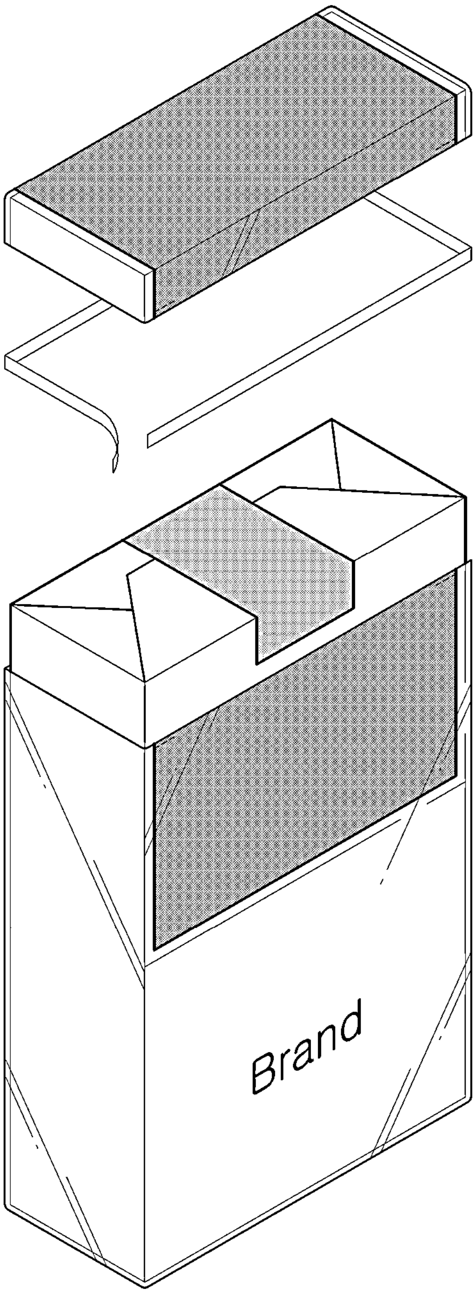

FIG. 33 illustrates a view of a soft cigarette pack after a cigarette pack sticker being entirely attached thereto. In this instance, it is assumed that a user does not remove a vinyl packaging off the cigarette pack. The drawing reference numeral "3300" indicates perforations which cover immediately over a tear strap of a vinyl packaging. The zones including the perforations are positioned at the same level in parallel with each other. Since these zones are symmetrical with each other based on the horizontal axis, a user may attach the cigarette pack sticker to the cigarette pack regardless of whether it is a front or rear side of the cigarette pack sticker. FIG. 34 illustrates a view of the cigarette pack sticker after the vinyl packaging being removed therefrom using a tear strap, wherein a portion of the sticker and the vinyl packaging are removed.

Figure 35:
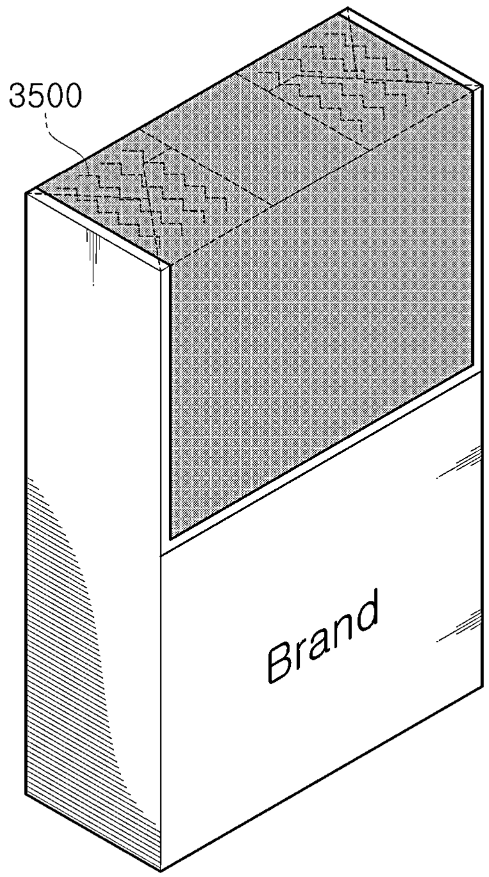
Figure 36:
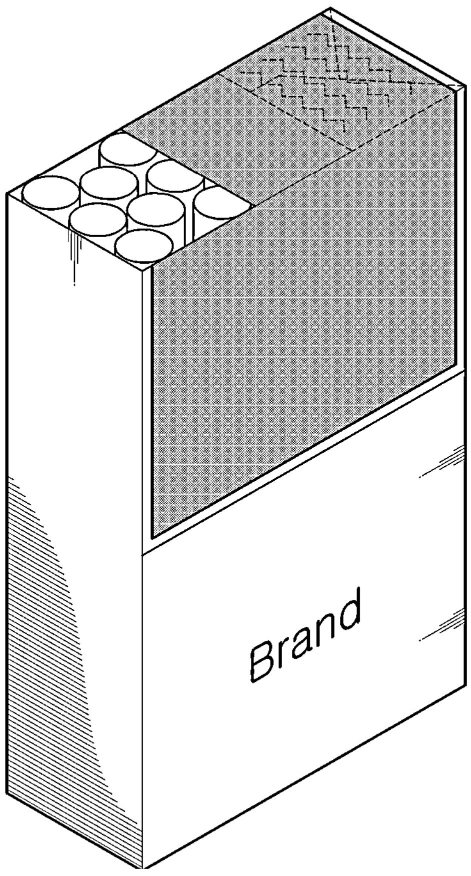

FIG. 35 illustrates views of the cigarette pack sticker being attached to the cigarette pack before and after. In this instance, it is assumed that the sticker of FIG. 14 is used. The drawing reference numeral "3500" indicates perforations in a zigzag array, which cover immediately over a top cover packaging of the cigarette pack. A user removes a portion of the zone including the perforations with his/her fingernail, and then removes the top cover packaging off the cigarette pack. FIG. 36 illustrates a view of the cigarette pack after the user removes the cover packaging off the cigarette pack.

Figure 37:
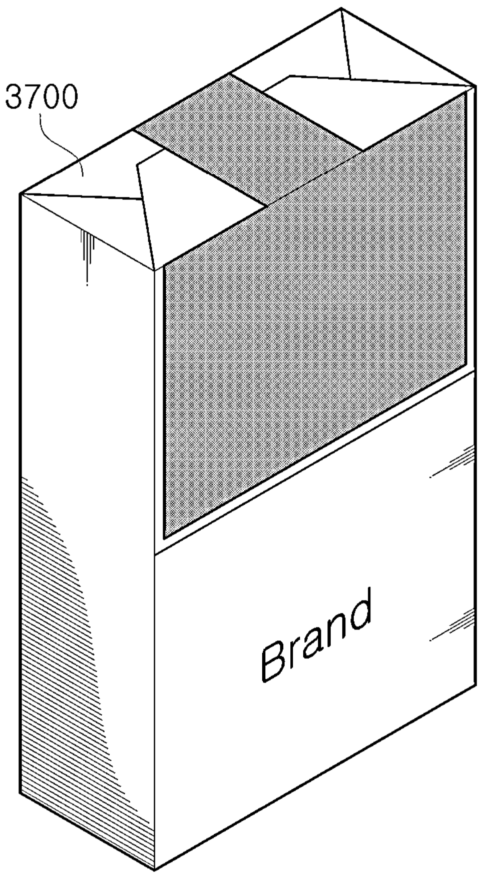
Figure 38:
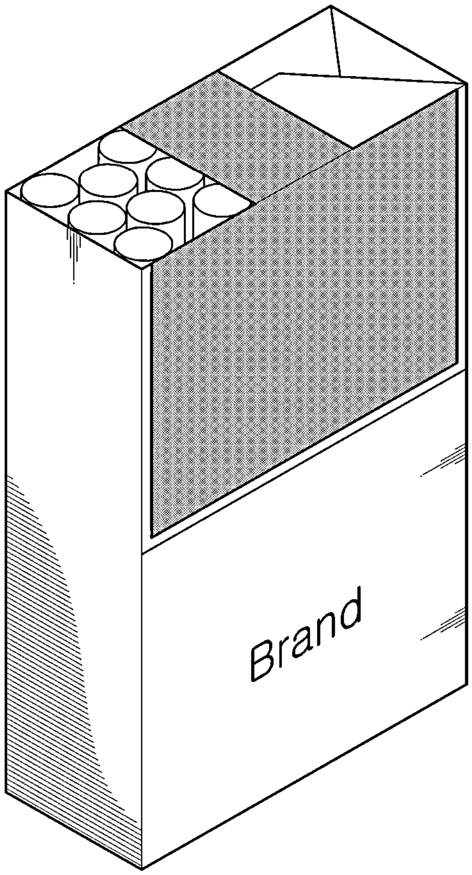

FIG. 37 illustrates a view of the cigarette pack sticker being entirely attached to the cigarette pack. In this instance, it is assumed that the sticker of FIG. 15 is used. The drawing reference numeral "3700" indicates a view of the cigarette pack sticker that covers a portion of the top side being removed partially. As shown in FIG. 15, since perforations are provided in a flat U-shape at the center portion of the cigarette pack sticker, the zone including the perforations may be readily torn off (the zone with the perforations precisely cover the cover packaging). FIG. 38 illustrates a view of the cigarette pack being removed of the cover packaging off the cigarette pack.

Figure 39:
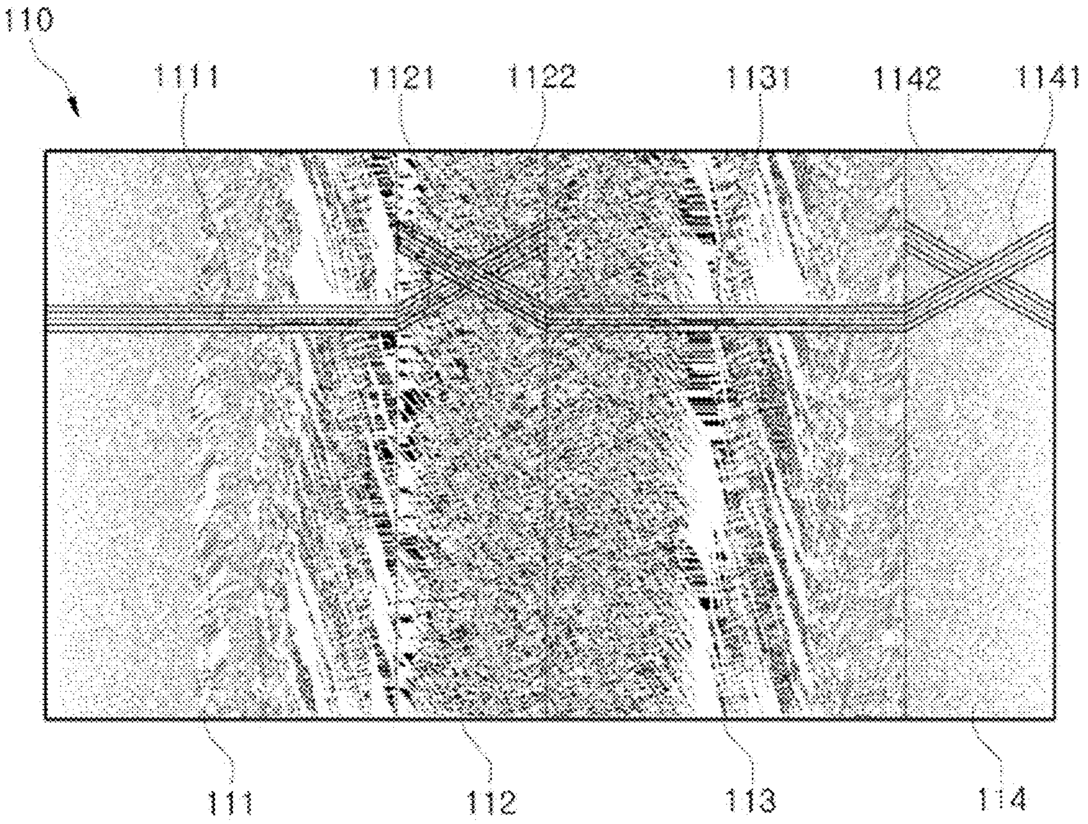
FIGS. 39 and 40 illustrate a front view of a cigarette pack sticker according to the third embodiment of the present disclosure.

Referring to FIG. 39, the cigarette pack sticker (110) according to the third embodiment of the present disclosure is designed to wrap around the cigarette pack. The cigarette pack sticker (110) includes a first cover portion (111) to cover that covers the warning image and text and is attached to either the front or rear side of the cigarette pack. A first lateral side attachment portion (112) extends from the first cover portion (111) and is attached to one lateral side of the cigarette pack. A second cover portion (113) extends from the first lateral side attachment portion (112), also covering the warning image and text, and is attached to the opposite side of the cigarette pack. Finally, a second lateral side attachment portion (114) extends from the second cover portion (113) and is attached to the other lateral side of the cigarette pack, thus wrapping around the entire cigarette pack, except for the top and bottom sides.

The cigarette pack sticker may also include perforations to guide the user tearing the cigarette pack sticker once attached to the cigarette pack. Referring to FIG. 39, perforations (1111, 1121, 1122, 1131, 1141, 1142) may be formed in the first cover portion (111), the first lateral side attachment portion (112), the second cover portion (113), and the second lateral side attachment portion (114), respectively. Theses perforations allow the user to tear the sticker easily, eliminating the need to distinguish between the front and rear sides of the cigarette pack when attaching the cigarette pack sticker.

Referring to FIG. 39, the cigarette pack sticker (110) includes multiple perforations strategically positioned to facilitate easy tearing. The first central perforations (1111) are located on the first cover portion (111), aligned with either the front or rear face of the cigarette pack. In contrast, the second central perforations (1131) are positioned on the second cover portion (113), aligned with the opposite face of the cigarette pack relative to the first central perforations (1111). Extending laterally from the second central perforations (1131) are the first lateral side perforations (1121, 1141), positioned on the first and second lateral side attachment portions (112, 114), following the lateral cutting lines along both sides of the cigarette pack. Additionally, the second lateral side perforations (1122, 1142) are formed diagonally to intersect with the first lateral side perforations (1121, 1141). These second lateral side perforations (1122, 1142) extend from the first central perforations (1111) when the cigarette pack sticker is wrapped around the cigarette pack. The arrangement of the intersecting perforations on the lateral sides of the cigarette pack sticker ensures that the user can attach the sticker without needing to distinguish between the front and rear faces of the cigarette pack, as the perforations are symmetrically designed to allow tearing from either side.

The portions of the cigarette pack sticker that contain the perforations (1111, 1121, 1122, 1131, 1141, 1142) can be easily torn by the user's fingernails or similar tools, allowing for easy opening of the lid of the cigarette pack. These perforations (1111, 1121, 1122, 1131, 1141, 1142) may be provided as a plurality of continuous lines, as shown in FIG. 39, or alternatively as discontinuous lines spaced at regular intervals to facilitate tearing.

Figure 40:
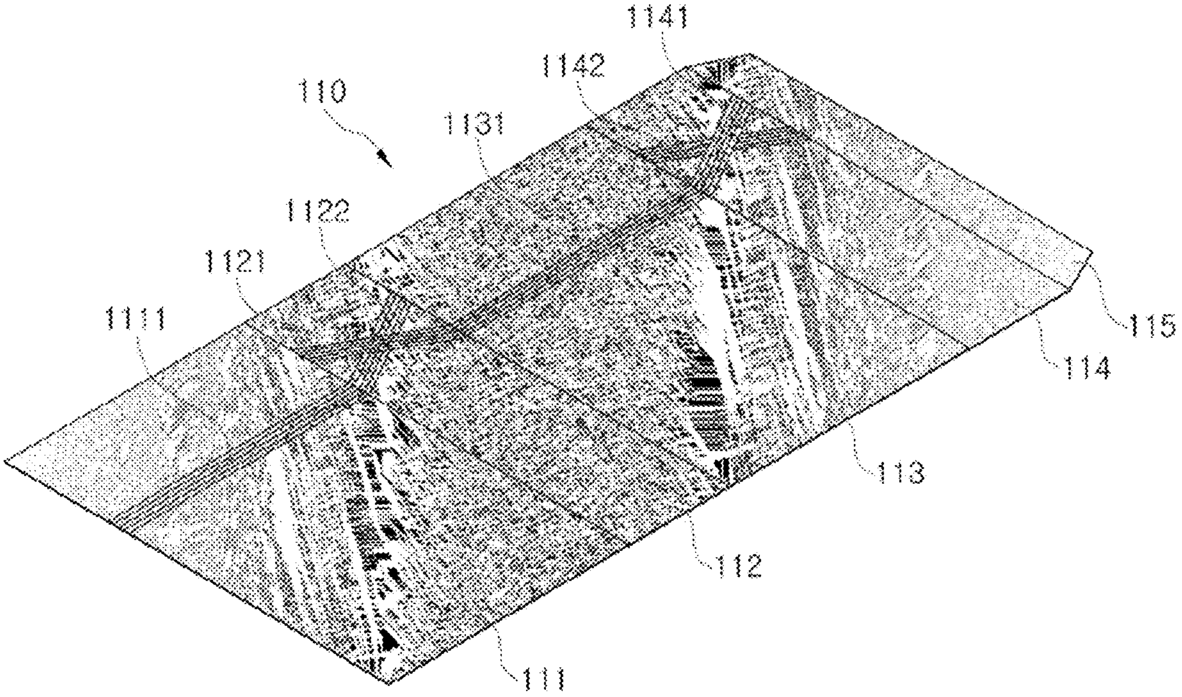

Referring to FIG. 40, the cigarette pack sticker (110) may further include a first auxiliary cover portion (115) that extends from the second lateral side attachment portion (114). The first auxiliary cover portion (115) is designed to be attached to either the front or rear side of the cigarette pack, depending on the user's preference.

Figure 41:
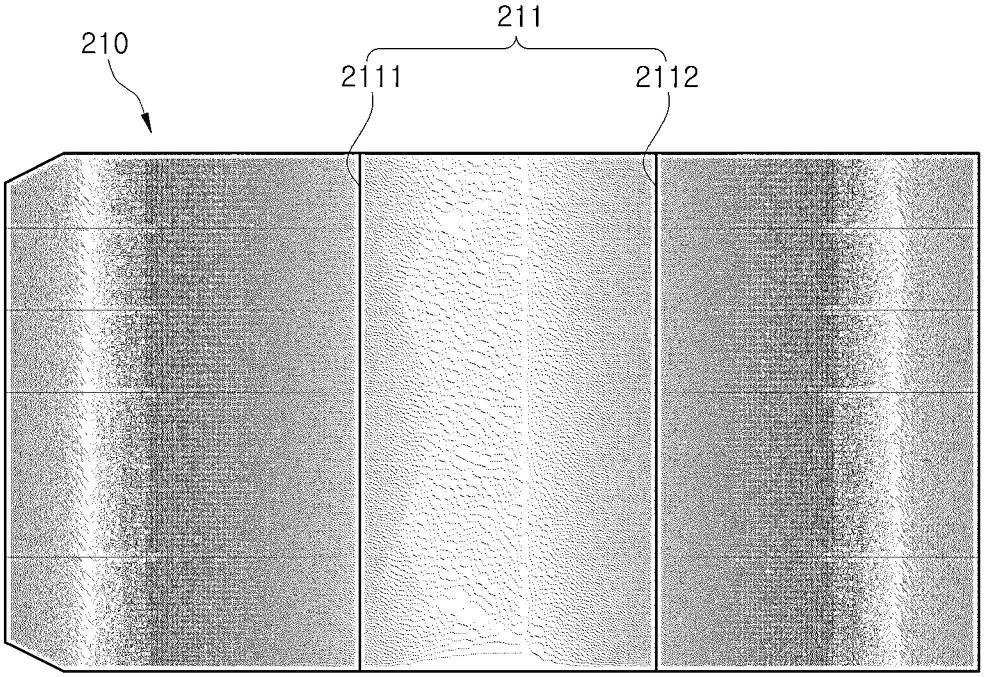
FIG. 41 illustrates an example of a release paper attached to the cigarette pack sticker according to the third embodiment of the present disclosure.
Figure 43:
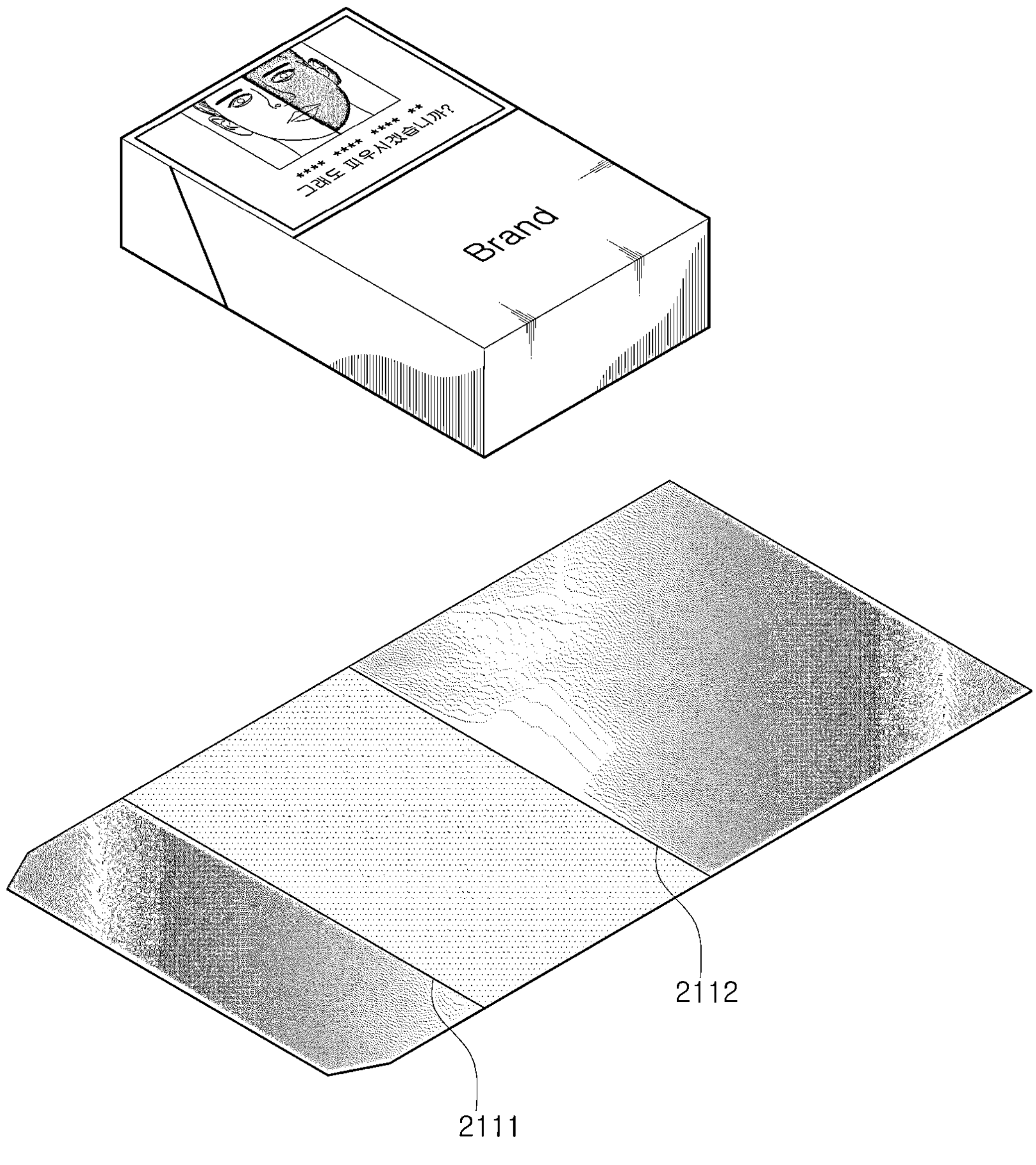
FIG. 43 illustrates an example of using the release paper of FIG. 41.

The cigarette pack sticker includes an adhesive material on its rear side, which isprotected by a release paper. Referring to FIGS. 41 and 43, the release paper (210) includes an attachment position guide (211) to help align the front or rear side of the cigarette pack with the rear side of the cigarette pack sticker when the user peels the release paper (210) off.

Referring to FIGS. 41 and 43, the attachment position guide (211) includes two cutting portions (2111, 2112) to divide the release paper into three segments. The distance between the two cutting portions (2111, 2112) corresponds to the width of the top side of the cigarette pack. Initially, the portion of the release paper between the two cutting portions (2111, 2112) is removed, and the cigarette pack is then attached to the adhesive area between the two cutting portions (2111, 2112), ensuring precise alignment with the intended position on the rear side of the cigarette pack sticker, corresponding to the attachment position guide (211).

Figure 42:
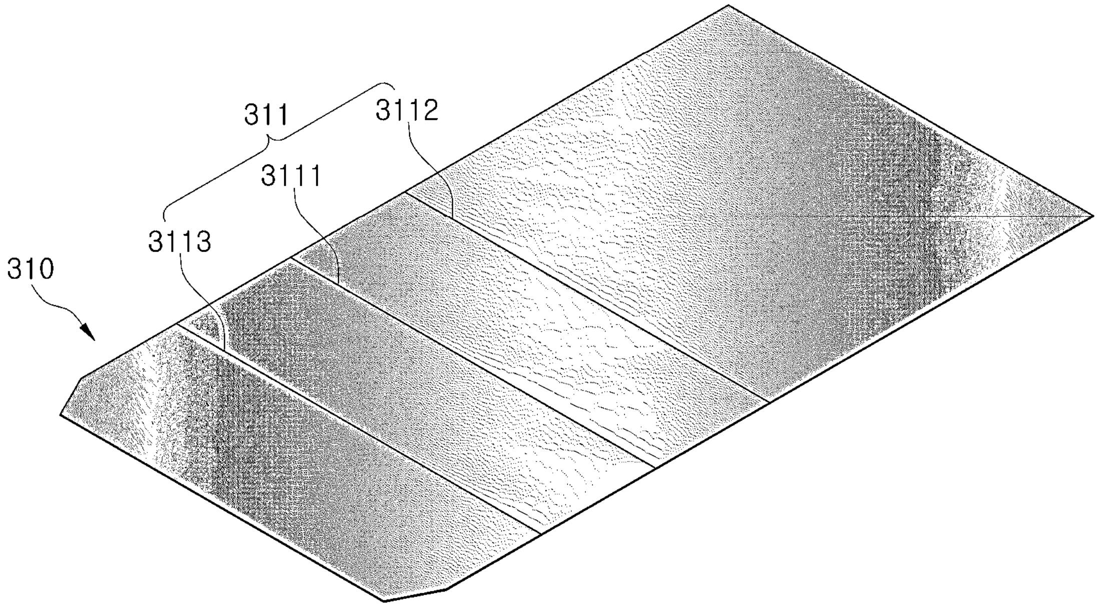
FIG. 42 illustrates another example of a release paper attached to the cigarette pack sticker according to the third embodiment of the present disclosure.
Figure 44:
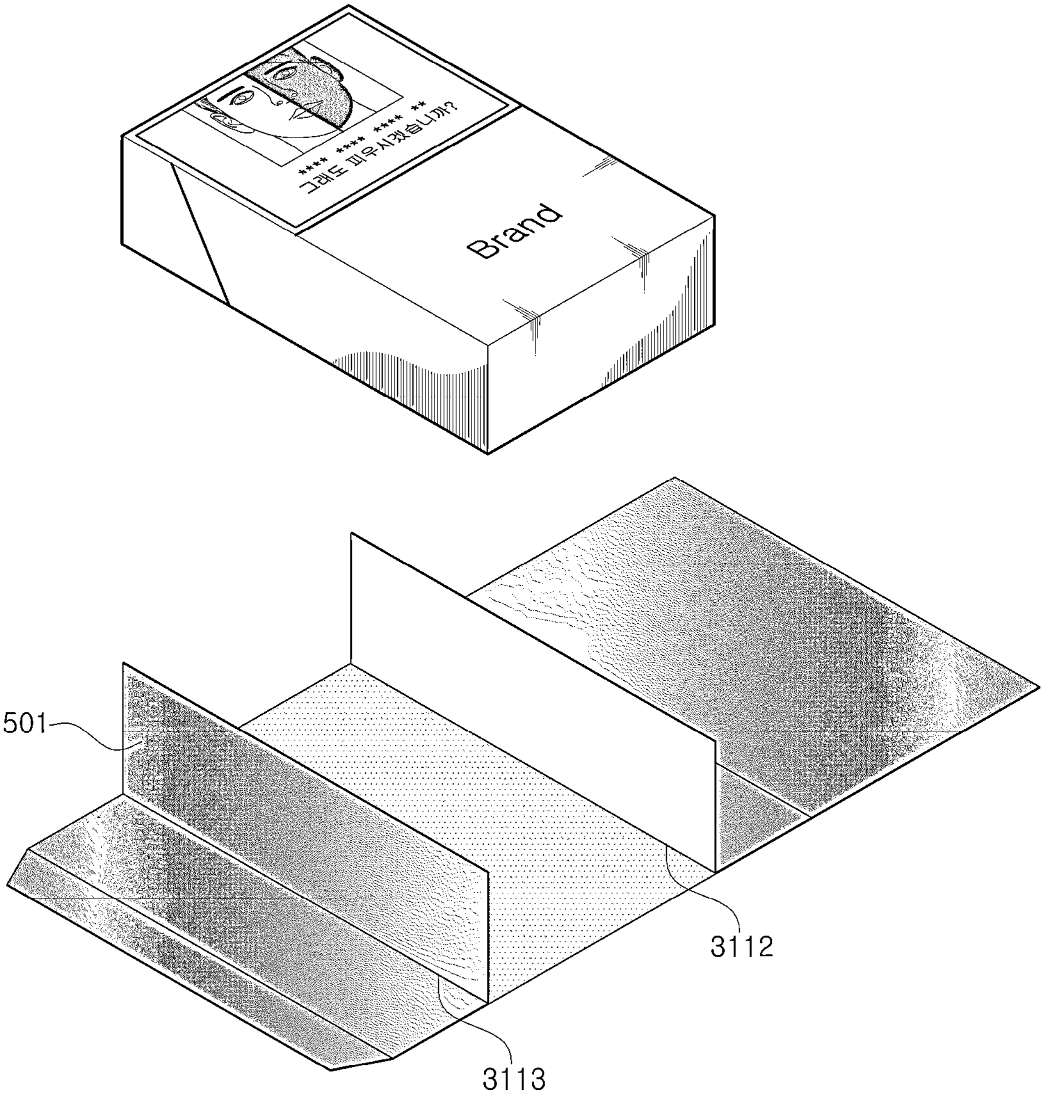
FIG. 44 illustrates an example of using the release paper of FIG. 42.

Referring to FIGS. 42 and 44, in another aspect of the third embodiment of the present disclosure, an attachment position guide (311) includes a central cutting portion (3111) that divides the release paper (310) and two folding guides (3112, 3113) on either side of the cutting portion (3111). These two folding guides (3112, 3113) help the release paper fold along pre-scored or perforated lines, allowing an easy folding of the release paper along the folding guides (3112, 3113). The distance between the two folding guides (3112, 3113) correspond to the width of the front side of the cigarette pack, ensuring easy and proper alignment.

Referring to FIG. 44, the release paper tear ends (501) folded along the two folding guides (3112, 3113) serves to guide the cigarette pack into position. As the cigarette pack is inserted between the release paper tear ends (501), it is precisely attached to the intended position on the rear side of the cigarette pack sticker, corresponding to the attachment portion guide (211) between the two folding guides (3112, 3113).

Figure 45:
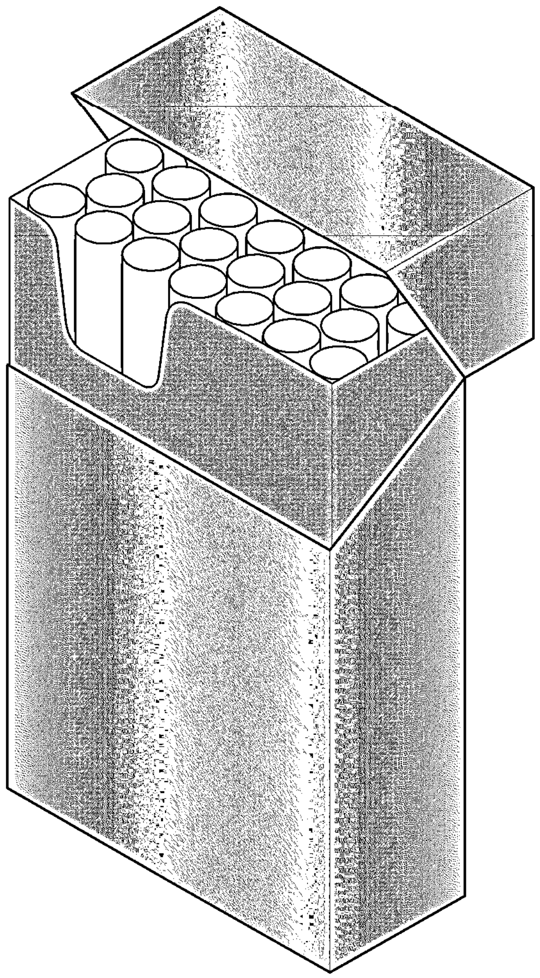
FIGS. 45 and 46 are views illustrating a process of opening a hard cigarette pack attached with the cigarette pack sticker of FIG. 39.
Figure 46:
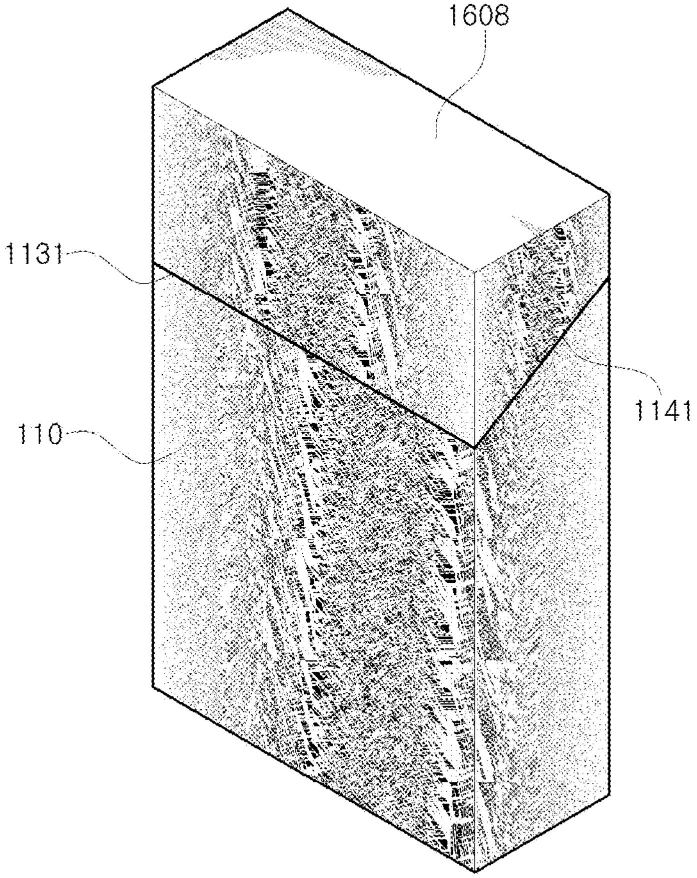

Referring to FIGS. 45 and 46, the hard cigarette pack, covered by the cigarette pack sticker (110), exposes the top side (1608) of the cigarette pack. To open the cigarette pack, the user presses along the perforations (1121, 1131, 1141, or alternatively 1111, 1122, 1142) of the cigarette pack sticker (110), which correspond to the cutting lines on the front and lateral sides of the cigarette pack, using a fingernail or similar tool. The user can tear open the lid of the hard cigarette pack along these perforations. Although FIGS. 45 and 46 illustrate the perforations (1131, 1141) in a single line, multiple lines of perforations (1131, 1141) can also be provided to facilitate easier tearing.

Figure 47:
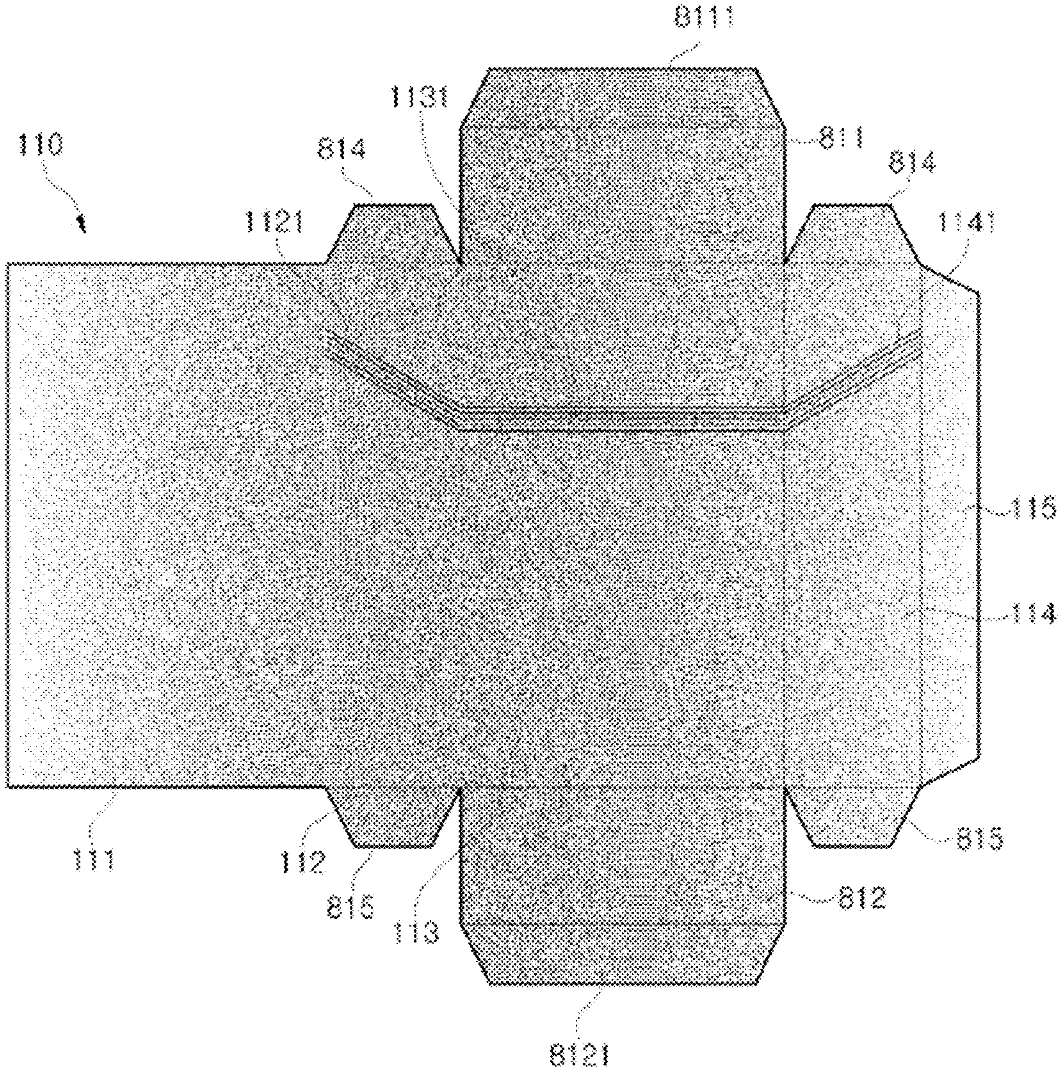
FIGS. 47 and 48 illustrate front views of a cigarette pack sticker according to the fourth embodiment of the present disclosure.

Referring to FIG. 47, the cigarette pack sticker (110) according to the fourth embodiment of the present disclosure differs from the third embodiment by further including a top-side attachment portion (811) extending from the upper section of the second cover portion (113), which is attached to the top side of the cigarette pack, and a bottom-side attachment portion (812) extending from the lower section of the second cover portion (113), which is affixed to a bottom side of the cigarette pack.

According to the aforesaid aspect, the cigarette pack sticker (110) is configured to cover the entire surface of the cigarette pack, including both the top and bottom sides. This configuration provides a more aesthetically pleasing appearance. Moreover, the cigarette pack sticker (110) can fully conceals any advertisements, warning texts, or images that may be displayed on any surface of the cigarette pack.

The cigarette pack sticker (110), according to the aforesaid aspect, may further include a second auxiliary cover (8111) extending from the top-side attachment portion (811) and a third auxiliary cover (8121) extending from the bottom-side attachment portion (812). These auxiliary covers (8111, 8121) are attached to the rear or opposite side of the cigarette pack, ensuring seamless coverage.

Additionally, the cigarette pack sticker (110) may further include a fourth auxiliary cover (814) extending from the upper sections of the first and the second lateral side attachment portions (112, 114), and a fifth auxiliary cover (815) extending from the lower sections of these attachment portions. The fourth auxiliary cover (814) attaches to the top-side of the cigarette pack, and the fifth auxiliary cover (815) is attached to the bottom side, also ensuring seamless coverages.

The first lateral side attachment portion (112), the second cover portion (113), and the second lateral side attachment portion (114) may have perforations (1121, 1131, 1141). The perforations (1131) in the second cover portion (113) align with the front cutting line of the cigarette pack, while the perforations (1121, 1141) of the lateral side attachment portions (112, 114) extending from the perforations (1131) align with the lateral cutting lines of the cigarette pack.

Figure 48:
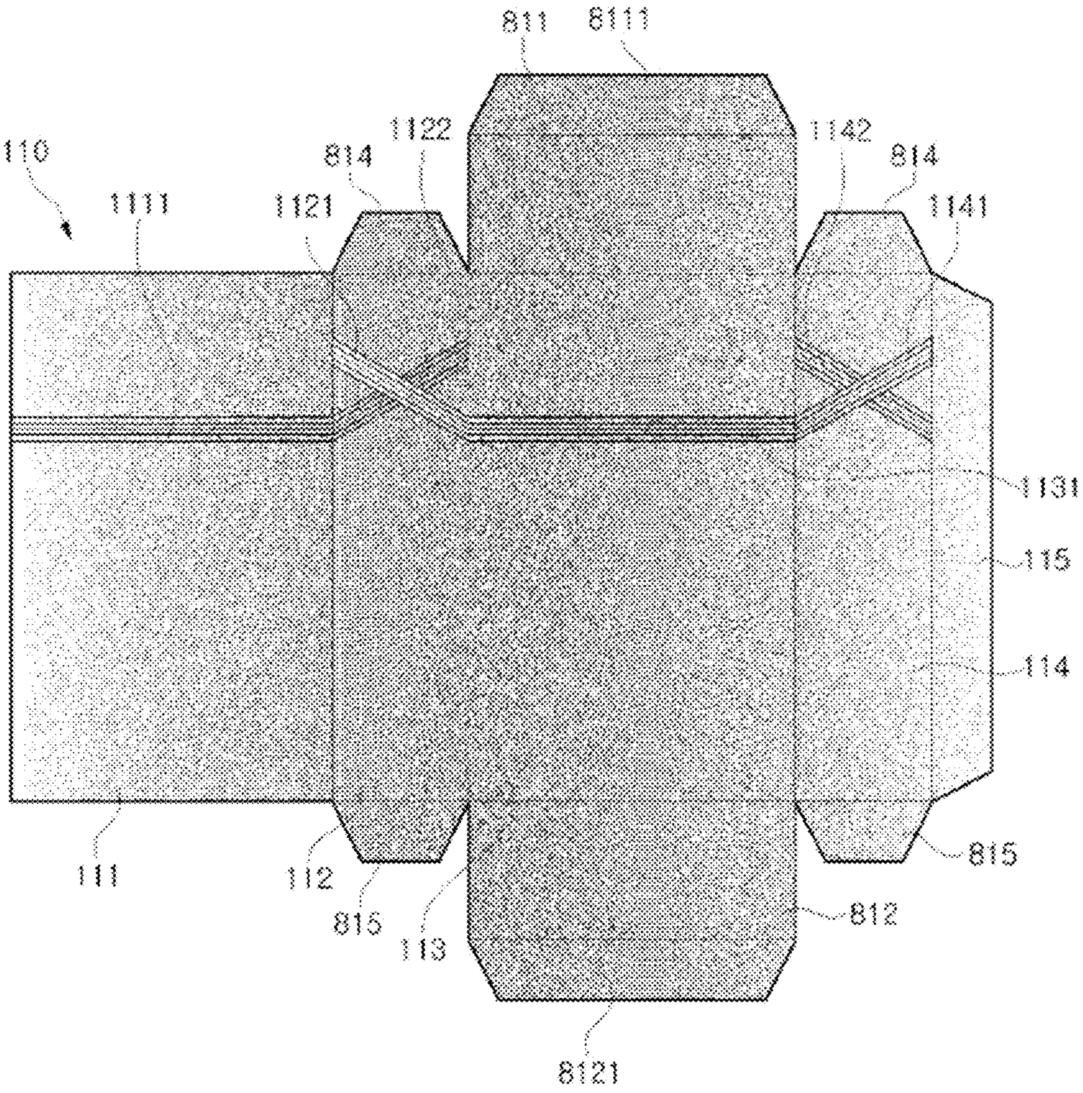

The design of the cigarette pack sticker (110) in FIG. 47 is intended for attachment of the second cover portion (113) specifically to the front side of the cigarette pack, while the design of the cigarette pack sticker (110) in FIG. 48 allows the second cover portion (113) to be attached to either the front or rear side of the cigarette pack.

Referring to FIG. 48, another aspect of the cigarette pack sticker (110) according to the fourth embodiment of the present disclosure also includes a second auxiliary cover portion (8111) extending from the top-side attachment portion (811) and a third auxiliary cover portion (8121) extending from the bottom-side attachment portion (812). The second auxiliary cover portion (8111) and the third auxiliary cover portion (8121) are designed to be attached to either the front or rear side of the cigarette pack.

The cigarette pack sticker (110) may also include a fourth auxiliary cover portion (814) extending from upper sections of the first lateral side attachment portion (112) and the second lateral side attachment portion (114), as well as a fifth auxiliary cover portion (815) extending from the lower sections of these lateral side attachment portions (112, 114). The fourth auxiliary cover portion (814) is designed to be attached to the top-side of the cigarette pack, while the fifth auxiliary cover portion (815) is designed to be attached to the bottom side of the cigarette pack.

The first cover portion (111), the first lateral side attachment portion (112), the second cover portion (113), and the second lateral side attachment portion (114) may include perforations (1111, 1121, 1122, 1131, 1141, 1142). The perforations (1111, 1131) in the first and second cover portions (111, 113) are positioned to align with the front cutting line of the cigarette pack. The perforations of the first and second lateral side attachment portions (112, 114) include first lateral side perforations (1121, 1141) extending from the perforations (1131) in the second cover portion (113) and positioned along the lateral cutting lines of the cigarette pack, and second lateral side perforations (1122, 1142) formed diagonally to the first lateral side perforations (1121, 1141), extending from the perforations (1111) in the first cover portion (111) and aligned with the lateral cutting lines of the cigarette pack.

The perforations (1111, 1121, 1122, 1131, 1141, 1142) in the cigarette pack sticker are designed to be easily torn, allowing the user to expose the cutting line in the cigarette pack. Once the cutting line in the cigarette pack is exposed, the user may open the lid of the cigarette pack. The perforations (1111, 1121, 1122, 1131, 1141, 1142) may be arranged in multiple lines, spaced apart from each other in a vertical direction.

Referring to FIG. 48, the cigarette pack sticker (110) includes perforations (1111, 1131) not only in the first cover portion (111) but also in the second cover portion (113). This design allows the user to avoid the inconvenience of having to distinguish between the front and rear sides of the cigarette pack when applying the cigarette pack sticker.

Figure 49:
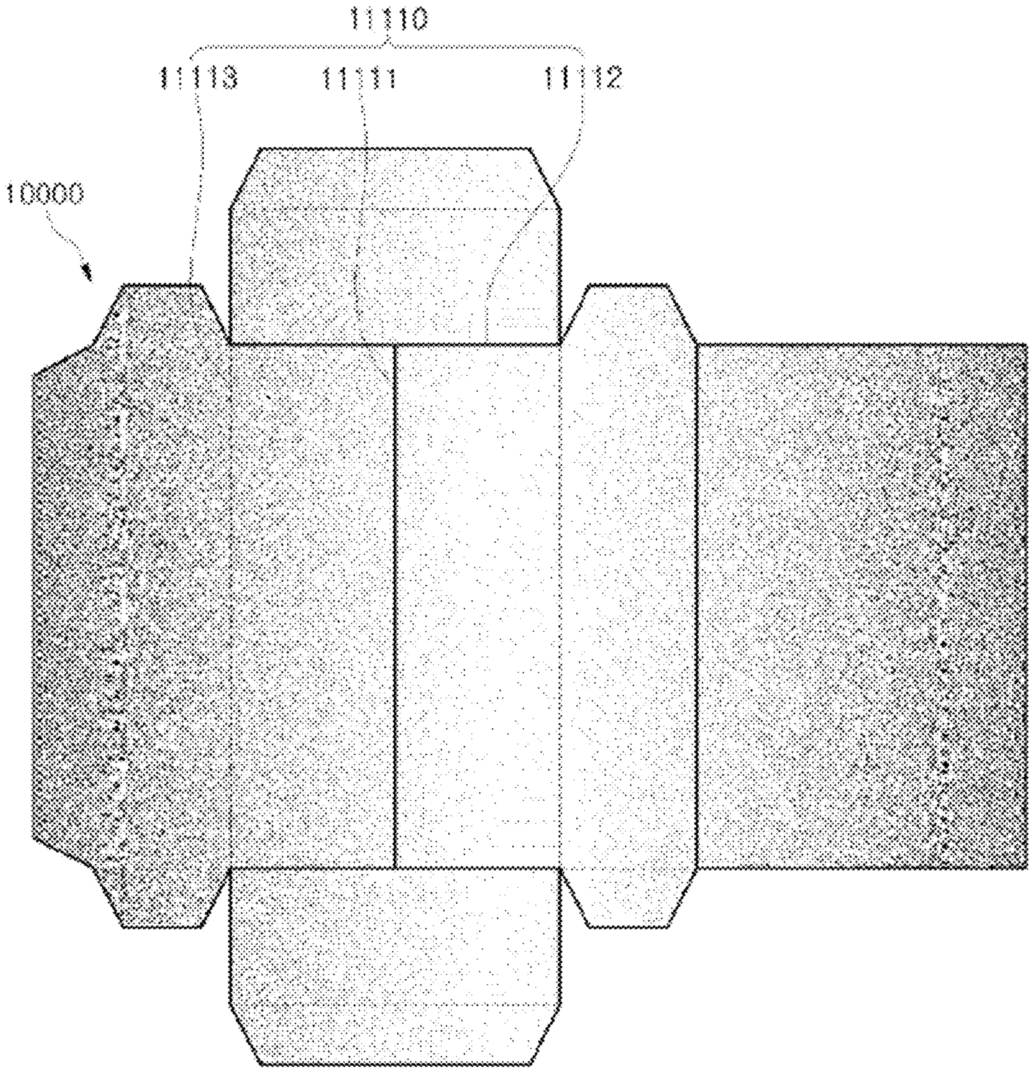
FIG. 49 illustrates an example of a release paper attached to the cigarette pack sticker of FIG. 47 or 48.
Figure 50:
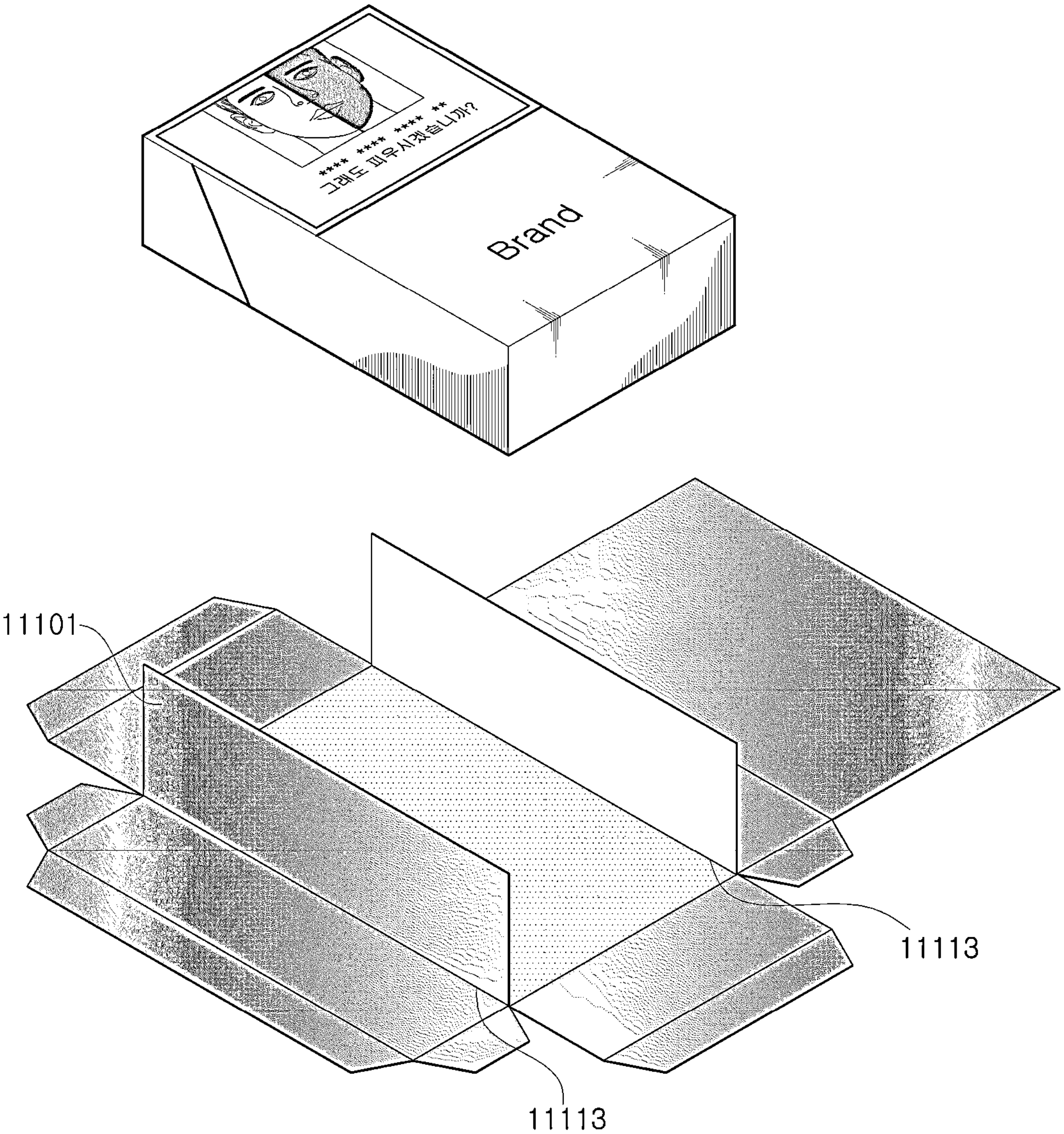
FIG. 50 illustrates an example of using the release paper of FIG. 49.

FIG. 49 illustrates an example of a release paper that may be attached to the cigarette pack sticker shown in FIG. 47 or 48. FIG. 50 illustrates an example of how to use the release paper of FIG. 49.

Referring to FIG. 49, a release paper (10000) includes an attachment position guide (11110) that helps guide either the front or rear side of the cigarette pack to align with the rear surface of the cigarette pack sticker. The attachment position guide (11110) includes a first cutting portion (11111), oriented vertically, which splits the release paper (10000) into left and right segments. It also has a pair of second cutting portions (11112), formed at the upper and lower sections of the first cutting portion (11111) in the horizontal direction. The two second cutting portions (11112) divide the release paper (10000) horizontally. Additionally, a pair of folding guides (11113) are positioned at the left and right ends of the attachment position guide (11110), respectively. The pair of folding guides (11113) are positioned along the boundaries between the front or rear cover portion and its neighboring lateral-side attachment portions of the release paper. The folding guides (11113) are pre-processed lines that allow the release paper to fold smoothly. When the user pulls the left and right segments apart the folding guides (11113) allows the release paper (10000) to fold easily along these guides. In FIG. 49, left segment of the release paper is depicted to correspond to a region covering a left half of the first or second cover portion, left-sided lateral side attachment portion, the first auxiliary cover, and the left-sided parts of the fourth and fifth auxiliary covers. Further, right segment of the release paper is shown to correspond to a region covering at least a right half of the first or second cover portion, right-sided lateral side attachment portion, and the right-sided parts of the fourth and fifth auxiliary covers.

The folding guides (11113) are designed to facilitate easy folding of the release paper, often created using perforated lines or pre-scored with pressure techniques such as scoring or creasing. The distance between the pair of folding guides (11113) should correspond to the width of the front side of the cigarette pack and the length of the first cutting portion (or, the distance between the pair of second cutting portions) equals to the vertical length of the front side of the cigarette pack. Referring to FIG. 50, a pair of open ends (11101) of the release paper, folded along the pair of folding guides (11113), helps guide the cigarette pack into the correct attachment position.

Figure 51:
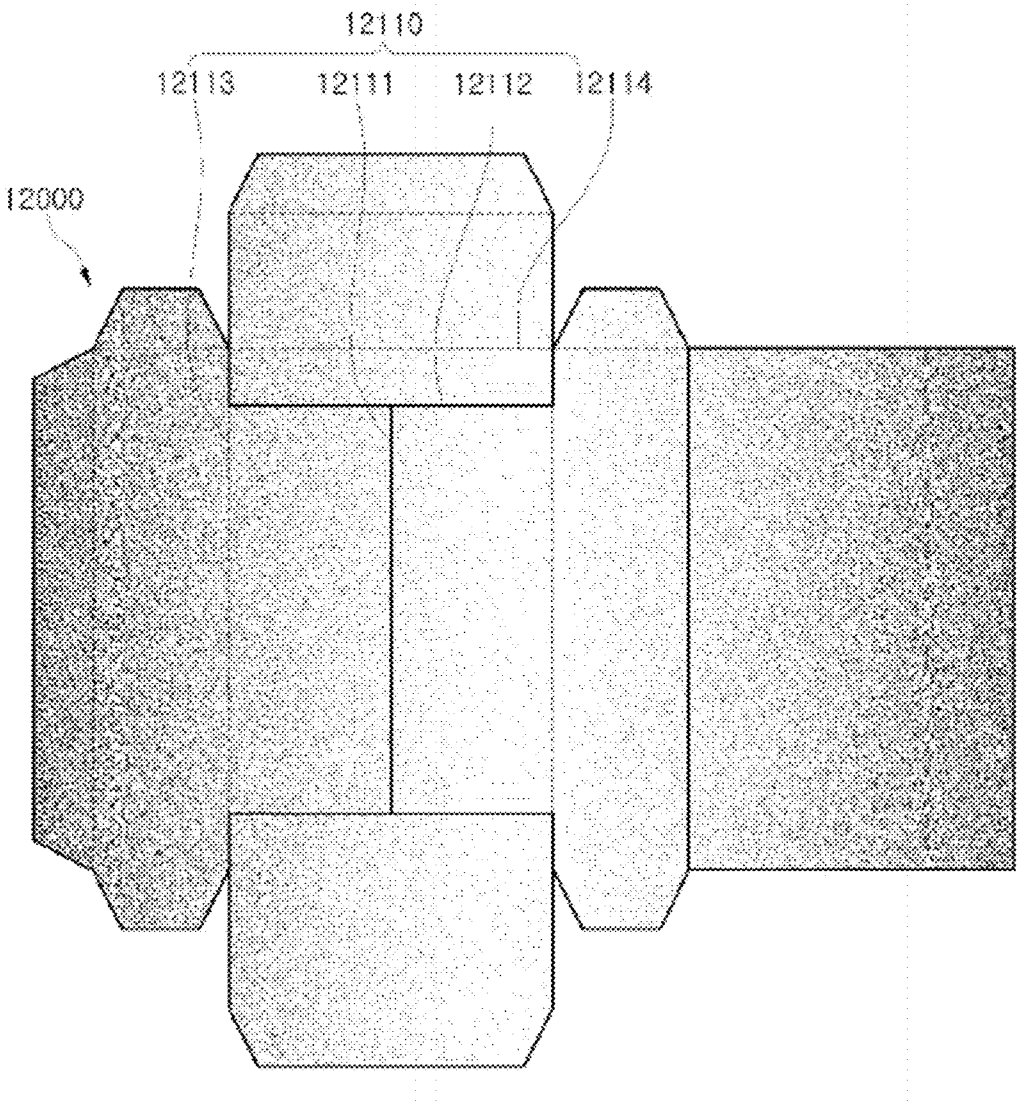
FIG. 51 illustrates another example of a release paper attached to the cigarette pack sticker of FIG. 47 or 48.

FIG. 51 illustrates another example of a release paper that may be attached to the cigarette pack sticker in FIG. 47 or 48, and FIGS. 52 to 60 illustrate examples of how to use the release paper shown in FIG. 51.

Referring to FIG. 51, the release paper (12000) includes an attachment position guide (12110) that helps align either the front or rear side of the cigarette pack with the correct attachment position on the rear surface of the cigarette pack sticker. The attachment position guide (12110) includes a first cutting portion (12111) running vertically and centrally located, which splits the release paper into left and right segments, and a pair of second cutting portions (12112), positioned horizontally near the upper and lower edges of the release paper, which split the release paper into upper and lower segments. These second cutting portions (12112) are angular U-shaped in form, with one located at the top and the other at the bottom, facing in opposite directions. The attachment position guide (12110) further includes a pair of first folding guides (12113), positioned at the left and right ends of the attachment position guide (12110), running parallel to the first cutting portion (12111) and allowing the left and right segments of the release paper to fold easily. The attachment position guide (12110) further includes a pair of second folding guides (12114), located along the upper and lower edges of the release paper and adjacent to the second cutting portions (12112), facilitating folding of the release paper along the upper and lower sections. The positions of the first and second folding guides (12113, 12114) correspond to horizontal width and vertical length of the second cover portion (113) of the cigarette pack sticker (110). The first and second pair of folding guides (12113, 12114) are positioned along the boundaries between the front or rear cover portion and its neighboring lateral-side, top-side, or bottom-side attachment portions of the release paper. 15. In FIG. 51, left segment of the release paper is shown to correspond to a region covering a part of the left half of the first or second cover portion, left-sided lateral side attachment portion, the first auxiliary cover, and the left-sided parts of the fourth and fifth auxiliary covers, while right segment corresponds to a region covering at least a part of the right half of the first or second cover portion, right-sided lateral side attachment portion, and the right-sided parts of the fourth and fifth auxiliary covers. Additionally, upper segment of the release paper is depicted to correspond to a region covering at least the top-side attachment portion, the second auxiliary cover, and upper remaining part of the first or second cover portion not covered by the left or right segment, and the lower segment is shown to correspond to a region covering at least the bottom-side attachment portion, the third auxiliary cover, and lower remaining part of the first or second cover portion not covered by the left or right segment.

Although FIG. 51 illustrates that the distance between the first cutting portion (12111) and the first folding guides (12113) differs from the distance between the second cutting portion (12112) and the second folding guide (12114), these distances may be configured to be equal. The distance between the respective cutting portions (12111, 12112) and the folding guides (12113, 121140) may be appropriately adjusted depending on the thickness of the cigarette pack or to facilitate easier insertion of the cigarette pack.

Figure 52:
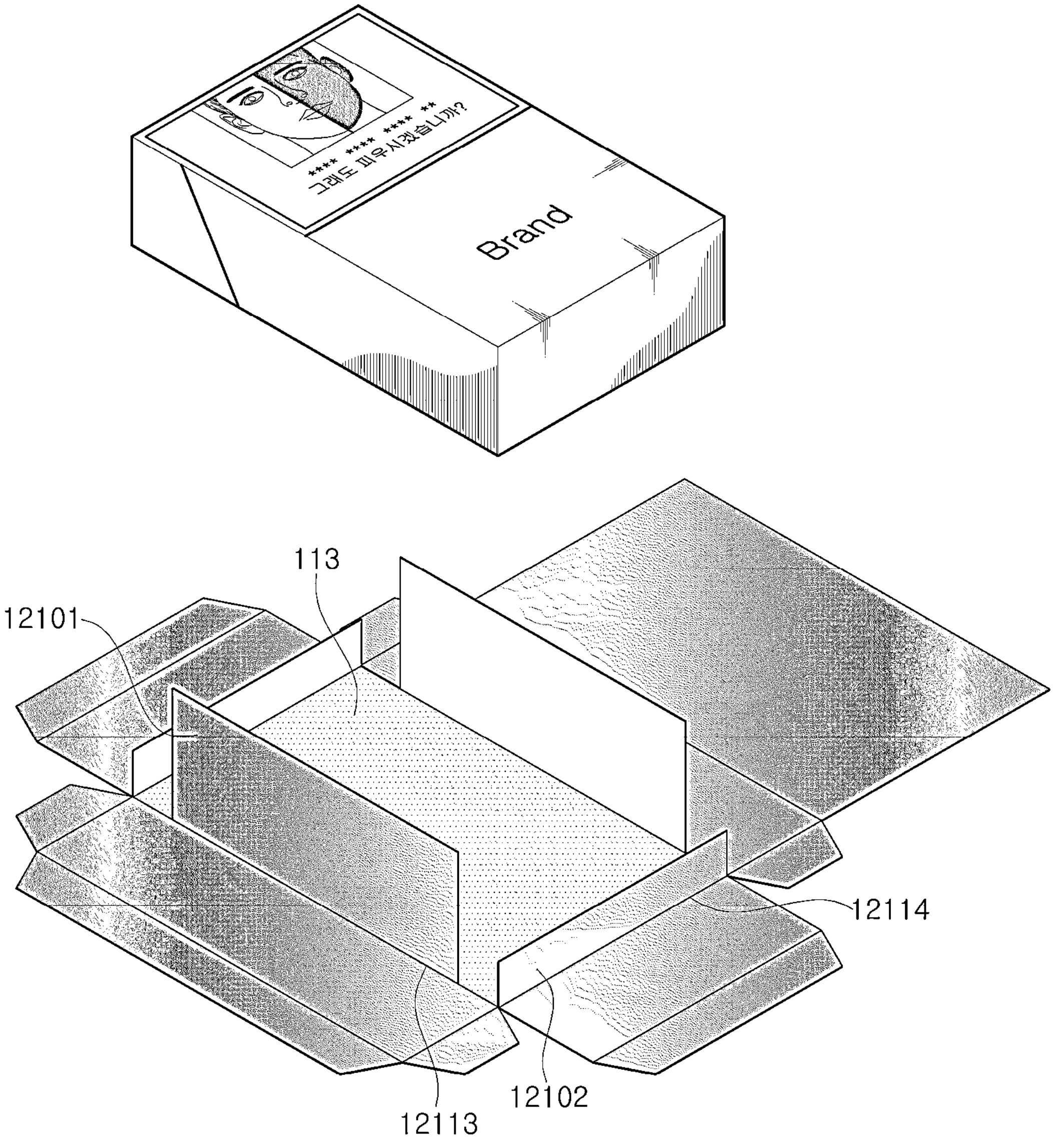
FIGS. 52 to 60 illustrate examples of using the release paper of FIG. 51.

FIGS. 52 to 60 illustrate the process of removing he release paper and attaching the cigarette pack to the cigarette pack sticker. This process allows for consistent and accurate placement of the cigarette pack onto the sticker and reduces the need for manual adjustment during application. FIG. 52 illustrates the initial step in the cigarette pack sticker application process. Referring to FIG. 52, the user initially separates the release paper along the first cutting portion (12111) and each of the second cutting portion (12112). The release paper is then folded along the pair of first folding guide (12113) and the pair of second folding guide (12114), exposing the adhesive surface of the second cover portion (113) on the rear surface of the cigarette pack sticker. The release paper tear ends (12101, 12102), folded along the respective folding guides (12113, 12114) facilitate alignment of the cigarette pack to correct attachment position on the rear surface of the sticker. In this instance, to allow the user to smoothly attach the cigarette pack with a small finger pressure or with only the gravity applied to the cigarette pack itself, it is preferable to apply a certain level of elasticity, rigidity or support to the release paper tear ends (12101, 12102), along with smooth treatment of their inner surfaces to facilitate proper placement of the cigarette pack.

Figure 53:
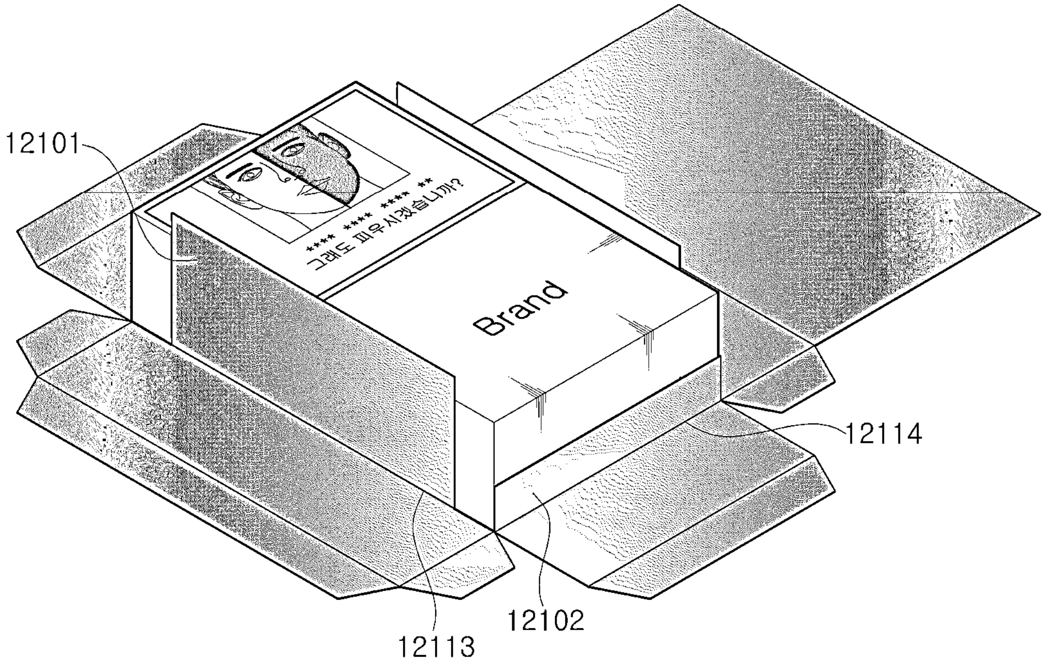
Figure 54:
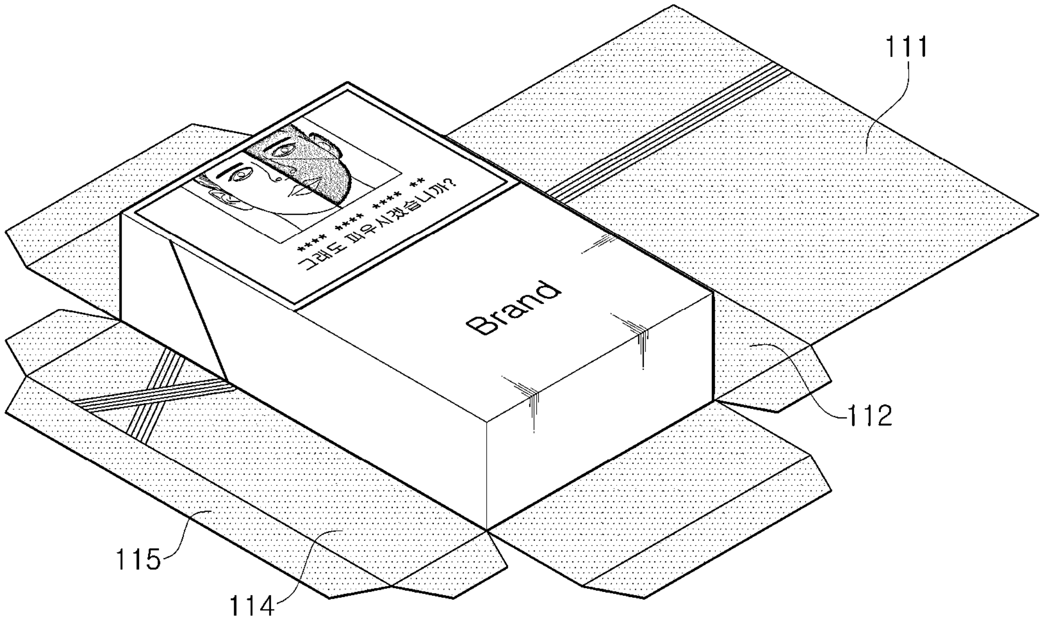

Referring to FIG. 53, the rear side of the hard cigarette pack is attached to the attachment position (i.e., the exposed adhesive portion) surrounded by the release paper tear ends (12101, 12102), corresponding to the second cover portion (113) of the sticker. Once the user attaches the rear side of the hard cigarette pack to the second cover portion (113) on which the release paper has been removed and removes at least some or all of the rest of the release paper as shown in FIG. 54, the cigarette pack remains securely in place. If the perforations (1111, 1121, 1122, 1131, 1141, 1142) of the cigarette pack sticker (110) are not distinguished between the front or rear sides, as shown in FIG. 48, either side of the hard cigarette pack can be attached to the second cover portion (113).

Figure 55:
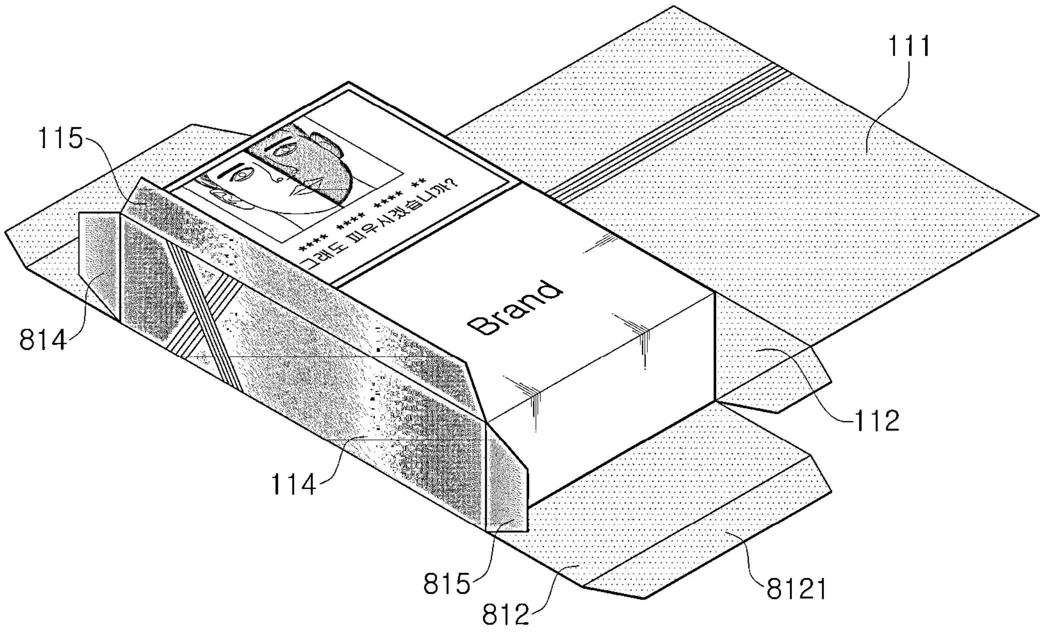
Figure 56:
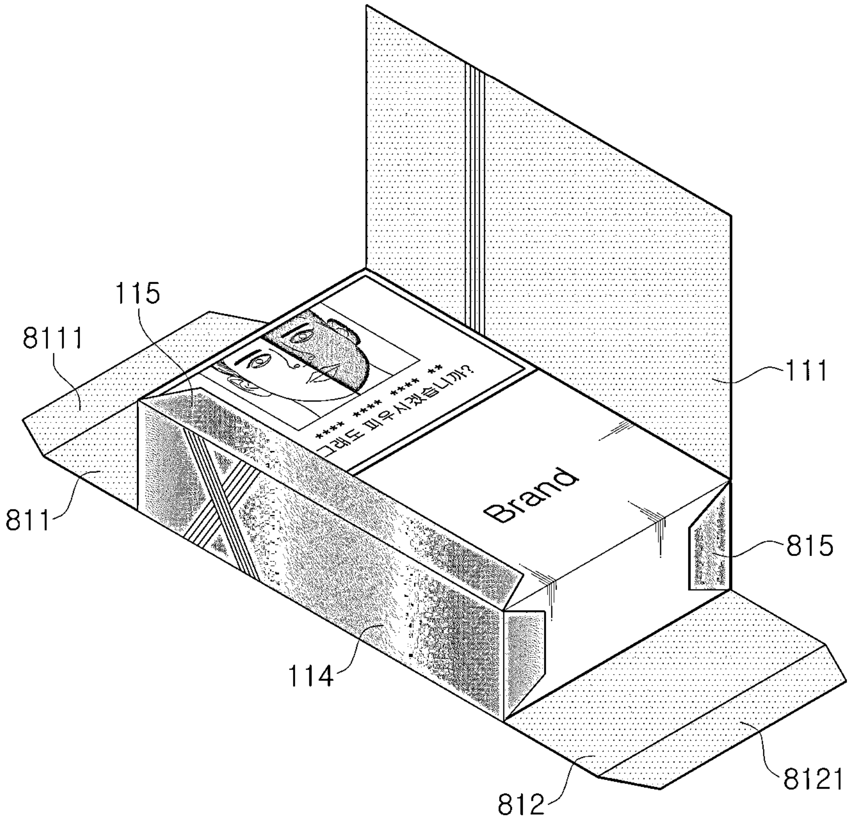

Subsequently, FIGS. 55 and 56 show the lateral side attachment process. The user attaches the second lateral side attachment portion (114) of the cigarette pack sticker to the left side of the hard cigarette pack, and then attaches the first lateral side attachment portion (112), the first auxiliary cover portion (115), a pair of the fourth auxiliary cover portions (814), and a pair of the fifth auxiliary cover portions (815) to the right, front, top and bottom sides of the hard cigarette pack, respectively, as shown in FIGS. 55 and 56.

Figure 57:
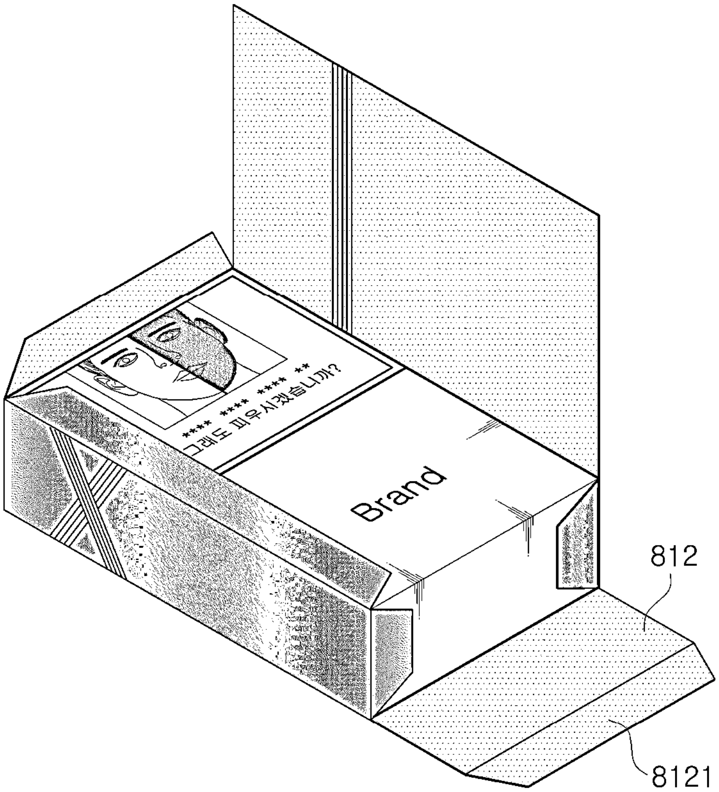
Figure 58:
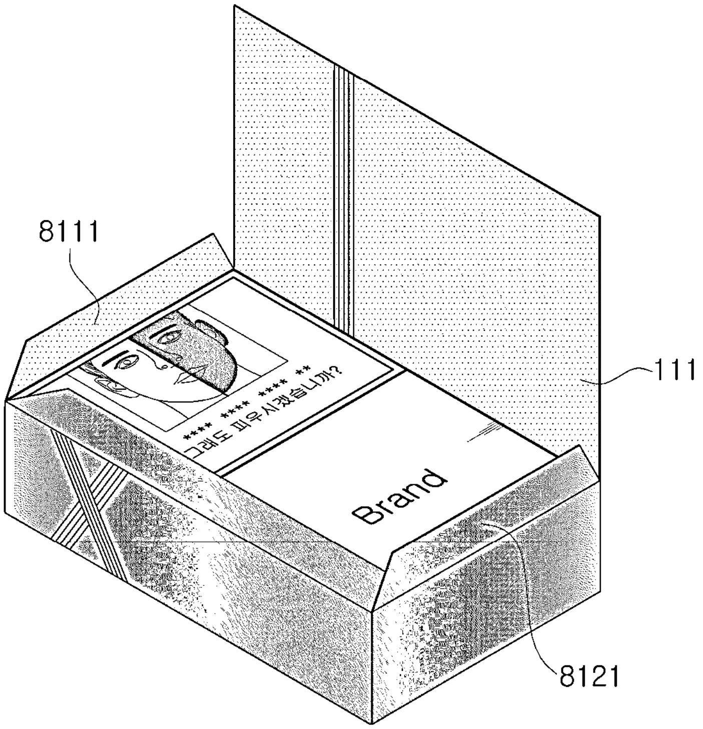

Next, FIGS. 57 and 58 illustrate the attachment of the top and bottom side attachment portions to the cigarette pack. The user attaches the top-side attachment portion (811) and the bottom-side attachment portion (812) of the cigarette pack sticker to the top and bottom sides of the hard cigarette pack, respectively, as shown in FIGS. 57 and 58.

Figure 59:
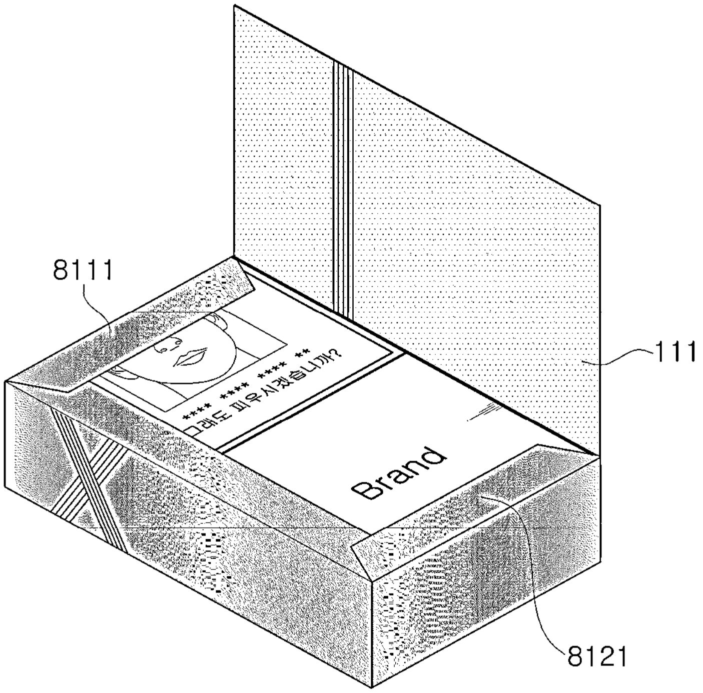
Figure 60:
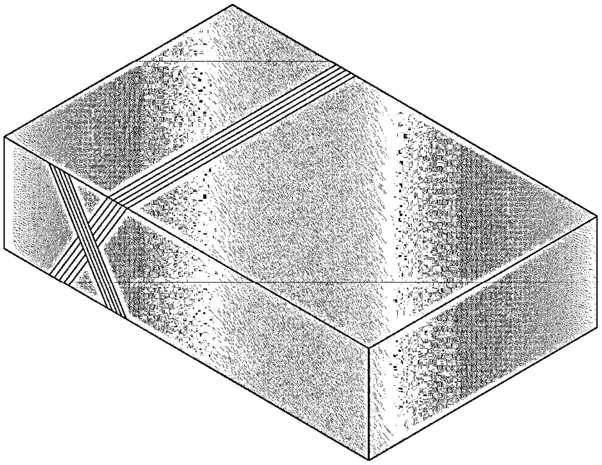

FIGS. 59 and 60 show the final steps of the application process. The user attaches the second auxiliary cover portion (8111), extending from the top-side attachment portion (811), and the third auxiliary cover portion (8121), extending from the bottom-side attachment portion (812), to the top and bottom sides of the hard cigarette pack. Afterward, the first cover portion (111) is wrapped over the front side of the hard cigarette pack, ensuring that the cigarette pack is completely enclosed by the sticker0.

The above examples of how to use the cigarette pack sticker, shown in FIGS. 52 to 60, is provided as an illustrative embodiment. The release paper may peel off in different ways, and the cigarette pack sticker can be attached to the cigarette pack in varying sequences according to the user's preference.

Moreover, although FIGS. 52 to 60 describe the attachment position guides (11110, 12110) as being positioned on either the front or rear side of the cigarette pack, this is just one example. Thus, the attachment position guides and the respective cutting portions and the folding guides may also be formed in positions of the release paper corresponding to the top, bottom, or lateral sides of the cigarette pack. These configurations can be adapted by those skilled in the art depending on the size and type of the cigarette pack, user's preference, and product distribution needs.

Furthermore, although the longitudinal direction of the cigarette pack sticker, which corresponds to the horizontal width direction of the cigarette pack, is indicated in the accompanying drawings as the horizontal direction, the present invention may also be applied in cases where the transverse direction of the sticker, which corresponds to the vertical length direction of the cigarette pack, is indicated as the horizontal direction. Even without additional drawings, those skilled in the art would have no difficulty in carrying out such modifications within the scope of the claims of the present disclosure. Therefore, the terms "horizontal" and "vertical" in the claims should be understood in the context of the user's perspective.

Figure 61:
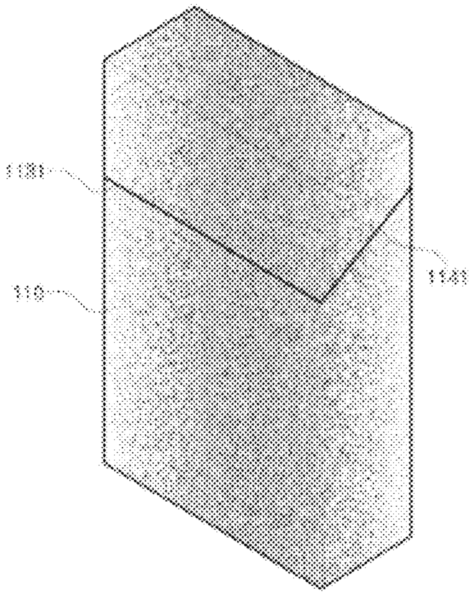
FIGS. 61 and 62 are views illustrating a process of opening a hard cigarette pack with the cigarette pack sticker attached thereto according to the fourth embodiment of the present disclosure.
Figure 62:
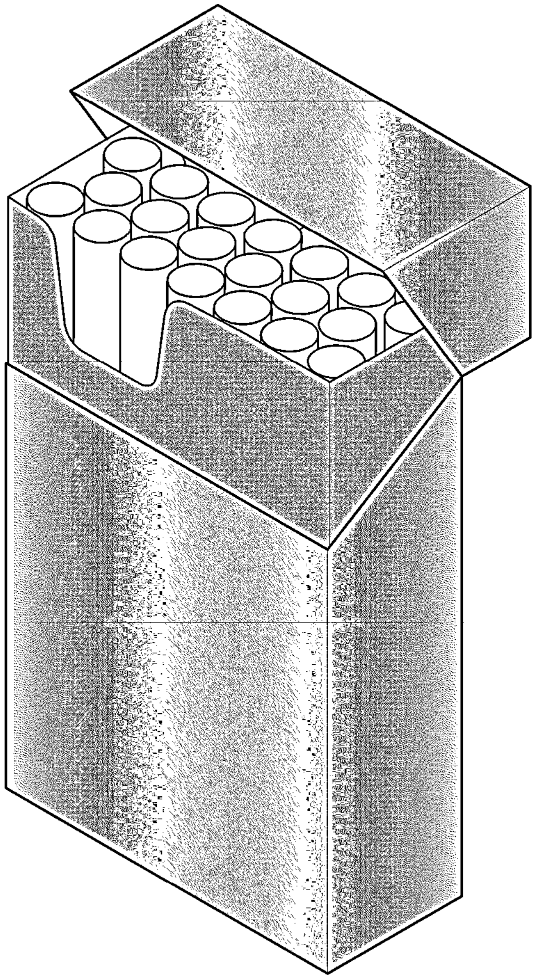

FIGS. 61 and 62 illustrate the process of opening a hard cigarette pack covered by the cigarette pack sticker according to the fourth embodiment of the present disclosure.

Referring to FIG. 61, the entire surface of the hard cigarette pack is covered by the hard cigarette pack sticker (110). The user may open the lid of the hard cigarette pack by pressing down with his/her fingernail along the perforations (1121, 1131, 1141) of the cigarette pack sticker, which correspond to the front and lateral cutting lines of the hard cigarette pack, as shown in FIG. 62.

Figure 63:
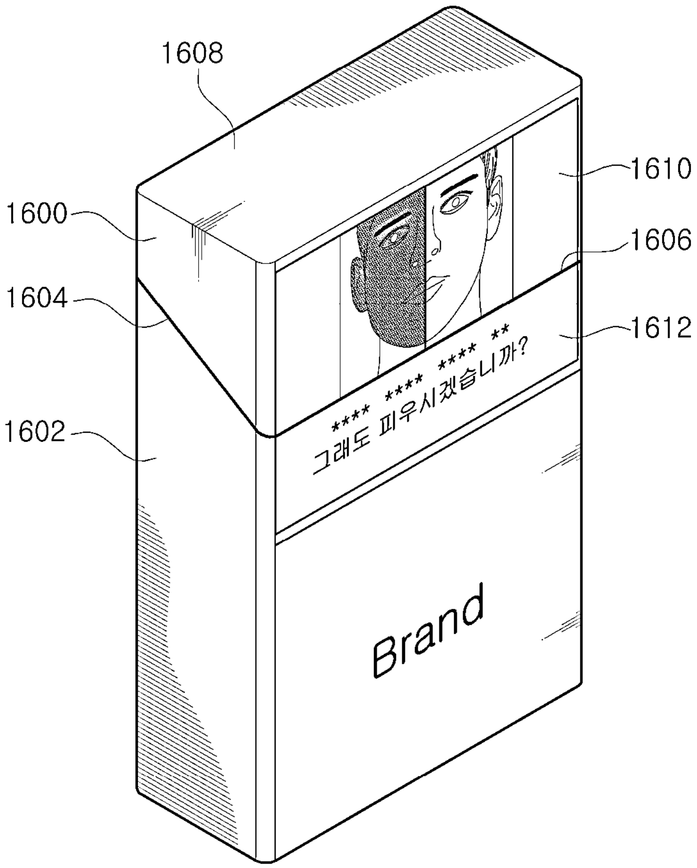
FIG. 63 illustrates another example of a conventional hard cigarette pack having a tapered edge.

FIG. 63 illustrates another example of a conventional hard cigarette pack having a tapered edge.

Referring to FIG. 63, the cigarette pack has a tapered edge, resulting in a different inner and outer widths on the front side. In the first or second embodiment of the present disclosure, it is preferable for the cigarette pack sticker to match the inner width of the cigarette pack and for the release paper to match the outer width, as shown in FIG. 5 or 6. Additionally, the width in the horizontal direction of the attachment position guide of the cigarette pack should correspond to the outer width of the cigarette pack.

In the third or fourth embodiments of the present disclosure, even a hard cigarette pack with tapered edges may employ a cigarette pack sticker and release paper in the same manner as a conventional hard pack with angular corners. For aesthetic purposes, the sticker and release paper can be adjusted to fit the corner portions of the tapered cigarette pack more closely.

Similarly, a soft cigarette pack may employ a cigarette pack sticker and release paper like the hard cigarette pack, or the sticker and release paper can be modified to the rounded edges of a soft pack.

In all embodiments described above, the cigarette pack sticker may include artwork or advertising on at least one of the first and second cover portions or the first and second lateral side attachment portions, allowing the cigarette pack to function as a space for appreciating artwork or for advertising.

Figure 64:
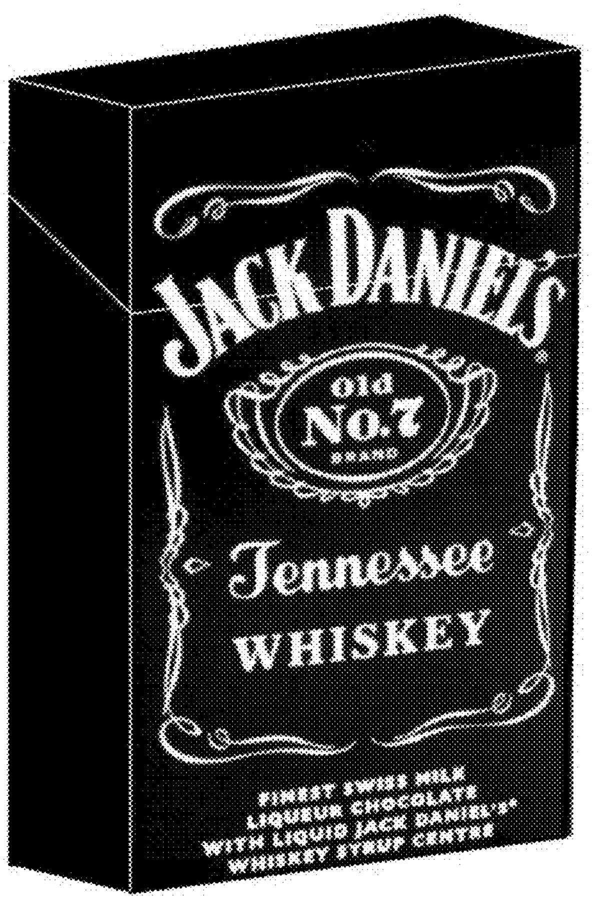
FIG. 64 illustrates an example of a cigarette pack sticker attached to the entirety of the cigarette pack that including an image of a commercial advertisement from a non-tobacco company according to the third or the fourth embodiment of the present disclosure.

FIG. 64 illustrates an example of a cigarette pack sticker covering the entire cigarette pack, featuring an advertisement for a non-tobacco company, according to the third or fourth embodiment of the present disclosure.

Figure 65:
FIG. 65 illustrates an example of a cigarette pack sticker attached to the entirety of the cigarette pack including an image of a commercial advertisement of a non-tobacco company according to the first or the second embodiment of the present disclosure.

FIG. 65 illustrates a similar example of a cigarette pack sticker featuring an advertisement for a non-tobacco company, according to the first or second embodiment of the present disclosure.

Figure 66:
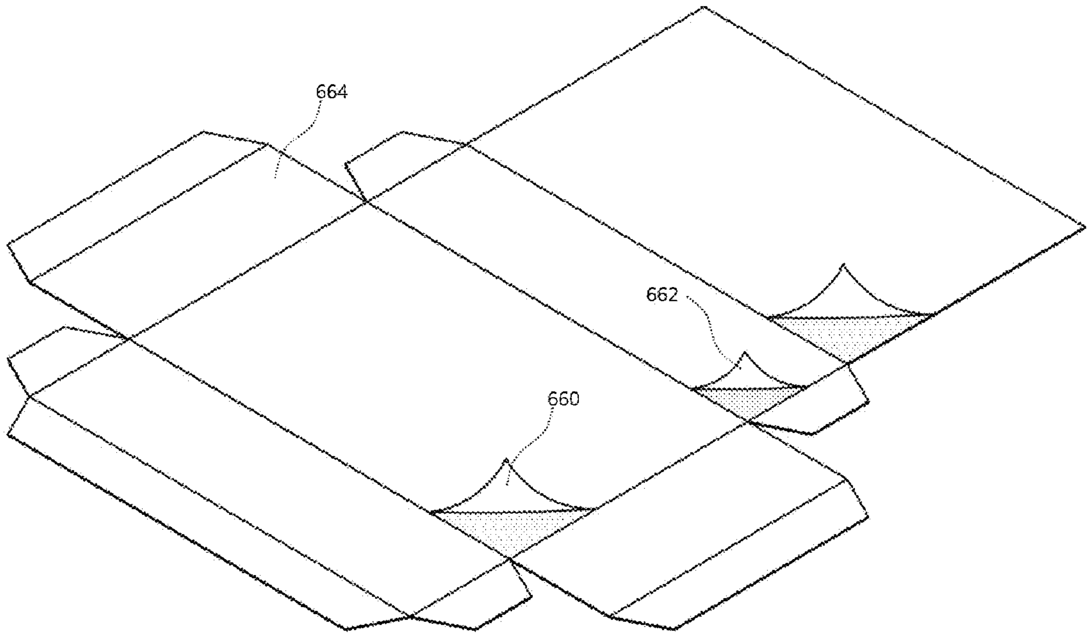
FIG. 66 illustrates another example of a cigarette pack sticker according to the fourth embodiment of the present disclosure.

FIG. 66 illustrates another example of a cigarette pack sticker according to the fourth embodiment of the present disclosure.

Referring to FIG. 66, the cigarette pack sticker includes separate release papers for the front and rear sides (660), lateral sides (662), and upper and lower sides (664). In this case, one release paper is removed, and the corresponding attachment surface of the sticker is affixed to the cigarette pack.

Alternatively, the cigarette pack sticker may be configured so that only specific portions of the release paper, such as those covering front, rear, or lateral side, are separated from the remaining portion of the release paper, formed in a single sheet, allowing easy removal of the remaining sheet after attachment.

For ease of removal, it is preferable to have no adhesive, or weak adhesive, at the corner of the release paper, or to provide a grip at the edge.

Although FIG. 66 depicts an example in the fourth embodiment, the example can also be applied to the third embodiment of the present disclosure.

Although specific embodiments of the present disclosure have been shown and described with reference to the accompanying drawings, the present invention is not limited to the described embodiments. Instead, it would be appreciated by those skilled in the art that changes may be made to these embodiments without departing from the principles and spirit of the invention, the scope of which is defined by the claims and their equivalents.

DRAWING REFERENCE NUMERALS

100, 300, 502, 602: CIGARETTE PACK STICKER
102, 302, 500, 600, 1900, 2100, 2200, 2400: RELEASE PAPER
200: FOLDING GUIDE
204: SECOND FOLDING GUIDE
202, 400, 402: CUTTING PORTION
404, 406: SECOND CUTTING PORTION
660, 662, 664: RELEASE PAPER GRIP
700, 800, 802, 804, 806, 1300, 1400, 1500: PERFORATIONS
702: CENTER LINE
1600: COVER
1602: BODY
1604: LATERAL BOUNDARY LINE
1606: FRONT BOUNDARY LINE
1608, 1800: TOP SIDE
1610, 1802: WARNING IMAGE
1612, 1804: WARNING TEXT
1700: TEAR STRAP
110: CIGARETTE PACK STICKER
111: FIRST COVER PORTION
112: FIRST LATERAL SIDE ATTACHMENT PORTION
113: SECOND COVER PORTION
114: SECOND LATERAL SIDE ATTACHMENT PORTION
115: FIRST AUXILIARY COVER
1111, 1121, 1122, 1131, 1141, 1142: PERFORATIONS
210, 310, 10000, 12000: RELEASE PAPER
501, 11101, 12101, 12102: RELEASE PAPER TEAR END
211, 11110: ATTACHMENT POSITION GUIDE
2111, 2112, 3111: CUTTING PORTION
3112, 3113: FOLDING GUIDE
811: TOP SIDE ATTACHMENT PORTION
812: BOTTOM SIDE ATTACHMENT PORTION
8111: SECOND AUXILIARY COVER
8121: THIRD AUXILIARY COVER
814: FOURTH AUXILIARY COVER
815: FIFTH AUXILIARY COVER
1600: COVER
1602: BODY
1604: LATERAL BOUNDARY LINE
1606: FRONT BOUNDARY LINE
1608, 1800: TOP SIDE
1608, 1800: WARNING IMAGE
1612, 1804: WARNING TEXT
1700: TEAR STRAP
11111, 12111: FIRST CUTTING PORTION
11112, 12112: SECOND CUTTING PORTION
11113, 12113: FIRST FOLDING GUIDE
12114: SECOND FOLDING GUIDE

The invention claimed is:

1. A sticker member for a cigarette pack comprising:

(a) a cigarette pack sticker configured to cover an entire surface of a cigarette pack, the cigarette pack sticker having:

a first cover portion configured to be attached to a front side or a rear side of the cigarette pack;

a first lateral side attachment portion extending from one lateral side of the first cover portion, the first lateral side attachment portion configured to be attached to one lateral side of the cigarette pack;

a second cover portion extending from the first lateral side attachment portion, the second cover portion configured to be attached to an opposite side of the cigarette pack from the first cover portion;

a second lateral side attachment portion extending from the second cover portion, the second lateral side attachment portion configured to be attached to another lateral side of the cigarette pack;

a top-side attachment portion extending from an upper section of the first cover portion or the second cover portion, the top-side attachment portion configured to be attached to a top side of the cigarette pack; and a bottom-side attachment portion extending from a lower section of the first cover portion or the second cover portion, the bottom-side attachment portion configured to be attached to a bottom side of the cigarette pack;

(b) an adhesive layer applied on a rear side of the sticker cigarette pack sticker; and (c) a release paper covering the adhesive layer, the release paper including an attachment position guide formed at a position of the release paper corresponding to the first cover portion or the second cover portion, wherein the attachment position guide comprises:

a first cutting portion formed in a vertical orientation at a center of the attachment position guide, the first cutting portion divides the release paper into a left segment and a right segment;

a pair of second cutting portions formed in a horizontal orientation near upper and lower edges of the attachment position guide the pair of second cutting portions being angular U-shaped, with one of the pair of second cutting portions located at the upper edge of the attachment position guide and another of the pair of second cutting portions located at the lower edge of the attachment position guide the pair of second cutting portions facing in opposite directions to each other, and the pair of second cutting portions further divides the release paper into an upper segment and a lower segment;

a pair of first folding guides formed in a vertical orientation at a left end and a right end of the attachment position guide, the pair of first folding guides being parallel to the first cutting portion and configured to allow the left segment and the right segment of the release paper to fold; and a pair of second folding guides formed in a horizontal orientation along the upper and lower edges of the attachment position guide and adjacent to the pair of second cutting portions, the pair of second folding guides configured to allow the upper segment and the lower segment of the release paper to fold, wherein the pair of first folding guides and the pair of second folding guides are positioned along boundaries between the first cover portion or the second cover portion and neighboring portions of the cigarette pack sticker, and wherein each of the pair of first folding guides and the pair of second folding guides is perforated or pre-scored to allow easy folding of the release paper.

2. The sticker member according to claim 1, wherein the cigarette pack sticker further comprises:

a first auxiliary cover extending from the second lateral side attachment portion, the first auxiliary cover configured to be attached to a portion of the front side or the rear side of the cigarette pack;

a second auxiliary cover extending from the top-side attachment portion, the second auxiliary cover configured to be attached to the front side or the rear side of the cigarette pack;

a third auxiliary cover extending from the bottom-side attachment portion, the third auxiliary cover configured to be attached to the front side or the rear side of the cigarette pack;

a pair of fourth auxiliary covers extending from upper sections of the first lateral side attachment portion and the second lateral side attachment portion, respectively, the pair of fourth auxiliary covers configured to be attached to the top side of the cigarette pack; and a pair of fifth auxiliary covers extending from lower sections of the first lateral side attachment portion and the second lateral side attachment portion, respectively, the pair of fifth auxiliary covers configured to be attached to the bottom side of the cigarette pack.

3. The sticker member according to claim 2, wherein:

the left segment of the release paper corresponds to a region covering at least a part of a left half of the first cover portion or the second cover portion, a left-sided lateral side attachment portion, the first auxiliary cover, and left-sided parts of the pair of fourth auxiliary covers and the pair of fifth auxiliary covers; and the right segment of the release paper corresponds to a region covering at least a part of a right half of the first cover portion or the second cover portion, a right-sided lateral side attachment portion, and right-sided parts of the pair of fourth auxiliary covers and the pair of fifth auxiliary covers.

4. The sticker member according to claim 3, wherein:

the upper segment of the release paper corresponds to a region covering at least the top-side attachment portion, the second auxiliary cover, and an upper remaining part of the first cover portion or the second cover portion not covered by the left segment or the right segment; and the lower segment of the release paper corresponds to a region covering at least the bottom-side attachment portion, the third auxiliary cover, and a lower remaining part of the first cover portion or the second cover portion not covered by the left segment or the right segment.

5. The sticker member according to claim 1, wherein each of the pair of first folding guides, the pair of second folding guides, and the first cutting portion is linear in shape.

6. The sticker member according to claim 1, wherein a distance between the pair of first folding guides corresponds to a horizontal width of the first cover portion or the second cover portion of the cigarette pack sticker, and a distance between the pair of second folding guides corresponds to a vertical length of the first cover portion or the second cover portion of the cigarette pack sticker.

7. The sticker member according to claim 1, wherein a distance between the first cutting portion and each of the pair of first folding guides and a distance between each of the pair of second cutting portions and each of the pair of second folding guides are selected based on a thickness of the cigarette pack.

8. The sticker member according to claim 1, wherein a first set of perforations is formed on at least the first cover portion, the first lateral side attachment portion, the second cover portion, and the second lateral side attachment portion, the first set of perforations following cutting lines of the cigarette pack.

9. The sticker member according to claim 8, wherein the first set of perforations comprises:

first central perforations on the first cover portion, aligned with a front cutting line or a rear cutting line of the cigarette pack;

second central perforations on the second cover portion, aligned with a cutting line on an opposite face of the cigarette pack from the first central perforations;

first lateral side perforations on the first lateral side attachment portion and the second lateral side attachment portion, extending from the second central perforations and following lateral cutting lines of the cigarette pack; and second lateral side perforations formed diagonally to intersect with the first lateral side perforations, extending from the first central perforations and following the lateral cutting lines of the cigarette pack.

10. The sticker member according to claim 8, wherein the first set of perforations is arranged as continuous score lines or as discontinuous lines spaced apart at regular intervals.

11. The sticker member according to claim 1, wherein, when the release paper is separated along the first cutting portion and the pair of second cutting portions and folded along the pair of first folding guides and the pair of second folding guides:

an adhesive surface of the first cover portion or the second cover portion is exposed; and release paper tear ends, formed by the folded release paper, facilitate alignment of the cigarette pack to a correct attachment position on the rear side of the cigarette pack sticker, wherein the release paper tear ends have elasticity, rigidity, or support to allow smooth attachment of the cigarette pack, and inner surfaces of the release paper tear ends are smooth to facilitate proper placement of the cigarette pack.

12. The sticker member according to claim 1, wherein at least some parts of surfaces of the cigarette pack sticker include a printed artwork, an advertisement, or a combination thereof, displayed on the first cover portion or the second cover portion.

13. The sticker member according to claim 1, wherein the pair of second cutting portions is provided corresponding to upper and lower edges of the second cover portion.

* * * * *